(12) United States Patent
Ikenuma

(10) Patent No.: US 9,728,770 B2
(45) Date of Patent: Aug. 8, 2017

(54) STORAGE BATTERY ELECTRODE, MANUFACTURING METHOD THEREOF, STORAGE BATTERY, AND ELECTRONIC DEVICE

(71) Applicant: SEMICONDUCTOR ENERGY LABORATORY CO., LTD., Atsugi-shi, Kanagawa-ken (JP)

(72) Inventor: Tatsuya Ikenuma, Shizuoka (JP)

(73) Assignee: SEMICONDUCTOR ENERGY LABORATORY CO., LTD., Kanagawa-ken (JP)

(*) Notice: Subject to any disclaimer, the term of this patent is extended or adjusted under 35 U.S.C. 154(b) by 0 days.

(21) Appl. No.: 14/887,370

(22) Filed: Oct. 20, 2015

(65) Prior Publication Data

US 2016/0118646 A1    Apr. 28, 2016

(30) Foreign Application Priority Data

Oct. 24, 2014 (JP) ................................. 2014-217222

(51) Int. Cl.
| | | |
|---|---|---|
| H01M 4/04 | (2006.01) | |
| H01M 4/62 | (2006.01) | |
| H01M 10/052 | (2010.01) | |

(52) U.S. Cl.
CPC ....... H01M 4/0438 (2013.01); H01M 4/0416 (2013.01); H01M 4/0471 (2013.01); H01M 4/625 (2013.01); H01M 10/052 (2013.01); Y02E 60/122 (2013.01); Y02P 70/54 (2015.11)

(58) Field of Classification Search
CPC ........... H01M 2220/30; H01M 4/0404; H01M 4/0416; H01M 4/0471; H01M 4/1393; H01M 4/583
See application file for complete search history.

(56) References Cited

U.S. PATENT DOCUMENTS

| | | | |
|---|---|---|---|
| 8,470,477 B2 | 6/2013 | Miwa et al. | |
| 8,685,570 B2 | 4/2014 | Miwa et al. | |
| 8,709,654 B2 | 4/2014 | Takeuchi et al. | |
| 8,883,351 B2 | 11/2014 | Todoriki et al. | |
| 9,225,003 B2 * | 12/2015 | Yukawa | H01M 4/366 |
| 2002/0102459 A1 | 8/2002 | Hosoya et al. | |
| 2013/0065120 A1 | 3/2013 | Miwa et al. | |
| 2013/0084384 A1 | 4/2013 | Yamakaji | |
| 2013/0134051 A1 | 5/2013 | Takahashi et al. | |
| 2013/0156942 A1 | 6/2013 | Yamakaji et al. | |
| 2013/0164619 A1 * | 6/2013 | Yamakaji | H01M 4/134 429/217 |
| 2013/0212879 A1 | 8/2013 | Ogino | |
| 2013/0266859 A1 | 10/2013 | Todoriki et al. | |
| 2013/0337320 A1 * | 12/2013 | Yukawa | H01M 4/366 429/211 |
| 2014/0166946 A1 | 6/2014 | Miwa et al. | |
| 2014/0234700 A1 | 8/2014 | Moriwaka et al. | |
| 2014/0295068 A1 | 10/2014 | Nanba et al. | |
| 2014/0370184 A1 | 12/2014 | Takemura et al. | |
| 2015/0064565 A1 | 3/2015 | Todoriki et al. | |
| 2015/0099179 A1 | 4/2015 | Ikenuma et al. | |
| 2015/0166348 A1 | 6/2015 | Ikenuma et al. | |

FOREIGN PATENT DOCUMENTS

| | | |
|---|---|---|
| JP | 2002-110162 A | 4/2002 |
| JP | 2014-007141 A | 1/2014 |

OTHER PUBLICATIONS

Gong et al. "Graphitization of Graphene Oxide with Ethanol during Thermal Reduction". Journal of Physical Chemistry C. vol. 116 pp. 9969-9979 (Apr. 2012).*

* cited by examiner

*Primary Examiner* — Dah-Wei D Yuan
*Assistant Examiner* — Jose Hernandez-Diaz
(74) *Attorney, Agent, or Firm* — Nixon Peabody LLP; Jeffrey L. Costellia

(57) ABSTRACT

In manufacture of a storage battery electrode containing graphene as a conductive additive, the efficiency of reduction of graphene oxide is reduced with high efficiency under mild conditions, and cycle characteristics and rate characteristics of a storage battery are improved. Provided is a manufacturing method of a storage battery electrode. In the manufacturing method, a paste containing an active material, a binder, graphene oxide, and a solvent is formed; the paste is applied to a current collector and the solvent contained in the paste is evaporated to form an active material layer; the active material layer is immersed in a liquid containing alcohol; and the active material layer is taken out from the liquid and heated so that the graphene oxide is reduced.

20 Claims, 27 Drawing Sheets

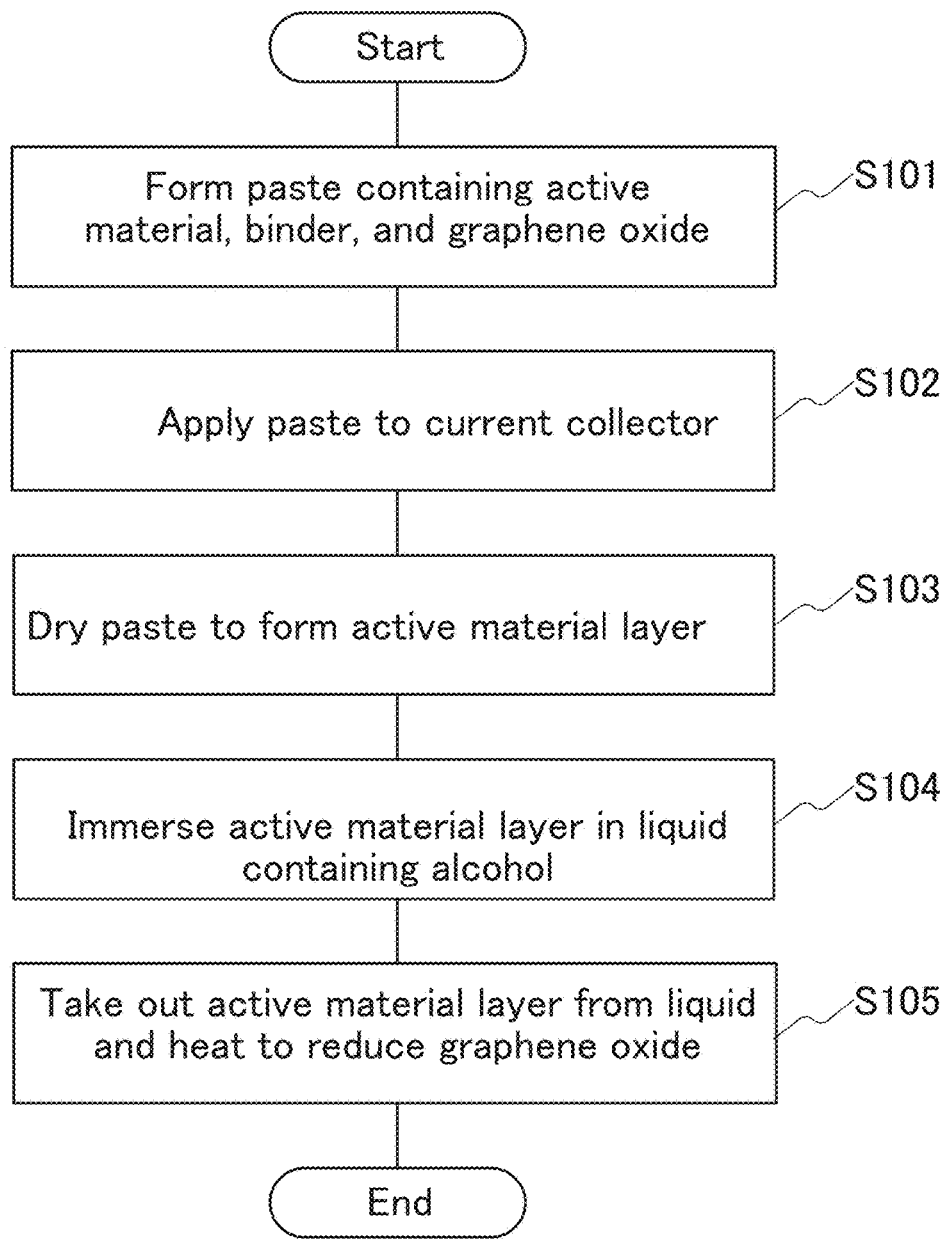

STORAGE BATTERY ELECTRODE, MANUFACTURING METHOD THEREOF, STORAGE BATTERY, AND ELECTRONIC DEVICE

BACKGROUND OF THE INVENTION

1. Field of the Invention

One embodiment of the present invention relates to a storage battery electrode, a manufacturing method thereof, a storage battery, and an electronic device.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition of matter. Specific examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

With the recent rapid spread of portable electronic devices such as mobile phones, smartphones, electronic book (e-book) readers, and portable game machines, secondary batteries for drive power sources have been increasingly required to be smaller and to have higher capacity. Nonaqueous secondary batteries typified by lithium-ion secondary batteries, which have advantages such as high energy density and high capacity, have been widely used as secondary batteries for portable electronic devices.

Lithium-ion secondary batteries, which are nonaqueous secondary batteries, are widely used because of their high energy density. A lithium-ion secondary battery includes a positive electrode containing an active material such as lithium cobalt oxide ($LiCoO_2$) or lithium iron phosphate ($LiFePO_4$), a negative electrode containing an active material such as graphite capable of reception and extraction of lithium ions, a nonaqueous electrolytic solution in which an electrolyte formed of a lithium salt such as $LiBF_4$ or $LiPF_6$ is dissolved in an organic solvent such as ethylene carbonate or diethyl carbonate, and the like. The lithium-ion secondary battery is charged and discharged in such a way that lithium ions in the secondary battery move between the positive electrode and the negative electrode through the nonaqueous electrolytic solution and inserted into or extracted from the active materials of the positive electrode and the negative electrode.

A binder is mixed into the positive electrode or the negative electrode in order that active materials can be bound to each other or an active material layer and a current collector can be bound. Since the binder is generally an organic high molecular compound such as polyvinylidene fluoride (PVdF) which has an insulating property, the electric conductivity of the binder is extremely low. Thus, as the ratio of the amount of the binder to the amount of the active material is increased, the ratio of the amount of the active material in the electrode is relatively decreased, resulting in lower discharge capacity of the secondary battery.

Hence, by mixture of a conductive additive such as acetylene black (AB) or graphite particles, the electric conductivity between active materials or between an active material layer and a current collector can be improved. Thus, an active material layer with high electrical conductivity can be provided (see Patent Document 1).

An electrode containing graphene as a conductive additive has been developed. Patent Document 2 discloses an electrode manufacturing method in which graphene oxide (GO), an active material, and a binder are mixed and then GO is reduced. By this manufacturing method, an active material layer having high electrical conductivity only with a small amount of the conductive additive can be provided.

REFERENCE

Patent Documents

[Patent Document 1] Japanese Published Patent Application No. 2002-110162
[Patent Document 2] Japanese Published Patent Application No. 2014-007141

SUMMARY OF THE INVENTION

To improve the performance of a storage battery including an electrode containing graphene as a conductive additive, it is required to develop a manufacturing method of an electrode, with which graphene oxide can be sufficiently reduced.

In view of the above, an object of one embodiment of the present invention is to increase the reduction efficiency of graphene oxide. Another object of one embodiment of the present invention is to provide a manufacturing method of a storage battery electrode having low internal impedance. Another object of one embodiment of the present invention is to reduce graphene oxide under mild conditions. Another object of one embodiment of the present invention is to decrease damage to an active material layer caused by reduction.

Another object of one embodiment of the present invention is to increase discharge capacity of a storage battery. Another object of one embodiment of the present invention is to improve cycle characteristics of a storage battery. Another object of one embodiment of the present invention is to improve rate characteristics of a storage battery.

Another object of one embodiment of the present invention is to provide a novel electrode, a novel manufacturing method of an electrode, a novel storage battery, or the like. Note that the descriptions of these objects do not preclude the existence of other objects. In one embodiment of the present invention, there is no need to achieve all the objects. One embodiment of the present invention achieves at least one of the above objects. Other objects will be apparent from and can be derived from the descriptions of the specification, the drawings, the claims, and the like.

One embodiment of the present invention is a manufacturing method of a storage battery electrode. In the manufacturing method, a paste containing an active material, a binder, graphene oxide, and a solvent is formed; the paste is applied to a current collector and the solvent contained in the paste is evaporated to form an active material layer; the active material layer is immersed in a liquid containing alcohol; and the active material layer is taken out from the liquid and heated.

One embodiment of the present invention is a manufacturing method of a storage battery electrode. In the manufacturing method, a paste containing an active material, a binder, graphene oxide, a conductive additive, and a solvent is formed; the paste is applied to a current collector and the solvent contained in the paste is evaporated to form an active material layer; the active material layer is immersed in a liquid containing alcohol; and the active material layer is taken out from the liquid and heated.

One embodiment of the present invention is the manufacturing method of a storage battery electrode, in which the alcohol is preferably methanol, ethanol, 1-propanol, 2-propanol, 1-butanol, 2-butanol, isobutyl alcohol, or tert-butyl alcohol.

One embodiment of the present invention is a storage battery electrode including a current collector and an active material layer. The active material layer is in contact with the current collector. The active material layer contains an active material, a binder, graphene, and a second conductive additive.

One embodiment of the present invention is a storage battery including a first electrode and a second electrode. The first electrode is any one of the above storage battery electrodes. The first electrode has a function of operating as one of a positive electrode and a negative electrode. The second electrode has a function of operating as the other of the positive electrode and the negative electrode.

One embodiment of the present invention is an electronic device including the storage battery with the above structure and a display panel, an operation key, a speaker, or a microphone.

One embodiment of the present invention can increase the reduction efficiency of graphene oxide. One embodiment of the present invention can provide a manufacturing method of a storage battery electrode having low internal impedance.

One embodiment of the present invention can reduce graphene oxide under mild conditions. One embodiment of the present invention can decrease damage to an active material layer caused by reduction.

One embodiment of the present invention can improve cycle characteristics of a storage battery. One embodiment of the present invention can improve rate characteristics of a storage battery.

With one embodiment of the present invention, a novel secondary battery, a novel electrode, a novel manufacturing method of an electrode, or the like can be provided. Note that the descriptions of these effects do not preclude the existence of other effects. One embodiment of the present invention does not necessarily have all the effects. Other effects will be apparent from and can be derived from the descriptions of the specification, the drawings, the claims, and the like.

BRIEF DESCRIPTION OF THE DRAWINGS

FIG. 1 illustrates a manufacturing method of a storage battery electrode.

DETAILED DESCRIPTION OF THE INVENTION

Figure 2A:
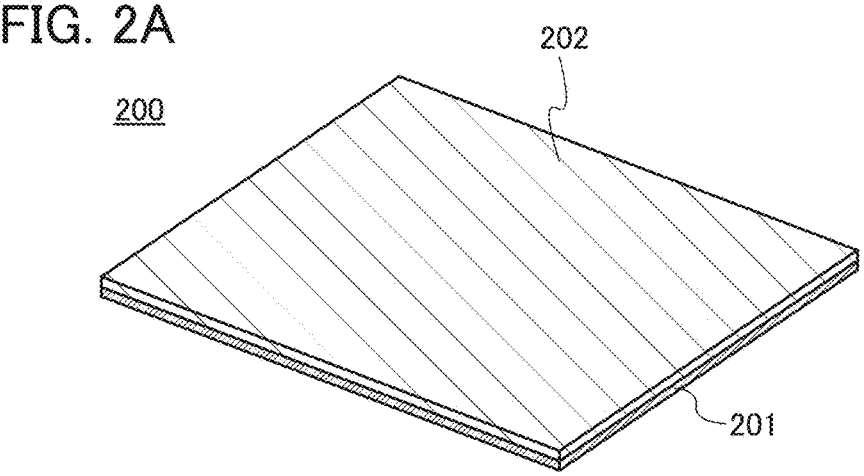
FIGS. 2A to 2C illustrate a storage battery electrode.

Embodiments will be described below with reference to drawings. However, the embodiments can be implemented in many different modes, and it will be readily appreciated by those skilled in the art that modes and details thereof can be changed in various ways without departing from the spirit and scope of the present invention. Thus, the present invention should not be interpreted as being limited to the following description of the embodiments.

Note that in the structures of the invention described below, the same portions or portions having similar functions are denoted by the same reference numerals in different drawings, and description of such portions is not repeated. Furthermore, the same hatch pattern is applied to similar functions, and these are not denoted by particular reference numerals in some cases.

Note that in the drawings used in this specification, the thicknesses of films, layers, and substrates and the sizes of components (e.g., the sizes of regions) are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers in this specification and the like are not necessarily the same as those which specify one embodiment of the present invention.

Embodiment 1

In this embodiment, a storage battery electrode of one embodiment of the present invention will be described with reference to FIGS. 2A to 2C and FIG. 3. FIG. 2A is a perspective view of the electrode, FIG. 2B is a plan view of an active material layer, and FIG. 2C and FIG. 3 are each a longitudinal cross-sectional view of the active material layer.

FIG. 2A is a perspective view of an electrode 200. Although the electrode 200 in the shape of a rectangular sheet is illustrated in FIG. 2A, the shape of the electrode 200 is not limited thereto and may be any appropriate shape. An active material layer 202 is formed on only one side of a current collector 201 in FIG. 2A; however, the active material layer 202 may be formed on both sides of the current collector 201. The active material layer 202 does not necessarily need to be formed over the entire surface of the current collector 201 and a region that is not coated, such as a region for connection to a tab, is provided as appropriate.

The positive electrode current collector 201 can be formed using a highly conductive material that is not alloyed with a carrier ion of lithium or the like, for example, a metal such as stainless steel, gold, platinum, zinc, iron, copper, aluminum, and titanium or an alloy thereof. Alternatively, an aluminum alloy to which an element which improves heat resistance, such as silicon, titanium, neodymium, scandium, and molybdenum, is added can be used. Further alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collector 201 can have a foil-like shape, a plate-like shape (sheet-like shape), a net-like shape, a punching-metal shape, an expanded-metal shape, or the like as appropriate. The current collector 201 preferably has a thickness greater than or equal to 10 μm and less than or equal to 30 μm. A surface of the current collector 201 may be provided with an undercoat layer using graphite or the like.

Figure 2B:
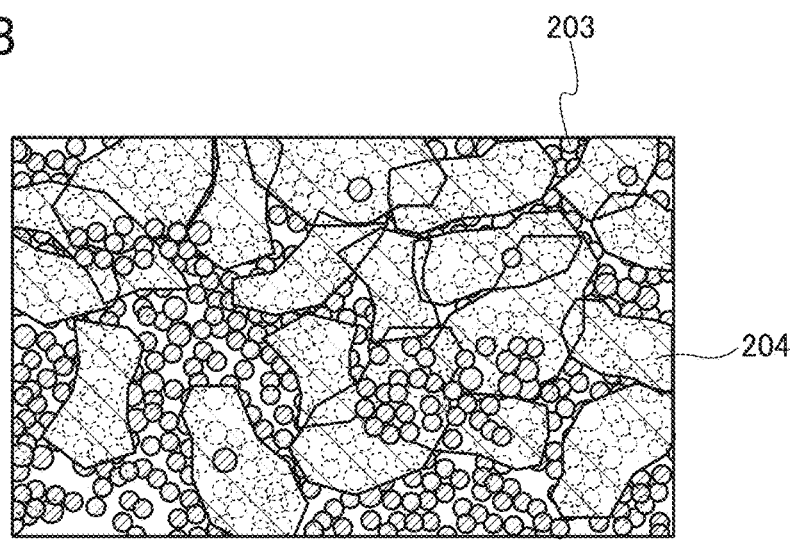
Figure 2C:
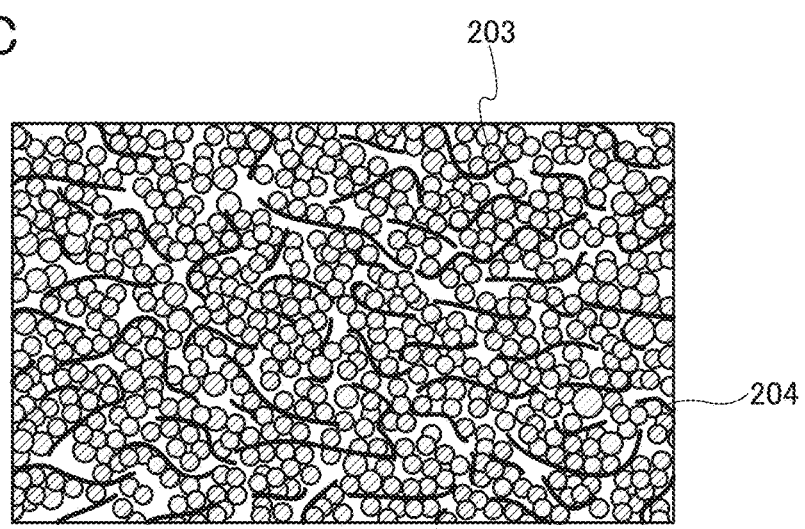
Figure 3:
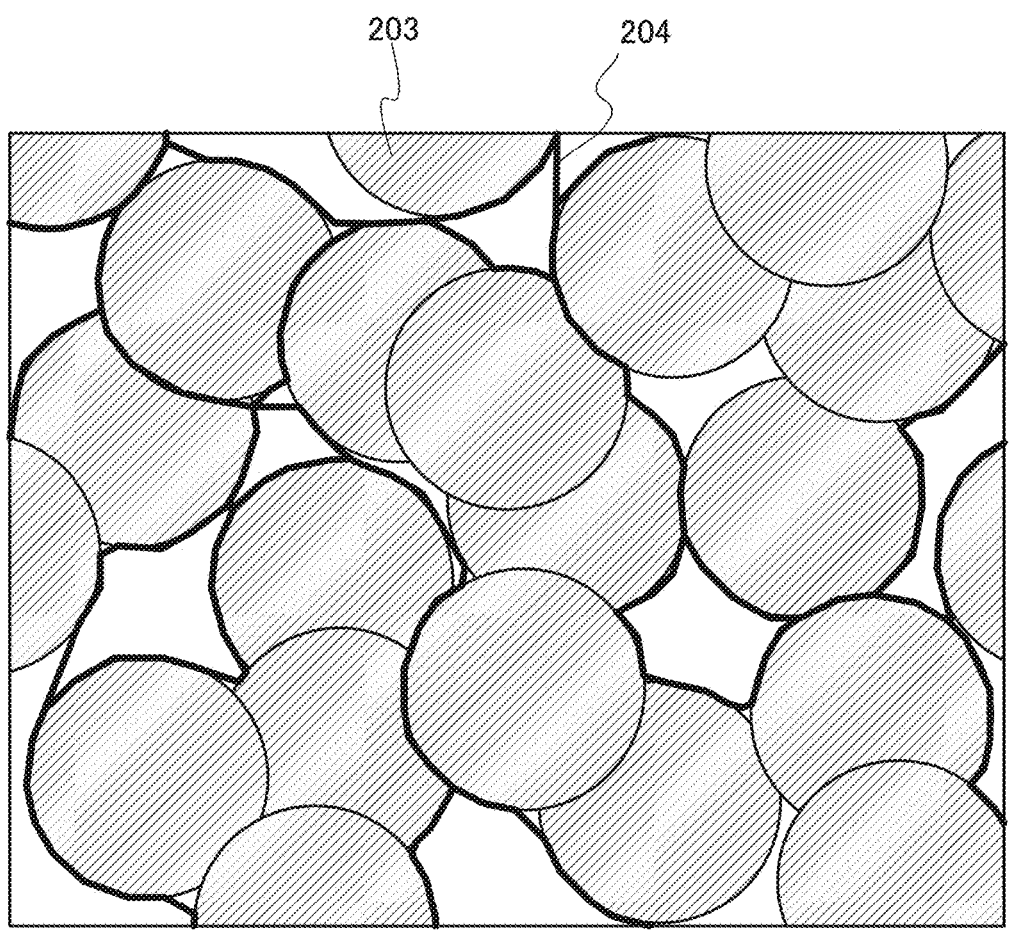
FIG. 3 illustrates a storage battery electrode.

FIGS. 2B and 2C are a schematic top view and a schematic longitudinal cross-sectional view of the active material layer 202. The active material layer 202 contains graphene 204 as a conductive additive, active material particles 203, and a binder (not illustrated). The active material layer 202 may contain a conductive additive (not illustrated, also referred to as a second conductive additive) other than graphene.

As in the active material layer 202 illustrated in the top view in FIG. 2B, the active material particles 203 are coated with a plurality of sheets of the graphene 204. Each sheet of the graphene 204 is connected to a plurality of the active material particles 203. In particular, since the graphene 204 is in the form of a sheet, surface contact can be made so as to cover part of the surfaces of the active material particles 203. Unlike a conductive additive in the form of particles, such as acetylene black, which makes point contact with an active material, the graphene 204 is capable of surface contact with low contact resistance; accordingly, the electron conductivity of the active material particles 203 and the graphene 204 can be improved without increasing the amount of conductive additive.

Furthermore, surface contact is made between a plurality of sheets of the graphene 204. This is because graphene oxide with extremely high dispersibility in a polar solvent is used for formation of the graphene 204. A solvent is removed by volatilization from a disperse solution in which graphene oxide is uniformly dispersed, and the graphene oxide is reduced to graphene; hence, the sheets of the graphene 204 remaining in the active material layer 202 partly overlap with each other and are dispersed such that surface contact is made. Accordingly, an electric conduction path is formed.

In the top view of the active material layer 202 in FIG. 2B, the graphene 204 does not necessarily overlap with another graphene on a surface of the active material layer 202; part of the graphene 204 is provided between the active material layers 202. The graphene 204 is an extremely thin film (sheet) made of a single layer or stacked layers of carbon molecules and thus is in contact with part of the surfaces of the active material particles 203 so as to trace these surfaces. A portion of the graphene 204 that is not in contact with the active material particles 203 is warped between the active material particles 203 and crimped or stretched.

The longitudinal section of the active material layer 202 in FIG. 2C shows substantially uniform dispersion of the sheet-like graphene 204 in the active material layer 202. The graphene 204 is schematically shown by a heavy line in FIG. 2C but is actually a thin film having a thickness corresponding to the thickness of a single layer or a multiple layer of carbon molecules. As described using the top view of the active material layer 202, a plurality of sheets of the graphene 204 are formed so as to wrap or coat a plurality of the active material particles 203 and thus are in surface contact with the active material particles 203. Furthermore, a plurality of sheets of the graphene 204 are also in surface contact with each other; consequently, a plurality of sheets of the graphene 204 construct an electric conduction network. FIG. 3 is a schematic enlarged view of FIG. 2C. The graphene 204 coats the surfaces of a plurality of the active material particles 203 so as to cling to the surfaces, and a plurality of sheets of the graphene 204 are also in contact with each other; thus, the network is constructed.

As illustrated in FIG. 2B, FIG. 2C, and FIG. 3, a plurality of sheets of the graphene 204 are three-dimensionally dispersed throughout the active material layer 202 and in surface contact with each other, which constructs the three-dimensional electric conduction network. Furthermore, each sheet of the graphene 204 coats and makes surface contact with a plurality of the active material particles 203.

In a manufacturing method of a storage battery electrode to be described in Embodiment 2, graphene oxide is reduced by heating to form the graphene 204.

Note that graphene in this specification refers to single-layer graphene or multilayer graphene including two or more and hundred or less layers. Single-layer graphene refers to a one-atom-thick sheet of carbon molecules having π bonds. Graphene oxide refers to a compound formed by oxidation of such graphene. When graphene oxide is reduced to give graphene, oxygen contained in the graphene oxide is not entirely released and part of the oxygen may remain in graphene. With the manufacturing method of a storage battery electrode to be described in Embodiment 2, the graphene oxide can be reduced with high efficiency. In the case where graphene contains oxygen, the proportion of oxygen in the graphene, which is measured by X-ray photoelectron spectroscopy (XPS), is higher than or equal to 1 atomic % and lower than or equal to 20 atomic %, and preferably higher than or equal to 3 atomic % and lower than or equal to 10 atomic %. As described above, a plurality of sheets of the graphene 204 are three-dimensionally dispersed throughout the active material layer 202 and in surface contact with each other, which constructs the three-dimensional electric conduction network. The graphene oxide can be thus reduced with high efficiency, leading to lower internal impedance of the active material layer 202 and the electrode 200. Thus, rate characteristics of a storage battery including the electrode 200 can be improved.

Graphene oxide can be formed by an oxidation method called a Hummers method. In the Hummers method, a sulfuric acid solution of potassium permanganate, a hydrogen peroxide solution, and the like are mixed into graphite powder to cause an oxidation reaction; thus, a mixed solution containing graphite oxide is formed. Functional groups such as an epoxy group, a carbonyl group, a carboxyl group, or a hydroxyl group are bonded to carbon in the graphite oxide. Accordingly, the interlayer distance between a plurality of sheets of graphene in graphite oxide becomes longer than the interlayer distance in graphite, so that graphite oxide can be easily separated into thin pieces by interlayer separation. Then, ultrasonic vibration is applied to the mixed solution containing graphite oxide, so that graphite oxide whose interlayer distance is long can be cleaved to separate graphene oxide and to form a mixed solution containing graphene oxide. A solvent is removed from the mixed solution containing graphene oxide, so that powdery graphene oxide can be obtained.

The graphene oxide may be formed by adjusting the amount of an oxidizing agent such as potassium permanganate as appropriate. When the amount of the oxidizing agent with respect to the graphite powder is increased, for example, the degree of oxidation of the graphene oxide (the atomic ratio of oxygen to carbon) can be increased. The amount of the oxidizing agent with respect to the graphite powder, which is a raw material, can be determined depending on the amount of graphene oxide to be manufactured.

Note that the method for forming graphene oxide is not limited to the Hummers method using a sulfuric acid solution of potassium permanganate; for example, the Hummers method using nitric acid, potassium chlorate, nitric acid sodium, or the like or a method for forming graphene oxide other than the Hummers method may be employed as appropriate.

Graphite oxide may be separated into thin pieces by application of ultrasonic vibration, by irradiation with microwaves, radio waves, or thermal plasma, or by application of physical stress.

The formed graphene oxide includes an epoxy group, a carbonyl group, a carboxyl group, a hydroxyl group, or the like. In a polar solvent typified by NMP (also referred to as N-methylpyrrolidone, 1-methyl-2-pyrrolidone, N-methyl-2-pyrrolidone, or the like), oxygen in a functional group is negatively charged; thus, the graphene oxide interacts with the polar solvent. Meanwhile, different sheets of graphene oxide repel each other and thus are less likely to be aggregated. For this reason, the graphene oxide is easily dispersed uniformly throughout the polar solvent.

The length of one side (also referred to as a flake size) of the graphene oxide is greater than or equal to 50 nm and less than or equal to 100 μm, and preferably greater than or equal to 800 nm and less than or equal to 20 μm. The flake size of graphene in the active material layer can be adjusted by adjusting the flake size of the graphene oxide. When the flake size of the graphene is smaller than the average particle size of the active material particles 203, the surface contact between the graphene and a plurality of the active material particles 203 and connection between the sheets of graphene become difficult, resulting in difficulty in improving the electrical conductivity of the active material layer 202.

The binder has a function of constructing a network in the active material layer 202 to bind the active material particles 203, bind the active material particles 203 and the graphene 204, bind the graphene 204 and the graphene 204, and bind the active material layer 202 and the current collector 201. With the manufacturing method of an electrode to be described in Embodiment 2, the network constructed by the binder can be strong. Thus, connections between the active material particles 203, between the active material particles 203 and the graphene 204, between the graphene 204 and the graphene 204, and between the active material layer 202 and the current collector 201 can be strong.

When the electrode 200 is immersed in an electrolyte solution and charging and discharging are repeated, the binder might absorb the electrolyte solution and expand. As a result, the whole active material layer 202 might expand or change its shape. This becomes significant when the network by the binder in the active material layer 202 is damaged during the manufacturing process of the electrode. As described above, sheets of the graphene 204 three-dimensionally dispersed in the active material layer 202 are in surface contact with each other, which results in a three-dimensional electric conduction network. Furthermore, each sheet of the graphene 204 coats and makes surface contact with a plurality the active material particles 203. When expansion, deformation, or the like of the active material layer 202 occurs, the graphene 204 might be separated or apart from another sheet of the graphene 204 or the active material particles 203, the contact area might be reduced, or the graphene 204 or the active material particles 203 might be cracked or broken. Part of the three-dimensional electric conduction network in the active material layer 202 is cut as a result of the above factors and the performance of the electrode 200 is decreased, which might cause problems in that, for example, the discharge capacity of the battery is decreased or potential is decreased after repeating charging and discharging.

In the active material layer 202 included in the electrode 200 of one embodiment of the present invention, in contrast, a strong network is constructed by the binder. Thus, the active material layer 202 is less likely to expand or change its shape even when the binder expands by absorbing the electrolyte solution. As a result, even when the electrode 200 is immersed in the electrolyte solution and charging and discharging of the battery are repeated, the graphene 204 is less likely to be separated or apart from another sheet of the graphene 204 or the active material particles 203 in the active material layer 202, the contact area is less likely to be small, or the graphene 204 and the active material particles 203 are less likely to be cracked or broken. Accordingly, the three-dimensional electric conduction network is less likely to be cut and the performance of the electrode 200 is less likely to be decreased. For this reason, the discharge capacity and potential of a battery including the electrode 200 are less likely to be decreased even after charging and discharging are repeated. For these reasons, the cycle characteristics of the storage battery can be improved.

As the binder, polyvinylidene fluoride (PVdF) is used typically, and polyimide, polytetrafluoroethylene, polyvinyl chloride, an ethylene-propylene-diene polymer, styrene-butadiene rubber, acrylonitrile-butadiene rubber, fluorine rubber, polyvinyl acetate, polymethyl methacrylate, polyethylene, nitrocellulose, or the like can be used.

The active material particles 203 are made of secondary particles having an average diameter or a particle diameter distribution, which are obtained in such a way that material compounds are mixed at a predetermined ratio and baked and the resulting baked product is crushed, granulated, and classified by an appropriate means. Therefore, the shape of each of the active material particles 203 is not limited to such a spherical shape as is schematically illustrated in FIGS. 2B and 2C.

In the case of using the electrode 200 as a positive electrode of a storage battery, a material into and from which lithium ions can be inserted and extracted can be used for the active material particles 203. For example, a lithium-manganese composite oxide with an olivine crystal structure, a layered rock-salt crystal structure, or a spinel crystal structure can be used.

As an example of a lithium-containing complex phosphate with an olivine crystal structure, a composite phosphate represented by a general formula $LiMPO_4$ (M is one or more of Fe(II), Mn(II), Co(II), and Ni(II)) can be given. Typical examples of the general formula $LiMPO_4$ include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it properly has properties necessary for the active material, such as safety, stability, high capacity density, high potential, and the existence of lithium ions that can be extracted in initial oxidation (charging).

Examples of a lithium-containing complex silicate with a layered rock-salt crystal structure include $LiCoO_2$, $LiNiO_2$, $LiMnO_2$, $Li_2MnO_3$, a NiCo-based compound such as $LiNi_{0.8}Co_{0.2}O_2$ (general formula: $LiNi_xCo_{1-x}O_2$ (0<x<1)), a NiMn-based compound such as $LiNi_{0.5}Mn_{0.5}O_2$ (general formula: $LiNi_xMn_{1-x}O_2$ (0<x<1)), a NiMnCo-based compound such as $LiNi_{1/3}Mn_{1/3}Co_{1/3}O_2$ (also referred to as NMC, general formula: $LiNi_xMn_yCo_{1-x-y}O_2$ (x>0, y>0, x+y<1)), $Li(Ni_{0.8}Co_{0.15}Al_{0.05})O_2$, and $Li_2MnO_3$—$LiMO_2$ (M=Co, Ni, or Mn).

$LiCoO_2$ is particularly preferable because of its high capacity, and its stability in the air and thermal stability higher than those of $LiNiO_2$.

Examples of a lithium-manganese composite oxide with a spinel crystal structure include $LiMn_2O_4$, $Li_{1+x}Mn_{2-x}O_4$ (0<x<2), $LiMn_{2-x}Al_xO_4$ (0<x<2), and $LiMn_{1.5}Ni_{0.5}O_4$.

It is preferable to add a small amount of lithium nickel oxide ($LiNiO_2$ or $LiNi_{1-x}M_xO_2$ (0<x<1, M=Co, Al, or the like)) to the lithium-manganese composite oxide with a spinel crystal structure such as $LiMn_2O_4$, in which case the dissolution of manganese and the decomposition of an electrolyte solution can be suppressed, for example.

A composite oxide represented by a general formula $Li_{(2-j)}MSiO_4$ (M is one or more of Fe(II), Mn(II), Co(II), and Ni(II), 0≤j≤2) can also be used as the positive electrode active material. Typical examples of the general formula $Li_{(2-j)}MSiO_4$ include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

A nasicon compound represented by a general formula $A_xM_2(XO_4)_3$ (A=Li, Na, or Mg, M=Fe, Mn, Ti, V, Nb, or Al, and X=S, P, Mo, W, As, or Si) can also be used as the positive electrode active material. Examples of the nasicon compound include $Fe_2(MnO_4)_3$, $Fe_2(SO_4)_3$, and $Li_3Fe_2(PO_4)_3$. Alternatively, a compound represented by a general formula $Li_2MPO_4F$, $Li_2MP_2O_7$, or $Li_5MO_4$ (M=Fe or Mn), a perovskite fluoride such as $FeF_3$, a metal chalcogenide (a sulfide, a selenide, or a telluride) such as $TiS_2$ or $MoS_2$, a lithium-vanadium-containing composite oxide with an inverse spinel structure such as $LiMVO_4$, a vanadium oxide-based compound (such as $V_2O_5$, $V_6O_{13}$, or $LiV_3O_8$), a manganese oxide, an organic sulfur compound, or the like can be used as the positive electrode active material.

The particle diameter of the positive electrode active material is preferably, for example, greater than or equal to 5 nm and less than or equal to 100 μm.

As the positive electrode active material, a lithium-manganese composite oxide that is represented by a composition formula $Li_xMn_yM_zO_w$ can also be used. Here, the element M is preferably silicon, phosphorus, or a metal element other than lithium and manganese, and further preferably nickel. Note that it is preferable to satisfy 0≤x/(y+z)<2, 0<z, and 0.26≤(y+z)/w<0.5. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like. The lithium-manganese composite oxide preferably has a layered rock-salt crystal structure. The lithium-manganese composite oxide may have a layered rock-salt crystal structure and a spinel crystal structure. The average particle diameter of the lithium-manganese composite oxide is preferably greater than or equal to 5 nm and less than or equal to 50 μm, for example.

In the case where carrier ions are alkali metal ions other than lithium ions, or alkaline-earth metal ions, the positive electrode active material may contain, instead of lithium in the lithium compound or the lithium-manganese composite oxide, an alkali metal (e.g., sodium or potassium) or an alkaline-earth metal (e.g., calcium, strontium, barium, beryllium, or magnesium).

In the case where the storage battery electrode to be manufactured is used as a negative electrode of a storage battery, a material that enables charge-discharge reactions by an alloying reaction and a dealloying reaction with lithium can be used as the active material particles 203.

As an example of the material that enables charge-discharge reactions by an alloying reaction and a dealloying reaction with lithium, a carbon-based material can be given. Examples of the carbon-based material include graphite, graphitizing carbon (soft carbon), non-graphitizing carbon (hard carbon), a carbon nanotube, graphene, and carbon black.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are inserted into the graphite (while a lithium-graphite intercalation compound is formed). For this reason, a lithium-ion secondary battery can have a high operating voltage. Graphite is preferable also because of its advantages such as relatively high capacity per unit volume, small volume expansion, low cost, and safety greater than that of a lithium metal.

As the material that enables charge-discharge reactions by an alloying reaction and a dealloying reaction with lithium, a material containing at least one of Ga, Si, Al, Ge, Sn, Pb, Sb, Bi, Ag, Zn, Cd, In, and the like can also be given, for example. Such elements have higher capacity than carbon. In particular, silicon has a high theoretical capacity of 4200 mAh/g. Examples of the material containing such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, and $SbSn$.

As the negative electrode active material, an oxide such as SiO, SnO, $SnO_2$, titanium dioxide, a lithium titanium oxide, a lithium-graphite intercalation compound, niobium pentoxide, tungsten oxide, or molybdenum oxide can be used.

As the negative electrode active material, $Li_{3-x}M_xN$ (M=Co, Ni, or Cu) with a $Li_3N$ structure, which is a nitride containing lithium and a transition metal, can also be used. A lithium-ion secondary battery containing $Li_{2.6}Co_{0.4}N$, for example, is preferable because of its high charge and discharge capacity (900 mAh/g and 1890 $mAh/cm^3$).

A nitride containing lithium and a transition metal is preferably used, in which case lithium ions are contained in the negative electrode active material and thus the negative electrode active material can be used in combination with a material for the positive electrode active material which does not contain lithium ions, such as $V_2O_5$ or $Cr_3O_8$. In the case of using a material containing lithium ions as the positive electrode active material, the nitride containing lithium and a transition metal can be used as the negative electrode active material as long as the lithium ions contained in the positive electrode active material are extracted in advance.

A material which causes a conversion reaction can also be used as the negative electrode active material; for example, a transition metal oxide which does not cause an alloy reaction with lithium, such as cobalt oxide, nickel oxide, or iron oxide, may be used. An oxide such as $Fe_2O_3$, CuO, $Cu_2O$, $RuO_2$, or $Cr_2O_3$, a sulfide such as $CoS_{0.89}$, NiS, or CuS, a nitride such as $Zn_3N_2$, $Cu_3N$, or $Ge_3N_4$, a phosphide such as $NiP_2$, $FeP_2$, or $CoP_3$, or a fluoride such as $FeF_3$ or $BiF_3$ can also be used as the material which causes a conversion reaction.

The average particle diameter of the primary particles of the active material particles 203, when measured using a laser diffraction particle size analyzer, for example, is preferably less than or equal to 500 nm, and further preferably greater than or equal to 50 nm and less than or equal to 500 nm. To make surface contact with a plurality of the active material particles 203, the graphene 204 has sides the length of each of which is preferably greater than or equal to 50 nm and less than or equal to 100 µm, and further preferably greater than or equal to 800 nm and less than or equal to 20 µm.

The active material layer 202 may contain the second conductive additive. The graphene has a flake-like shape and is likely to be placed in a direction substantially parallel to the surface of the current collector 201 in the active material layer 202. In the case where the active material layer 202 contains the graphene and the second conductive additive, the three-dimensional electric conduction network constructed by the active material and the graphene is reinforced and thus can have a complex shape. Thus, the electric conduction paths in the active material layer 202 can be prevented from being cut while the power storage device is used. Furthermore, the electric conduction paths can be made less likely to be cut even when the thickness of the active material layer 202 is large.

For the second conductive additive, natural graphite, artificial graphite such as meso-carbon microbeads, or carbon fiber can be used. Alternatively, metal powder or metal fiber of copper, nickel, aluminum, silver, gold, or the like, a conductive ceramic material, or the like can be used.

Examples of carbon fiber include mesophase pitch-based carbon fiber, isotropic pitch-based carbon fiber, carbon nanofiber, carbon nanotube, and vapor-grown carbon fiber (VGCF, registered trademark). The representative values of VGCF (registered trademark) are as follows: the fiber diameter is 150 nm; the fiber length is greater than or equal to 10 µm and less than or equal to 20 µm; the real density is 2 $g/cm^3$; and the specific surface area is 13 $m^2/g$. Note that the fiber diameter is, when a cross section perpendicular to a fiber axis is regarded as a cutting plane in a two-dimensional image obtained with a scanning electron microscope (SEM), a diameter of a perfect circle that circumscribes the cutting plane. The real density is a density calculated using a volume occupied by a substance itself. The specific surface area is the surface area of an object per unit mass or per unit volume.

Note that needle-like VGCF (registered trademark) has an excellent electrical characteristic of high conductivity and an excellent physical property of high mechanical strength. For this reason, the use of VGCF (registered trademark) as the conductive additive can increase the points and the area where the active materials are electrically in contact with each other.

Alternatively, a particle-like material can be used for the conductive additive. A typical example of the particle-like material is carbon black, such as acetylene black or ketjen black (registered trademark), whose diameter is greater than or equal to 3 nm and less than or equal to 500 nm.

A flake-like, needle-like, or fiber-like conductive additive has a function of binding the active materials and inhibits deterioration of a battery. Such a conductive additive also functions as a structure body for maintaining the shape of the active material layer 202 or cushioning. Thus, separation between the current collector and the active materials is less likely to occur even when a secondary battery is changed in its form by being bent or by repeated expansion and contraction of the active materials. Although carbon black such as acetylene black or ketjen black (registered trademark) may be used instead of the above material, VGCF (registered trademark) is preferably used because the strength for keeping the shape of the active material layer 202 can be increased. When the strength for keeping the shape of the active material layer 202 is high, deterioration of the secondary battery caused by changes in its form (e.g., bending) can be prevented.

The above-described active material layer 202 preferably contains, with respect to the total weight of the active material layer 202, the active material particles 203 at greater than or equal to 80 wt % and less than or equal to 95 wt %, the graphene at greater than or equal to 0.1 wt % and less than or equal to 8 wt %, and the binder at greater than or equal to 1 wt % and less than or equal to 10 wt %. In the case where the active material layer 202 contains the second conductive additive, the sum of the weight ratio of the graphene and the weight ratio of the second conductive additive is preferably greater than or equal to 0.1 wt % and less than or equal to 8 wt % with respect to the total weight of the active material layer 202.

As described in this embodiment, the sheets of the graphene 204 larger than the average particle diameter of the active material particles 203 are dispersed throughout the active material layer 202 such that one sheet of the graphene 204 makes surface contact with one or more adjacent sheets of the graphene 204, and the sheets of the graphene 204 make surface contact so as to wrap part of the surfaces of the active material particles 203. Consequently, with a small amount of a conductive additive, a storage battery electrode including a high-density active material layer which is highly filled can be provided.

This embodiment can be implemented in combination with any of the other embodiments as appropriate.

Embodiment 2

In this embodiment, a method for manufacturing the electrode 200 including the active material layer 202 by using the active material, the conductive additive, and the binder that are described in Embodiment 1 as examples will be described with reference to FIG. 1.

First, a paste containing an active material, a binder, graphene oxide, and a solvent is formed (Step S101). The paste may contain a second conductive additive. An example of a method for forming the paste is described below. First, graphene oxide is dispersed into the solvent. When the ratio of the weight of the graphene oxide to that of the paste (the total weight of the active material, the graphene oxide, and the binder) is lower than 0.2 wt %, the conductivity is decreased when the active material layer 202 is formed. When the weight ratio of the graphene oxide exceeds 16 wt %, although it depends on the diameter of the active material particle, the viscosity of the paste is increased. When the solvent contained in the paste is evaporated after the paste is applied to the current collector 201, convection is generated in the paste by heating and thin and lightweight graphene oxide moves or is aggregated, whereby the active material layer 202 might be cracked or separated from the current collector 201. Thus, the weight ratio of the graphene oxide to the paste may be higher than or equal to 0.2 wt % and lower than or equal to 16 wt %. Note that the graphene oxide is reduced by a later heat treatment step to give the graphene and the weight is reduced by almost half, and consequently the weight ratio of the graphene in the active material layer 202 becomes higher than or equal to 0.1 wt % and lower than or equal to 8 wt %.

A polar solvent can be used as the solvent. For example, a polar solvent containing one of methanol, ethanol, acetone, tetrahydrofuran (THF), dimethylformamide (DMF), N-methylpyrrolidone (NMP), and dimethyl sulfoxide (DMSO) or a mixed solution of two or more of the above can be used. It is particularly preferable to use NMP because graphene oxide can be well dispersed therein.

Next, the active material is added. The average particle diameter of the primary particles of the active material is preferably greater than or equal to 50 nm and less than or equal to 500 nm.

Next, a mixture of the above is kneaded (mixed in a highly viscous state), so that the cohesion of the graphene oxide and the active material can be weakened. Since oxygen in a functional group of the graphene oxide is negatively charged in the polar solvent, different sheets of graphene oxide are unlikely to be aggregated. In addition, the graphene oxide strongly interacts with the active material. Hence, the graphene oxide can be further uniformly dispersed throughout the active material layer.

Then, a binder is added to the mixture. The weight of the binder is determined depending on the weight of graphene oxide and that of the active material; the binder is added so that the weight ratio of the binder to the paste is higher than or equal to 1 wt % and lower than or equal to 5 wt %. The binder is added while the graphene oxide is uniformly dispersed to be in surface contact with a plurality of the active material particles, so that the active material particles and the graphene oxide can be bound to each other with the graphene oxide kept dispersed. Although the binder is not necessarily added depending on the ratio of the active material and the graphene oxide, adding the binder can enhance the strength of the electrode.

Next, the solvent is added to the mixture until the mixture has a predetermined degree of viscosity and mixing is performed, whereby the paste can be formed. Through the above steps, the paste in which the graphene oxide, the active material, and the binder are uniformly mixed can be formed.

Then, the paste is applied to one or both surfaces of the current collector 201 (Step S102). The paste can be applied to the current collector by a roll coating method using an applicator roll or the like, a screen printing method, a doctor blade method, or a coating method such as a spin coating method or a bar coating method.

After that, a solvent contained in the paste applied to the current collector 201 is evaporated, so that the active material layer is formed (Step S103). The solvent is evaporated by heating at a temperature higher than or equal to 40° C. and lower than or equal to 170° C., preferably higher than or equal to 60° C. and lower than or equal to 100° C., for longer than or equal to 1 minute and shorter than or equal to 10 hours. The current collector 201 may also be heated with the paste. Note that there is no particular limitation on the atmosphere.

In the active material layer formed by evaporating the solvent contained in the paste, the binder constructs a network that binds the active material and the graphene oxide.

Next, the active material layer is immersed in a liquid containing alcohol (Step S104). The current collector as well as the active material layer may be immersed in the liquid. The liquid containing alcohol is preferably at a temperature higher than or equal to its melting point and lower than or equal to its boiling point, and further preferably higher than or equal to 40° C. and lower than or equal to 70° C. This step is preferably performed for longer than or equal to 1 minute and shorter than or equal to 1 hour.

Examples of alcohol include methanol, ethanol, 1-propanol, 2-propanol, 1-butanol, 2-butanol, isobutyl alcohol, and tert-butyl alcohol. Alcohol with a low boiling point is preferable because it is easily evaporated. Alcohol having a high reducing property is also preferable because the graphene oxide can be easily reduced. Thus, ethanol, 1-propanol, 1-butanol, or the like is preferably used.

The liquid containing alcohol may contain water, a stabilizer, or the like. The liquid may be a mixed solution of two or more kinds of alcohol or a mixed solution containing an organic solvent other than alcohol.

If the active material layer is immersed into a solution containing a reducing agent (also referred to as a reducing solution) at this time, the graphene oxide can be reduced in this step. Examples of the reducing agent are ascorbic acid, hydrazine, dimethyl hydrazine, hydroquinone, sodium boron hydride ($NaBH_4$), lithium aluminum hydride ($LiAlH_4$), and N,N-diethylhydroxylamine.

A polar solvent can be used as the solvent of the reducing solution. For example, a polar solvent containing one of water, methanol, ethanol, acetone, tetrahydrofuran (THF), dimethylformamide (DMF), N-methylpyrrolidone (NMP), and dimethyl sulfoxide (DMSO) or a mixed solution of two or more of the above can be used.

Note that in the case where the graphene oxide is reduced using the reducing solution, the active material layer might be unintentionally damaged. For example, the reducing agent might react with a material other than the graphene oxide in the active material layer, or a compound that is formed as a result of the reduction of the solvent by the reducing agent might react with a material contained in the active material layer.

In the case of using the reducing solution, the solution becomes acidic or basic depending on the property of the reducing agent. Thus, a pH adjuster needs to be added to adjust the pH of the solution, in which case a process becomes complicated. In some cases, it is difficult to keep the pH of the solution constant. When the pH of the solution cannot be kept constant, a material contained in the active material layer might be damaged. For example, in the case of using an acidic reducing solution, the active material layer is likely to be damaged when it contains a material unstable to acid or a material that easily reacts with acid. In the case of using a basic reducing solution, for example, the active material layer is likely to be damaged when it contains a material unstable to a base or a material that easily reacts with a base. In addition, the use of the above-described strong reducing agent might cause an unexpected reaction or damage in the active material layer. Note that examples of an active material unstable to acid include a positive electrode active material, and examples of a binder that easily reacts with a base include PVdF.

When the active material layer is immersed into the reducing solution, the binder contained in the active material layer absorbs the solvent, resulting in expansion or deformation. A reducing solution whose solvent is water is easily absorbed by the binder because the water molecules are small. A reducing solution whose solvent is an aprotic polar solvent such as NMP is easily absorbed by the binder such as PVdF because of its high affinity for the binder. Thus, the expansion or deformation of the binder is significant when the solvent of the reducing solution is water, NMP, or the like. The expansion or deformation of the binder might cause cut or breakage of the network by the binder that binds the active material and the graphene oxide in the active material layer. In that case, the active material layer might expand as the binder expands or changes its shape. The reduction of the graphene oxide in the expanded active material layer makes it difficult to construct a three-dimensional electric conduction network in the active material layer in some cases. Even when a three-dimensional electric conduction network is constructed in the active material layer despite the reduction of the graphene oxide in the swelled active material layer, the active material layer shrinks in the subsequent step for evaporating the solvent, in which case the electric conduction network might be damaged.

When the active material layer damaged by the above factors is immersed in the electrolyte solution or the like, the active material layer expands or changes its shape and the electric conduction network constructed in the active material layer is easily cut.

In Step S104, in contrast, the graphene oxide is reduced by heating the active material layer that had been immersed in the liquid containing alcohol; thus, the active material layer does not need to be immersed in the reducing solution. Alcohol can promote the reduction of graphene oxide, which is easily reduced; on the other hand, alcohol is less likely to promote the reduction of a material for the active material, the binder, or the like or to react with the material, for example. Accordingly, the active material layer is less likely to be damaged. Furthermore, since alcohol is neutral, the active material layer is less likely to be damaged by acid or a base even when the active material layer contains a material unstable to acid or a base or a material that easily reacts with acid or a base. In addition, the liquid containing alcohol does not require the pH adjustment or the like; thus, Step S104 is simple.

The binder is less likely to absorb alcohol, or less likely to expand even when absorbing alcohol. Accordingly, the expansion of the binder due to absorption of a solvent can be prevented. As a result, the network constructed by the binder can be prevented from being cut or broken before the reduction of the graphene oxide. In addition, the active material layer can be prevented from expanding or shrinking before or after the reduction of the graphene oxide. Accordingly, the three-dimensional electric conduction network constructed by graphene can be prevented from being broken by the expansion or shrinkage of the active material layer.

Next, the active material layer is taken out from the liquid containing alcohol and heated to reduce the graphene oxide (Step S105). The current collector as well as the active material layer may be heated at this time. There is no particular limitation on the atmosphere. The heating is performed at a temperature higher than or equal to room temperature and lower than or equal to 200° C., preferably higher than or equal to 60° C. and lower than or equal to 170° C. and further preferably higher than or equal to 80° C. and lower than or equal to 150° C., for longer than or equal to 1 hour and shorter than or equal to 30 hours to reduce the graphene oxide and evaporate alcohol contained in the active material layer. Since alcohol promotes the reduction of the graphene oxide by heat in this step, the reduction efficiency of the graphene oxide can be increased. As a result, an electrode having low internal impedance can be manufactured.

As described in this embodiment, one embodiment of the present invention allows the reduction of the graphene oxide without immersing the active material layer in the reducing solution. In other words, the graphene oxide can be reduced under mild conditions. Accordingly, damage to the active material layer due to the reduction reaction can be reduced. As a result, an electrode in which electric conduction paths are less likely to be cut even when immersed in an electrolyte solution can be manufactured. In addition, since alcohol promotes the reduction of the graphene oxide by heat, the reduction efficiency of the graphene oxide by heat can be increased. As a result, an electrode having low internal impedance can be manufactured. Thus, when a storage battery is manufactured using the manufacturing method of an electrode described in this embodiment, cycle characteristics of the storage battery can be improved. Furthermore, rate characteristics of the storage battery can be improved.

In Embodiment 2, one embodiment of the present invention has been described. Other embodiments of the present invention are described in Embodiments 1 and 3 to 7. Note that one embodiment of the present invention is not limited thereto. That is, various embodiments of the invention are described in Embodiments 1 and 3 to 7, and thus one embodiment of the present invention is not limited to a specific embodiment. Although the case where graphene is used for a storage battery electrode is described as an example of one embodiment of the present invention, one embodiment of the present invention is not limited to the case. Depending on circumstances or conditions, graphene or graphene oxide can be used for any of the following components: an electrode for a supercapacitor that has extremely high capacitance; an oxygen-reduction electrode catalyst; a material of a dispersion liquid with lower friction than a lubricant; a transparent electrode for a display device or a solar battery; a gas-barrier material; a polymer material with high mechanical strength and lightweight; a material for a sensitive nanosensor for sensing uranium or plutonium contained in radiation-tainted water; and a material used for removing a radioactive material. Depending on circumstances or conditions, for example, graphene is not necessarily used for the storage battery electrode in one embodiment of the present invention.

This embodiment can be implemented in combination with any of the other embodiments as appropriate.

Embodiment 3

In this embodiment, the structure of a storage battery including a storage battery electrode manufactured by the manufacturing method described in Embodiment 2 will be described with reference to FIGS. 4A and 4B, FIG. 5, FIGS. 6A and 6B, and FIGS. 7A and 7B.

(Coin-Type Storage Battery)

Figure 4A:
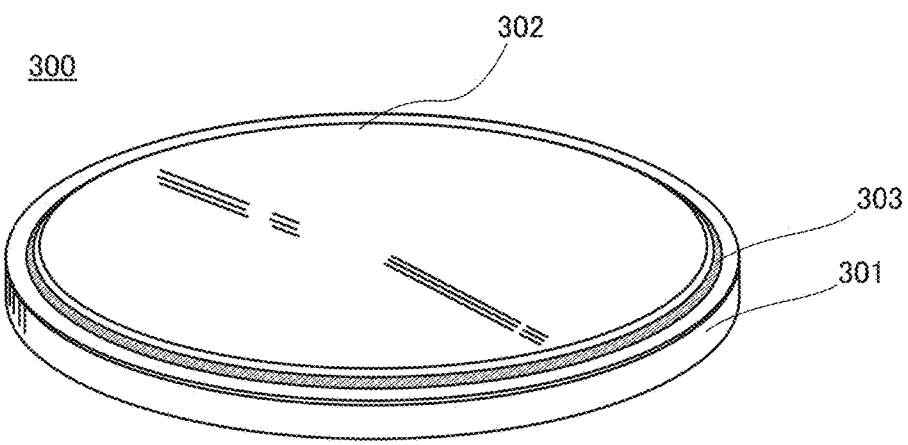
FIGS. 4A and 4B illustrate a coin-type storage battery.
Figure 4B:
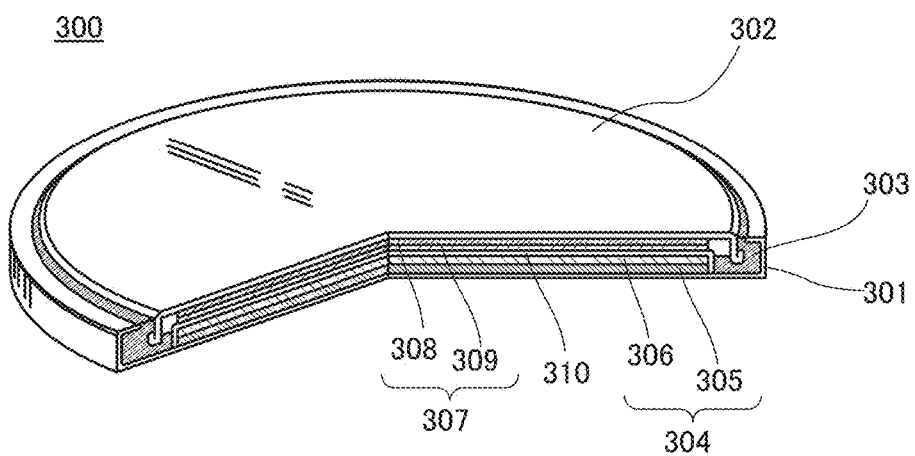

FIG. 4A is an external view of a coin-type (single-layer flat type) storage battery, and FIG. 4B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308. A separator 310 and an electrolytic solution (not illustrated) are provided between the positive electrode active material layer 306 and the negative electrode active material layer 309.

At least one of the positive electrode 304 and the negative electrode 307 can be manufactured by the manufacturing method of a storage battery electrode of one embodiment of the present invention, which is described in Embodiment 2.

Described is the structure of the positive electrode active material layer 306 or the negative electrode active material layer 309 in the case where the manufacturing method of a storage battery electrode described in Embodiment 2 is not used for one of the positive electrode 304 and the negative electrode 307.

The positive electrode active material layer 306 may further include a binder for increasing adhesion of positive electrode active materials, a conductive additive for increasing the conductivity of the positive electrode active material layer 306, and the like in addition to the positive electrode active materials.

For the positive electrode active material, the binder, and the conductive additive, any of the materials described in Embodiment 1 can be used.

The negative electrode active material layer 309 may further include a binder for increasing adhesion of the negative electrode active material, a conductive additive for increasing the conductivity of the negative electrode active material layer 309, and the like in addition to the above negative electrode active material.

For the negative electrode active material, the binder, and the conductive additive, any of the materials described in Embodiment 1 can be used.

Furthermore, a coating film of oxide or the like may be formed on the surface of the negative electrode active material layer 309. A coating film formed by decomposition of an electrolytic solution or the like in charging cannot release electric charges used at the time of forming the coating film, and therefore forms irreversible capacity. In contrast, the coating film of oxide or the like provided on the surface of the negative electrode active material layer 309 in advance can reduce or prevent generation of irreversible capacity.

As the coating film covering the negative electrode active material layer 309, an oxide film of any one of niobium, titanium, vanadium, tantalum, tungsten, zirconium, molybdenum, hafnium, chromium, aluminum, and silicon or an oxide film containing any one of these elements and lithium can be used. The coating film is much denser than a conventional film formed on a surface of a negative electrode due to a decomposition product of an electrolytic solution.

For example, niobium pentoxide ($Nb_2O_5$) has a low electric conductivity of $10^{-9}$ S/cm and a high insulating property. For this reason, a niobium oxide film inhibits an electrochemical decomposition reaction of the electrolyte solution or the like which is caused by contact between the negative electrode active material and the electrolyte solution in charging. On the other hand, niobium oxide has a lithium diffusion coefficient of $10^{-9}$ $cm^2$/sec and high lithium ion conductivity. Therefore, niobium oxide can transmit lithium ions. Alternatively, silicon oxide or aluminum oxide may be used.

A sol-gel method can be used to coat the negative electrode active material layer 309 with the coating film, for example. The sol-gel method is a method for forming a thin film in such a manner that a solution of metal alkoxide, a metal salt, or the like is changed into a gel, which has lost its fluidity, by a hydrolysis reaction or a polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solution, the active material can be easily dispersed into the gel. In such a manner, the coating film can be formed on the surface of the negative electrode active material layer 309. A decrease in the capacity of the power storage unit can be prevented by using the coating film.

As the separator 310, an insulator including pores, such as cellulose (paper), polyethylene, or polypropylene can be used.

As an electrolyte solution, as well as an electrolytic solution containing a supporting electrolyte, a solid electrolyte or a gel electrolyte obtained by gelation of part of an electrolytic solution can be used.

As a supporting electrolyte, a material which contains carrier ions can be used. Typical examples of the supporting electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio.

Note that when carrier ions are alkali metal ions other than lithium ions or alkaline-earth metal ions, instead of lithium in the above lithium salts, an alkali metal (e.g., sodium or potassium), an alkaline-earth metal (e.g., calcium, strontium, barium, beryllium, or magnesium) may be used for the electrolyte.

As a solvent of the electrolytic solution, a material in which carrier ions can move can be used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Further, the storage battery can be thinner and more lightweight. Typical examples of gelled high-molecular materials include a silicone gel, an acrylic gel, an acrylonitrile gel, polyethylene oxide-based gel, polypropylene oxide-based gel, a fluorine-based polymer gel, and the like. Alternatively, the use of one or more of ionic liquids (particularly, room temperature molten salts) which have features of non-flammability and non-volatility as a solvent of the electrolytic solution can prevent the storage battery from exploding or catching fire even when the storage battery internally shorts out or the internal temperature increases owing to overcharging or the like. An ionic liquid contains a cation and an anion. Examples of an organic cation included in an ionic liquid include aliphatic onium cations such as a quaternary ammonium cation, a tertiary sulfonium cation, and a quaternary phosphonium cation, and aromatic cations such as an imidazolium cation and a pyridinium cation. Examples of the anion included in the ionic liquid include a monovalent amide-based anion, a monovalent methide-based anion, a fluorosulfonate anion, a perfluoroalkylsulfonate anion, tetrafluoroborate, perfluoroalkylborate, hexafluorophosphate, and perfluoroalkylphosphate.

Instead of the electrolytic solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator or a spacer is not necessary. Further, the battery can be entirely solidified; therefore, there is no possibility of liquid leakage and thus the safety of the battery is dramatically increased.

For the positive electrode can 301 and the negative electrode can 302, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. The positive electrode can 301 and the negative electrode can 302 are electrically connected to the positive electrode 304 and the negative electrode 307, respectively.

The negative electrode 307, the positive electrode 304, and the separator 310 are immersed in the electrolyte. Then, as illustrated in FIG. 4B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

(Laminated Storage Battery)

Figure 5:
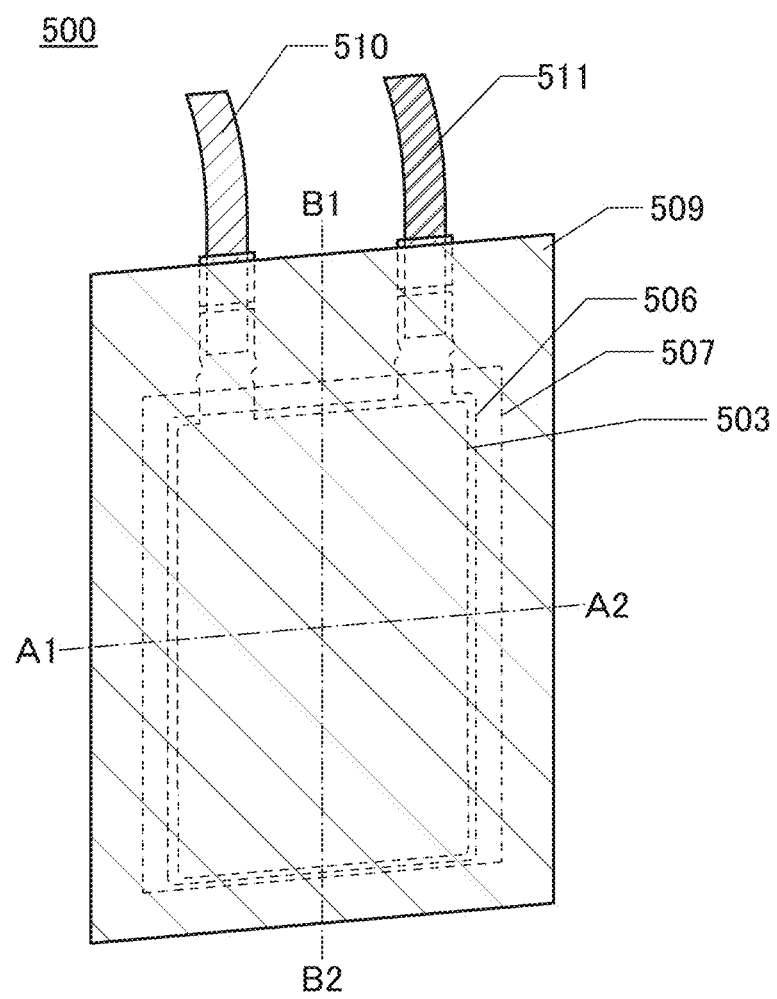
FIG. 5 illustrates a laminated storage battery.
Figure 6A:
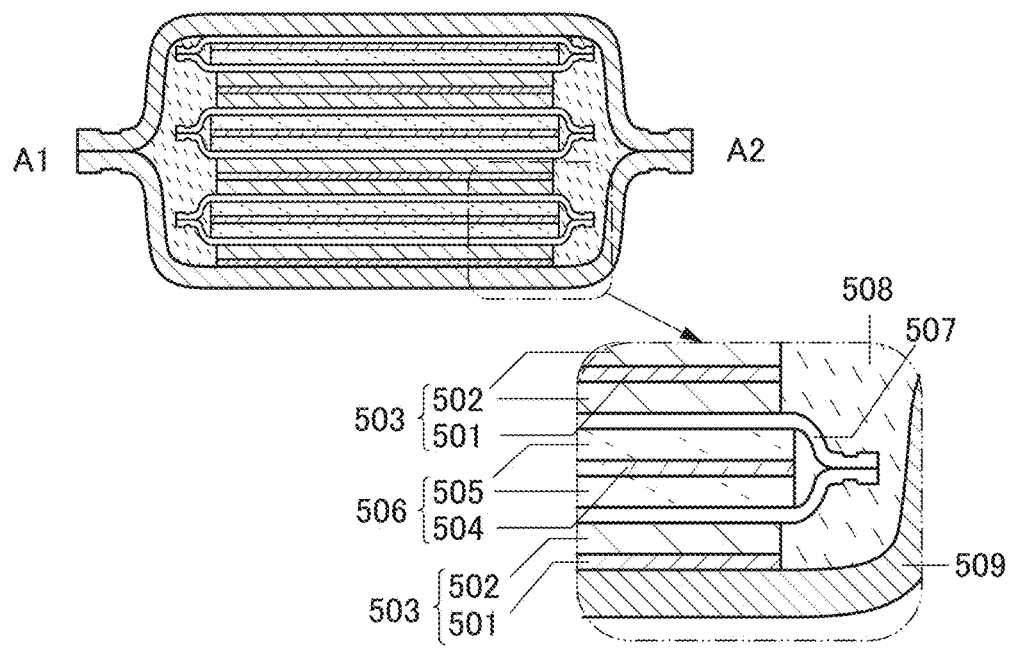
FIGS. 6A and 6B illustrate a laminated storage battery.
Figure 6B:
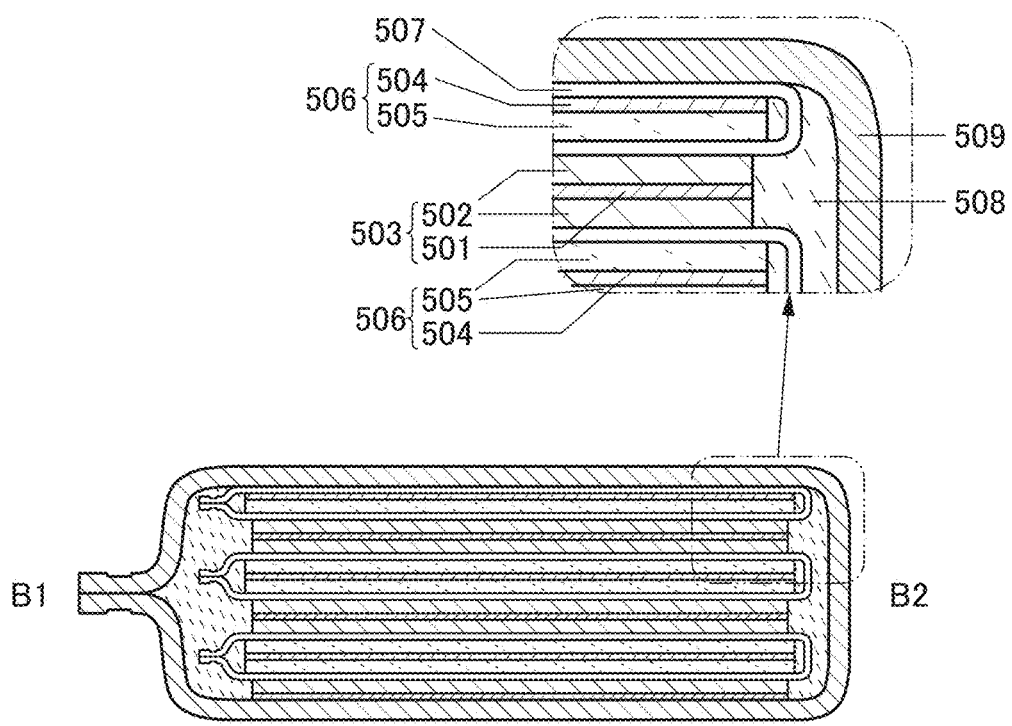

FIG. 5 is an external view of a laminated storage battery 500. FIGS. 6A and 6B are cross-sectional views along dashed-dotted lines A1-A2 and B1-B2, respectively, in FIG. 5. The laminated storage battery 500 is formed with a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506. The electrolytic solution 508 is provided in the region surrounded by the exterior body 509.

In the laminated storage battery 500 illustrated in FIG. 5, the positive electrode current collector 501 and the negative electrode current collector 504 also function as terminals for electrical contact with an external portion. For this reason, each of the positive electrode current collector 501 and the negative electrode current collector 504 is provided so as to be partly exposed to the outside of the exterior body 509.

As the exterior body 509 in the laminated storage battery 500, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used. With such a three-layer structure, permeation of an electrolytic solution and a gas can be blocked and an insulating property and resistance to the electrolytic solution can be obtained.

(Cylindrical Storage Battery)

Figure 7A:
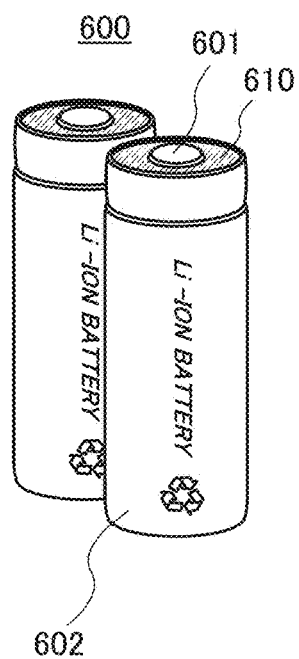
FIGS. 7A and 7B illustrate cylindrical storage batteries.

Next, an example of a cylindrical storage battery will be described with reference to FIGS. 7A and 7B. As illustrated in FIG. 7A, a cylindrical storage battery 600 includes a positive electrode cap (battery cap) 601 on the top surface and a battery can (outer can) 602 on the side surface and bottom surface. The positive electrode cap and the battery can 602 are insulated from each other by a gasket (insulating gasket) 610.

Figure 7B:
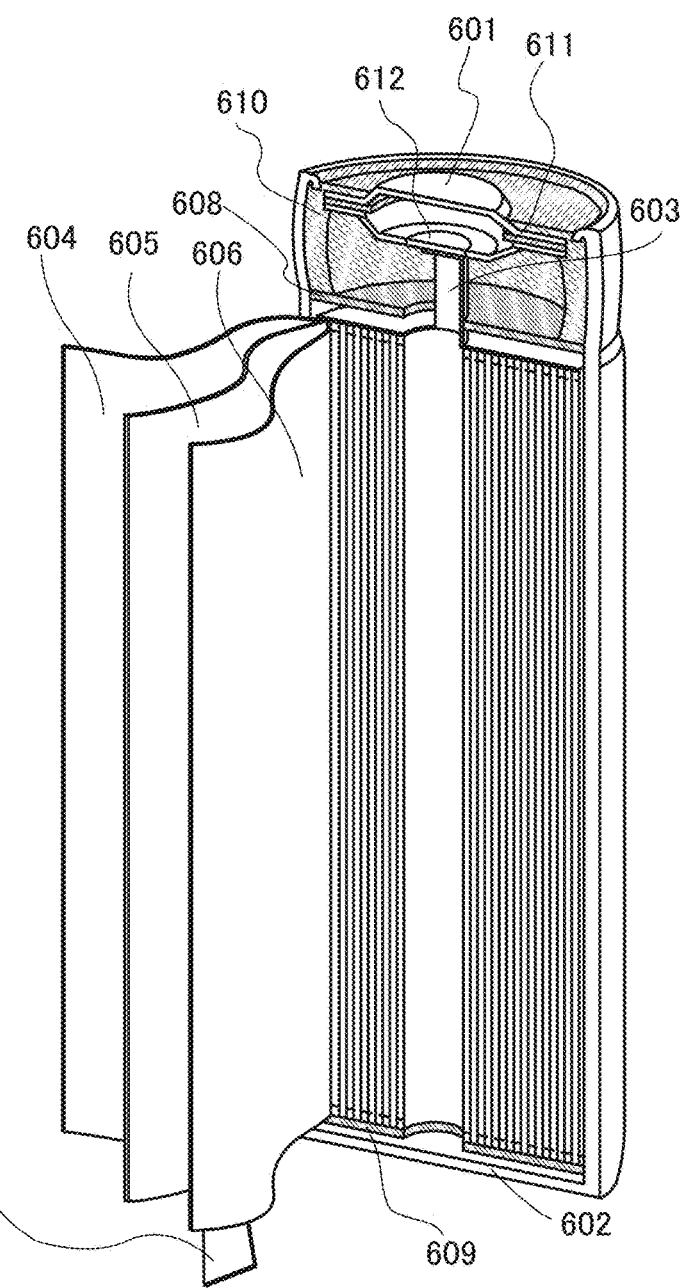

FIG. 7B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is closed and the other end thereof is open. For the battery can 602, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. Inside the battery can 602, the battery element in which the positive electrode, the negative electrode, and the separator are wound is interposed between a pair of insulating plates 608 and 609 which face each other. Further, a nonaqueous electrolytic solution (not illustrated) is injected inside the battery can 602 provided with the battery element. As the nonaqueous electrolytic solution, a nonaqueous electrolytic solution which is similar to those of the above coin-type storage battery and the laminated storage battery can be used.

The positive electrode 604 and the negative electrode 606 can be manufactured in a manner similar to that of the positive electrode and the negative electrode of the coin-type storage battery described above except that active materials are formed on both sides of the current collectors owing to the winding of the positive electrode and the negative electrode of the cylindrical storage battery. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. Further, the PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic or the like can be used for the PTC element.

Note that in this embodiment, the coin-type storage battery, the laminated storage battery, and the cylindrical storage battery are given as examples of the storage battery; however, any of storage batteries with a variety of shapes, such as a sealed storage battery and a square-type storage battery, can be used. Further, a structure in which a plurality of positive electrodes, a plurality of negative electrodes, and a plurality of separators are stacked or wound may be employed.

As the positive electrodes and the negative electrodes of the coin-type storage battery 300, the storage battery 500, and the storage battery 600, which are described in this embodiment, electrodes formed by the manufacturing method of a storage battery electrode of one embodiment of the present invention are used. Thus, the discharge capacity of the coin-type storage battery 300, the storage battery 500, and the storage battery 600 can be increased.

In this embodiment, one embodiment of the present invention has been described. Note that one embodiment of the present invention is not limited thereto. In other words, since various embodiments of the invention are described in this embodiment, one embodiment of the present invention is not limited to a particular embodiment. Although an example of application to a lithium-ion secondary battery is described as one embodiment of the present invention, one embodiment of the present invention is not limited to this example. Depending on circumstances or conditions, one embodiment of the present invention can be used for a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, and a silver oxide-zinc storage battery, or a primary battery, a capacitor, or a lithium ion capacitor. Alternatively, one embodiment of the present invention can be used for a solid-state battery or an air battery. Depending on circumstances or conditions, for example, one embodiment of the present invention is not necessarily applied to a lithium-ion secondary battery.

This embodiment can be implemented in combination with any of the other embodiments as appropriate.

Embodiment 4

A storage battery including the storage battery electrode of one embodiment of the present invention can be used for power supplies of a variety of electric devices driven by electric power.

Specific examples of electric devices each utilizing a storage battery including the storage battery electrode of one embodiment of the present invention are as follows: display devices of televisions, monitors, and the like, lighting devices, desktop personal computers and notebook personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, mobile phones, car phones, portable game machines, calculators, portable information terminals, electronic notebooks, e-book readers, electronic translators, audio input devices, video cameras, digital still cameras, toys, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electrical tools such as a chain saw, smoke detectors, and medical equipment such as dialyzers. Further, industrial equipment such as guide lights, traffic lights, conveyor belts, elevators, escalators, industrial robots, power storage systems, and power storage devices for leveling the amount of power supply and smart grid can be given. In addition, moving objects driven by electric motors using electric power from the storage batteries are also included in the category of electric devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the electric devices, the storage battery including the storage battery electrode of one embodiment of the present invention can be used as a main power supply for supplying enough electric power for almost the whole power consumption. Alternatively, in the electric devices, the storage battery including the storage battery electrode of one embodiment of the present invention can be used as an uninterruptible power supply which can supply electric power to the electric devices when the supply of electric power from the main power supply or a commercial power supply is stopped. Still alternatively, in the electric devices, the storage battery including the storage battery electrode of one embodiment of the present invention can be used as an auxiliary power supply for supplying electric power to the electric devices in parallel with the power supply from the main power supply or a commercial power supply.

Figure 8:
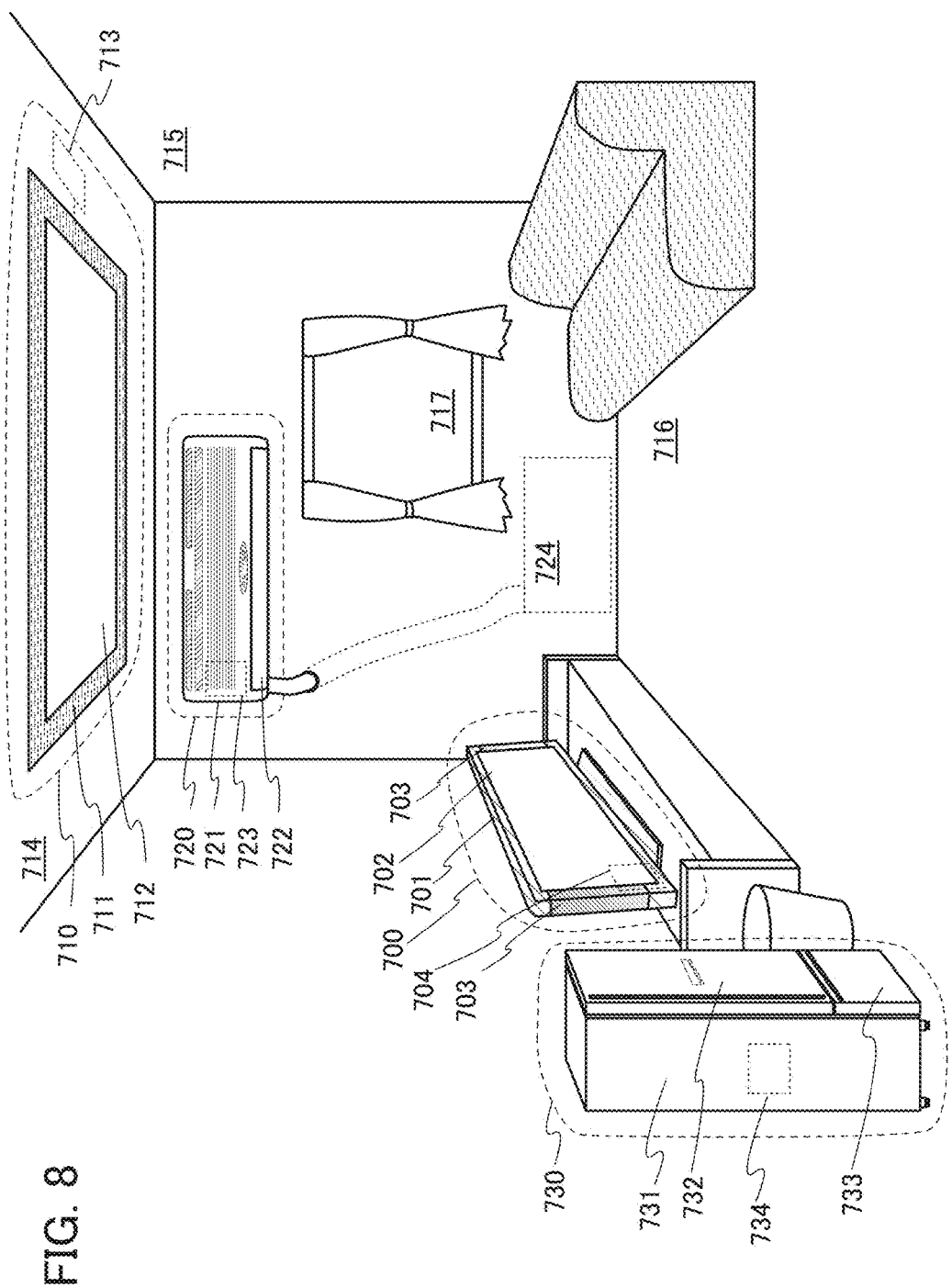
FIG. 8 illustrates examples of electric devices.

FIG. 8 illustrates specific structures of the electric devices. In FIG. 8, a display device 700 is an example of an electric device including a storage battery 704 including the storage battery electrode of one embodiment of the present invention. Specifically, the display device 700 corresponds to a display device for TV broadcast reception and includes a housing 701, a display portion 702, speaker portions 703, and the storage battery 704. The storage battery 704 including the storage battery electrode of one embodiment of the present invention is provided in the housing 701. The display device 700 can receive electric power from a commercial power supply. Alternatively, the display device 700 can use electric power stored in the storage battery 704. Thus, the display device 700 can be operated with the use of the storage battery 704 including the storage battery electrode of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 702.

Note that the display device includes, in its category, all of information display devices for personal computers, advertisement displays, and the like besides for TV broadcast reception.

In FIG. 8, an installation lighting device 710 is an example of an electric device including a storage battery 713 including the storage battery electrode of one embodiment of the present invention. Specifically, the lighting device 710 includes a housing 711, a light source 712, and the storage battery 713. Although FIG. 8 illustrates the case where the storage battery 713 is provided in a ceiling 714 on which the housing 711 and the light source 712 are installed, the storage battery 713 may be provided in the housing 711. The lighting device 710 can receive electric power from a commercial power supply. Alternatively, the lighting device 710 can use electric power stored in the storage battery 713. Thus, the lighting device 710 can be operated with the use of the storage battery 713 including the storage battery electrode of one embodiment of the present invention as an uninterruptible power supply even when electric power cannot be supplied from a commercial power supply due to power failure or the like.

Note that although the installation lighting device 710 provided in the ceiling 714 is illustrated in FIG. 8 as an example, the storage battery including the storage battery electrode of one embodiment of the present invention can be used in an installation lighting device provided in, for example, a wall 715, a floor 716, a window 717, or the like other than the ceiling 714. Alternatively, the storage battery including the storage battery electrode of one embodiment of the present invention can be used in a tabletop lighting device or the like.

As the light source 712, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 8, an air conditioner including an indoor unit 720 and an outdoor unit 724 is an example of an electric device including a storage battery 723 including the storage battery electrode of one embodiment of the present invention. Specifically, the indoor unit 720 includes a housing 721, an air outlet 722, and the storage battery 723. Although FIG. 8 illustrates the case where the storage battery 723 is provided in the indoor unit 720, the storage battery 723 may be provided in the outdoor unit 724. Alternatively, the storage batteries 723 may be provided in both the indoor unit 720 and the outdoor unit 724. The air conditioner can receive electric power from a commercial power supply. Alternatively, the air conditioner can use electric power stored in the storage battery 723. Particularly in the case where the storage batteries 723 are provided in both the indoor unit 720 and the outdoor unit 724, the air conditioner can be operated with the use of the storage battery 723 including the storage battery electrode of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 8 as an example, the storage battery including the storage battery electrode of one embodiment of the present invention can be used in an air conditioner in which the functions of an indoor unit and an outdoor unit are integrated in one housing.

In FIG. 8, an electric refrigerator-freezer 730 is an example of an electric device including a storage battery 734 including the storage battery electrode of one embodiment of the present invention. Specifically, the electric refrigerator-freezer 730 includes a housing 731, a door for a refrigerator 732, a door for a freezer 733, and the storage battery 734. The storage battery 734 is provided in the housing 731 in FIG. 8. The electric refrigerator-freezer 730 can receive electric power from a commercial power supply. Alternatively, the electric refrigerator-freezer 730 can use electric power stored in the storage battery 734. Thus, the electric refrigerator-freezer 730 can be operated with the use of the storage battery 734 including the storage battery electrode of one embodiment of the present invention as an uninterruptible power supply even when electric power cannot be supplied from a commercial power supply due to power failure or the like.

Note that among the electric devices described above, a high-frequency heating apparatus such as a microwave oven and an electric device such as an electric rice cooker require high power in a short time. The tripping of a breaker of a commercial power supply in use of an electric device can be prevented by using the storage battery including the storage battery electrode of one embodiment of the present invention as an auxiliary power supply for supplying electric power which cannot be supplied enough by a commercial power supply.

In addition, in a time period when electric devices are not used, particularly when the proportion of the amount of electric power which is actually used to the total amount of electric power which can be supplied from a commercial power supply source (such a proportion referred to as a usage rate of electric power) is low, electric power can be stored in the storage battery, whereby the usage rate of electric power can be reduced in a time period when the electric devices are used. For example, in the case of the electric refrigerator-freezer 730, electric power can be stored in the storage battery 734 in night time when the temperature is low and the door for a refrigerator 732 and the door for a freezer 733 are not often opened or closed. Then, in daytime when the temperature is high and the door for a refrigerator 732 and the door for a freezer 733 are frequently opened and closed, the storage battery 734 is used as an auxiliary power supply; thus, the usage rate of electric power in daytime can be reduced.

This embodiment can be implemented in combination with any of the other embodiments as appropriate.

Embodiment 5

Next, a portable information terminal which is an example of electric devices will be described with reference to FIGS. 9A to 9C.

Figure 9A:
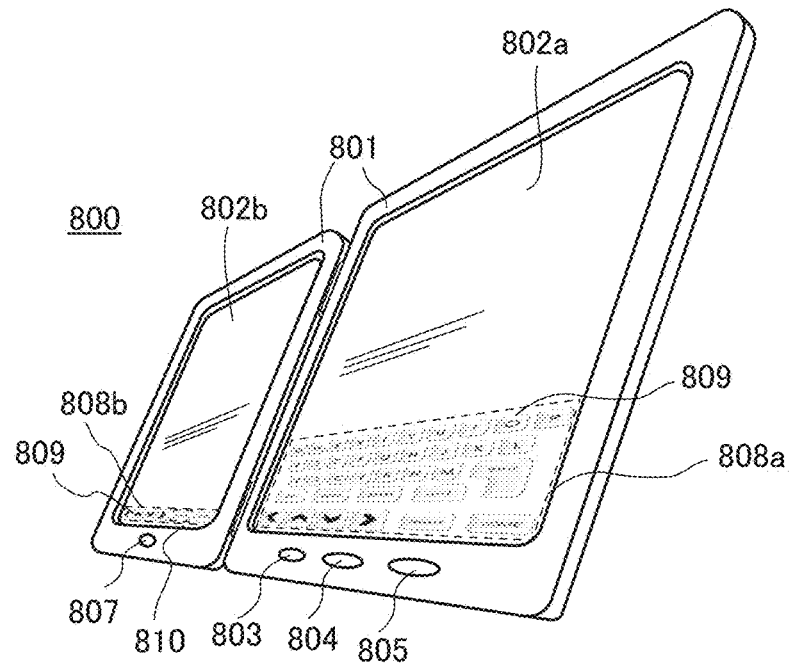
FIGS. 9A to 9C illustrate an example of an electric device.
Figure 9B:
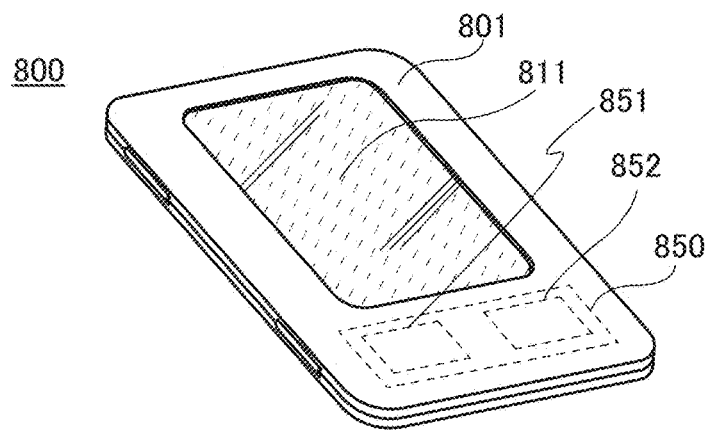

FIGS. 9A and 9B illustrate a tablet terminal 800 which can be folded. FIG. 9A illustrates the tablet terminal 800 in the state of being unfolded. The tablet terminal includes a housing 801, a display portion 802a, a display portion 802b, a display-mode switching button 803, a power button 804, a power-saving-mode switching button 805, and an operation button 807.

A touch panel area 808a can be provided in part of the display portion 802a, in which area, data can be input by touching displayed operation keys 809. Note that half of the display portion 802a has only a display function and the other half has a touch panel function. However, the structure of the display portion 802a is not limited to this, and all the area of the display portion 802a may have a touch panel function. For example, a keyboard can be displayed on the whole display portion 802a to be used as a touch panel, and the display portion 802b can be used as a display screen.

A touch panel area 808b can be provided in part of the display portion 802b like in the display portion 802a. When a keyboard display switching button 810 displayed on the touch panel is touched with a finger, a stylus, or the like, a keyboard can be displayed on the display portion 802b.

Touch input can be performed in the touch panel area 808a and the touch panel area 808b at the same time.

The display-mode switching button 803 allows switching between a landscape mode and a portrait mode, color display and black-and-white display, and the like. The power-saving-mode switching button 805 allows optimizing the display luminance in accordance with the amount of external light in use which is detected by an optical sensor incorporated in the tablet terminal. In addition to the optical sensor, other detecting devices such as sensors for determining inclination, such as a gyroscope or an acceleration sensor, may be incorporated in the tablet terminal.

Although the display area of the display portion 802a is the same as that of the display portion 802b in FIG. 9A, one embodiment of the present invention is not particularly limited thereto. The display area of the display portion 802a may be different from that of the display portion 802b, and further, the display quality of the display portion 802a may be different from that of the display portion 802b. For example, one of the display portions 802a and 802b may display higher definition images than the other.

FIG. 9B illustrates the tablet terminal 800 in the state of being closed. The tablet terminal 800 includes the housing 801, a solar cell 811, a charge/discharge control circuit 850, a battery 851, and a DC-DC converter 852. FIG. 9B illustrates an example where the charge/discharge control circuit 850 includes the battery 851 and the DC-DC converter 852. The storage battery including the storage battery electrode of one embodiment of the present invention, which is described in the above embodiment, is used as the battery 851.

Since the tablet terminal 800 can be folded, the housing 801 can be closed when the tablet terminal is not in use. Thus, the display portions 802a and 802b can be protected, which permits the tablet terminal 800 to have high durability and improved reliability for long-term use.

The tablet terminal illustrated in FIGS. 9A and 9B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 811, which is attached to a surface of the tablet terminal, can supply electric power to a touch panel, a display portion, an image signal processor, and the like. Note that the solar cell 811 can be provided on one or both surfaces of the housing 801 and thus the battery 851 can be charged efficiently.

The structure and operation of the charge/discharge control circuit 850 illustrated in FIG. 9B will be described with reference to a block diagram of FIG. 9C. FIG. 9C illustrates the solar cell 811, the battery 851, the DC-DC converter 852, a converter 853, switches SW1 to SW3, and the display portion 802. The battery 851, the DC-DC converter 852, the converter 853, and the switches SW1 to SW3 correspond to the charge and discharge control circuit 850 in FIG. 9B.

First, an example of operation in the case where electric power is generated by the solar cell 811 using external light will be described. The voltage of electric power generated by the solar cell is raised or lowered by the DC-DC converter 852 so that the electric power can have a voltage for charging the battery 851. When the display portion 802 is operated with the electric power from the solar cell 811, the switch SW1 is turned on and the voltage of the electric power is raised or lowered by the converter 853 to a voltage needed for operating the display portion 802. In addition, when display on the display portion 802 is not performed, the switch SW1 is turned off and the switch SW2 is turned on so that the battery 851 may be charged.

Although the solar cell 811 is described as an example of power generation means, there is no particular limitation on the power generation means, and the battery 851 may be charged with any of the other means such as a piezoelectric element or a thermoelectric conversion element (Peltier element). For example, the battery 851 may be charged with a non-contact power transmission module capable of performing charging by transmitting and receiving electric power wirelessly (without contact), or any of the other charge means used in combination.

Figure 9C:
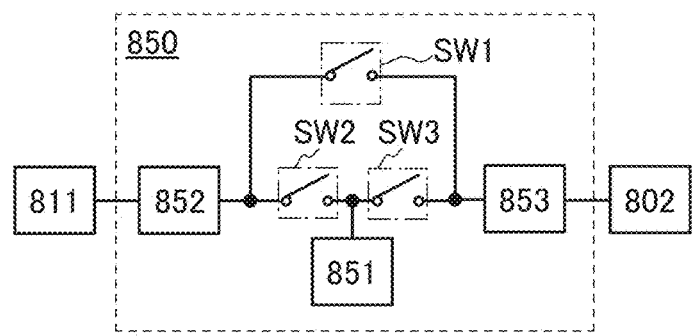

It is needless to say that one embodiment of the present invention is not limited to the electric device illustrated in FIGS. 9A to 9C as long as the electric device is equipped with the storage battery including the storage battery electrode of one embodiment of the present invention, which is described in the above embodiment.

Embodiment 6

An example of the moving object which is an example of the electric devices will be described with reference to FIGS. 10A and 10B.

The storage battery described in the above embodiment can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 10A:
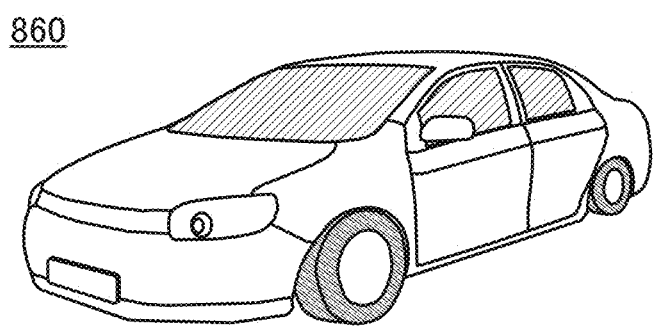
FIGS. 10A and 10B illustrate an example of an electric device.
Figure 10B:
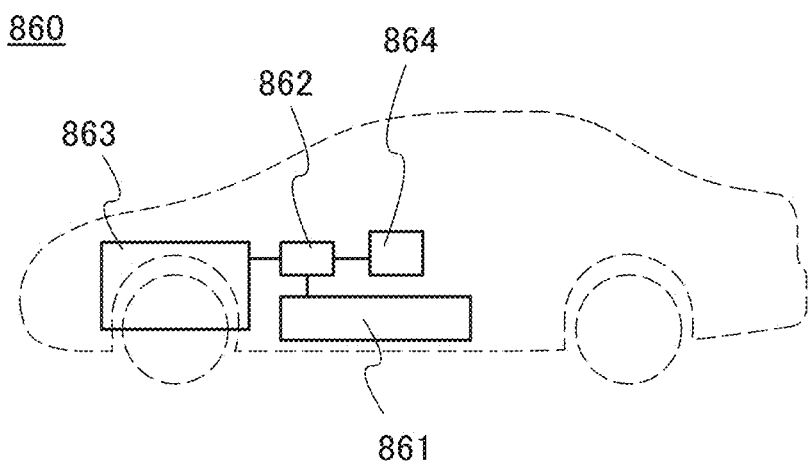

FIGS. 10A and 10B illustrate an example of an electric vehicle. An electric vehicle 860 is equipped with a battery 861. The output of the electric power of the battery 861 is adjusted by a control circuit 862 and the electric power is supplied to a driving device 863. The control circuit 862 is controlled by a processing unit 864 including a ROM, a RAM, a CPU, and the like which are not illustrated.

The driving device 863 includes a DC motor or an AC motor either alone or in combination with an internal-combustion engine. The processing unit 864 outputs a control signal to the control circuit 862 based on input data such as data on operation (e.g., acceleration, deceleration, or stop) of a driver or data during driving (e.g., data on an upgrade or a downgrade, or data on a load on a driving wheel) of the electric vehicle 860. The control circuit 862 adjusts the electric energy supplied from the battery 861 in accordance with the control signal of the processing unit 864 to control the output of the driving device 863. In the case where the AC motor is mounted, although not illustrated, an inverter which converts direct current into alternate current is also incorporated.

The battery 861 can be charged by external electric power supply using a plug-in technique. For example, the battery 861 is charged through a power plug from a commercial power supply. The battery 861 can be charged by converting the supplied power into DC constant voltage having a predetermined voltage level through a converter such as an AC-DC converter. The use of the storage battery including the storage battery electrode of one embodiment of the present invention as the battery 861 can be conducive to an increase in battery capacity, leading to an improvement in convenience. When the battery 861 itself can be more compact and more lightweight as a result of improved characteristics of the battery 861, the vehicle can be lightweight, leading to an increase in fuel efficiency.

Note that it is needless to say that one embodiment of the present invention is not limited to the electric device described above as long as the storage battery of one embodiment of the present invention is included.

This embodiment can be implemented in combination with any of the other embodiments as appropriate.

Embodiment 7

A battery management unit (BMU) which can be combined with a battery cell containing the material described in the above embodiment, and a transistor suitable for a circuit included in the battery management unit will be described with reference to FIG. 11, FIGS. 12A to 12C, FIG. 13, FIG. 14, FIGS. 15A to 15C, FIG. 16, and FIG. 17. In this embodiment, a battery management unit of a power storage device that includes battery cells connected in series will be particularly described.

When a plurality of battery cells connected in series are charged and discharged repeatedly, each battery cell has different capacity (output voltage) from one another due to the variation in characteristics among the battery cells. Discharge capacities of all of the battery cells connected in series depend on a battery cell with small capacity. Capacity variation reduces the discharge capacity. Charging based on a battery cell with small capacity may cause insufficient charging. Charging based on a battery cell with high capacity may cause overcharge.

Thus, the battery management unit of the power storage device that includes the battery cells connected in series has a function of reducing capacity variation among the battery cells which causes insufficient charging or overcharge. Examples of circuit structures for reducing capacity variation among the battery cells include a resistive type, a capacitor type, and an inductor type; here, a circuit structure which can reduce capacity variation using a transistor with a low off-state current is explained as an example.

A transistor including an oxide semiconductor in its channel formation region (an OS transistor) is preferably used as the transistor with a low off-state current. When an OS transistor with a low off-state current is used in the circuit structure of the battery management unit of the power storage device, the amount of electric charge leaking from a battery cell can be reduced, and reduction in capacity over time can be suppressed.

As the oxide semiconductor used in the channel formation region, an In-M-Zn oxide (M is Ga, Sn, Y, Zr, La, Ce, or Nd) is used. In the case where a target having the atomic ratio of the metal elements of In:M:Zn=$x_1$:$y_1$:$z_1$ is used for forming an oxide semiconductor film, $x_1/y_1$ is preferably greater than or equal to ⅓ and less than or equal to 6 and further preferably greater than or equal to 1 and less than or equal to 6, and $z_1/y_1$ is preferably greater than or equal to ⅓ and less than or equal to 6 and further preferably greater than or equal to 1 and less than or equal to 6. Note that when $z_1/y_1$ is greater than or equal to 1 and less than or equal to 6, a CAAC-OS film as the oxide semiconductor film is easily formed.

Here, a CAAC-OS film is described.

The CAAC-OS film is one of oxide semiconductor films having a plurality of c-axis aligned crystal parts.

With a transmission electron microscope (TEM), a combined analysis image (also referred to as a high-resolution TEM image) of a bright-field image and a diffraction pattern of the CAAC-OS film is observed. Consequently, a plurality of crystal parts are observed clearly. However, in the high-resolution TEM image, a boundary between crystal parts, i.e., a grain boundary is not observed clearly. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology that reflects a surface over which the CAAC-OS film is formed (also referred to as a formation surface) or a top surface of the CAAC-OS film, and is provided parallel to the formation surface or the top surface of the CAAC-OS film.

On the other hand, according to the high-resolution planar TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

The CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is assigned to the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic order of the oxide semiconductor film by depriving the oxide semiconductor film of oxygen and causes a decrease in crystallinity. Furthermore, a heavy metal such as iron or nickel, argon, carbon dioxide, or the like has a large atomic radius (molecular radius), and thus disturbs the atomic order of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as "highly purified intrinsic" or "substantially highly purified intrinsic." A highly purified intrinsic or substantially highly purified intrinsic oxide semiconductor film has few carrier generation sources, and thus can have low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has few variations in electrical characteristics and high reliability. Charge trapped by the carrier traps in the oxide semiconductor film takes a long time to be released and may behave like fixed charge. Thus, the transistor that includes the oxide semiconductor film having high impurity concentration and high density of defect states has unstable electrical characteristics in some cases.

In a transistor including the CAAC-OS film, changes in electrical characteristics of the transistor due to irradiation with visible light or ultraviolet light are small.

Since the OS transistor has a wider band gap than a transistor including silicon in its channel formation region (a Si transistor), dielectric breakdown at the time when a high voltage is applied is unlikely to occur. Although a voltage of several hundreds of volts is generated when battery cells are connected in series, the above-described OS transistor is suitable for the circuit structure of the battery management unit, which is used for such battery cells, in the power storage device.

Figure 11:
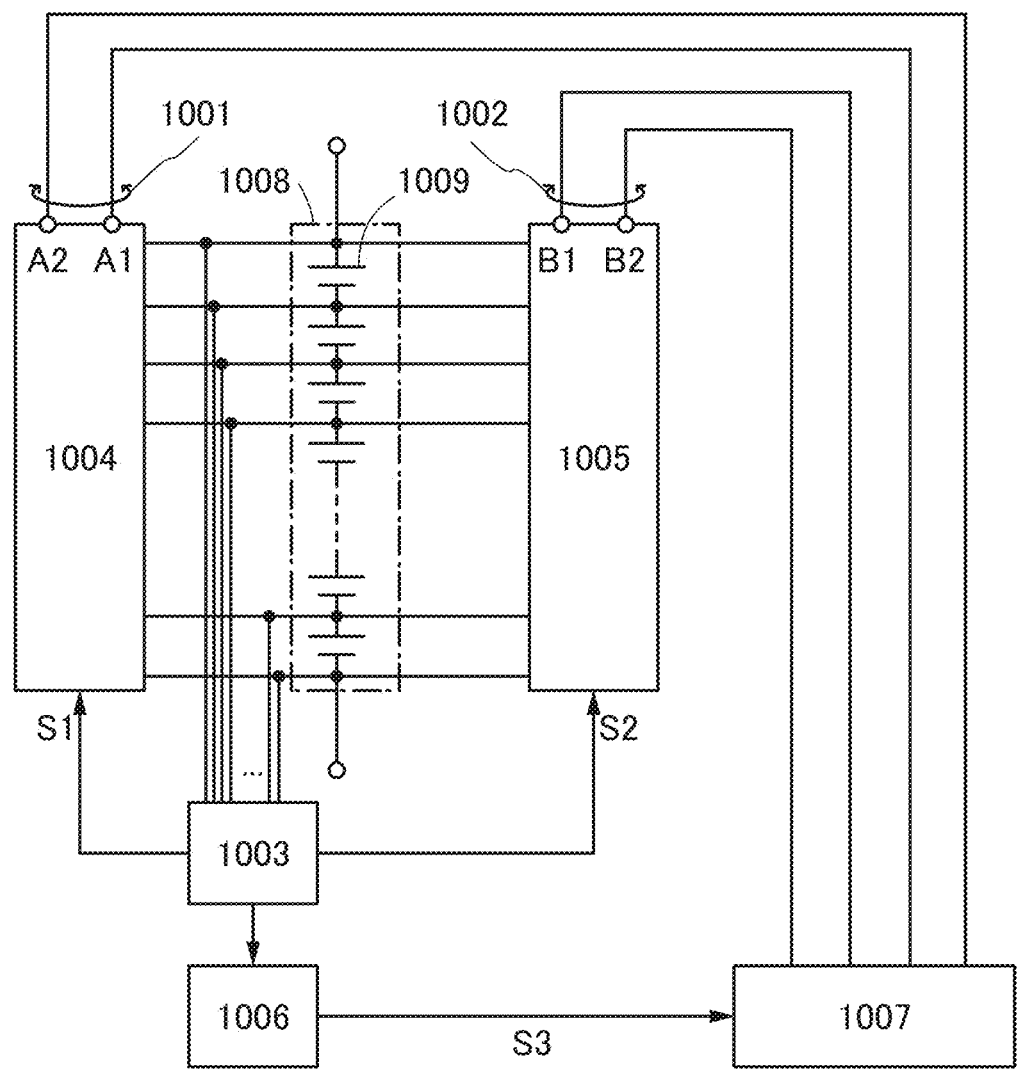
FIG. 11 is a block diagram illustrating one embodiment of the present invention.

FIG. 11 is an example of a block diagram of the power storage device. A power storage device 1000 illustrated in FIG. 11 includes a terminal pair 1001, a terminal pair 1002, a switching control circuit 1003, a switching circuit 1004, a switching circuit 1005, a voltage transformation control circuit 1006, a voltage transformer circuit 1007, and a battery portion 1008 including a plurality of battery cells 1009 connected in series.

In the power storage device 1000 illustrated in FIG. 11, a portion including the terminal pair 1001, the terminal pair 1002, the switching control circuit 1003, the switching circuit 1004, the switching circuit 1005, the voltage transformation control circuit 1006, and the voltage transformer circuit 1007 can be referred to as a battery management unit.

The switching control circuit 1003 controls operations of the switching circuits 1004 and 1005. Specifically, the switching control circuit 1003 determines battery cells to be discharged (a discharge battery cell group) and battery cells to be charged (a charge battery cell group) in accordance with voltage measured for every battery cell 1009.

Furthermore, the switching control circuit 1003 outputs a control signal S1 and a control signal S2 on the basis of the determined discharge battery cell group and the determined charge battery cell group. The control signal S1 is output to the switching circuit 1004. The control signal S1 controls the switching circuit 1004 so that the terminal pair 1001 and the discharge battery cell group are connected to each other. The control signal S2 is output to the switching circuit 1005. The control signal S2 controls the switching circuit 1005 so that the terminal pair 1002 and the charge battery cell group are connected to each other.

The switching control circuit 1003 generates the control signal S1 and the control signal S2 on the basis of connection relation of the switching circuit 1004, the switching circuit 1005, and the voltage transformer circuit 1007 so that terminals having the same polarity are connected to each other in the terminal pair 1001 and the discharge battery cell group, or terminals having the same polarity are connected to each other in the terminal pair 1002 and the charge battery cell group.

An operation of the switching control circuit 1003 is described in detail.

First, the switching control circuit 1003 measures the voltage of each of a plurality of the battery cells 1009. Then, the switching control circuit 1003 determines the battery cell 1009 having a voltage higher than a predetermined threshold value as a high-voltage battery cell (high-voltage cell) and the battery cell 1009 having a voltage lower than the predetermined threshold value as a low-voltage battery cell (low-voltage cell), for example.

As a method to determine whether a battery cell is a high-voltage cell or a low-voltage cell, any of various methods can be employed. For example, the switching control circuit 1003 may determine whether each battery cell 1009 is a high-voltage cell or a low-voltage cell on the basis of the voltage of the battery cell 1009 having a highest voltage or a lowest voltage among a plurality of the battery cells 1009. In this case, the switching control circuit 1003 can determine whether each battery cell 1009 is a high-voltage cell or a low-voltage cell by determining whether or not a ratio of a voltage of each battery cell 1009 to the reference voltage is the predetermined value or more. Then, the switching control circuit 1003 determines a charge battery cell group and a discharge battery cell group on the basis of the determination result.

Note that high-voltage cells and low-voltage cells are possibly mixed in various states in a plurality of the battery cells 1009. The switching control circuit 1003 determines a portion having the largest number of consecutive high-voltage cells connected in series as the discharge battery cell group of mixed high-voltage cells and low-voltage cells, for example. Furthermore, the switching control circuit 1003 determines a portion having the largest number of consecutive low-voltage cells connected in series as the charge battery cell group, for example. In addition, the switching control circuit 1003 may preferentially select the battery cells 1009 which are nearly overcharged or overdischarged as the discharge battery cell group or the charge battery cell group.

Figure 12A:
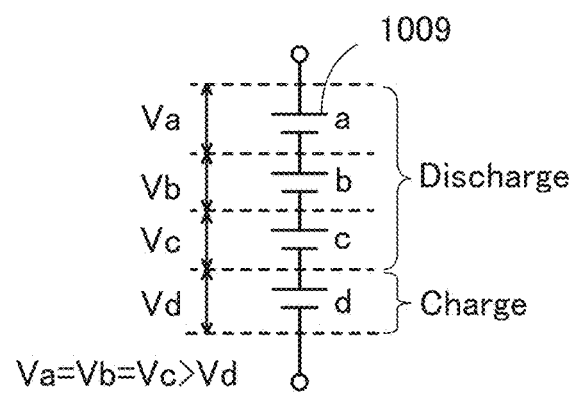
FIGS. 12A to 12C are conceptual diagrams each illustrating one embodiment of the present invention.
Figure 12B:
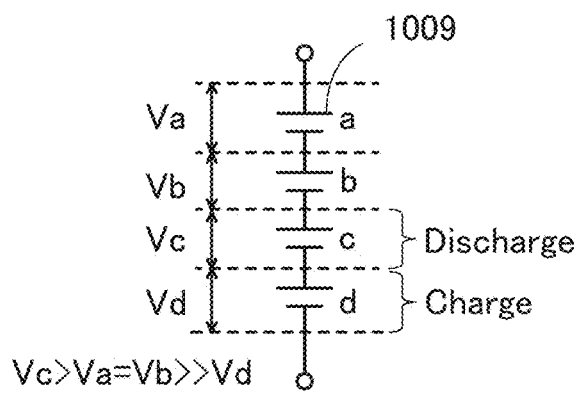
Figure 12C:
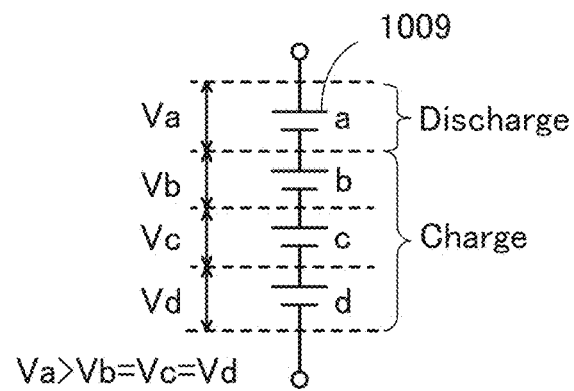

Here, operation examples of the switching control circuit 1003 in this embodiment are described with reference to FIGS. 12A to 12C. FIGS. 12A to 12C illustrate operation examples of the switching control circuit 1003. Note that FIGS. 12A to 12C each illustrate the case where four battery cells 1009 are connected in series as an example for convenience of explanation.

FIG. 12A shows the case where the relation Va=Vb=Vc>Vd is satisfied where Va, Vb, Vc, and Vd are voltages of a battery cell a, a battery cell b, a battery cell c, and a battery cell d, respectively. That is, three consecutive high-voltage cells a to c and one low-voltage cell d are connected in series. In that case, the switching control circuit 1003 determines the series of three high-voltage cells a to c as the discharge battery cell group and the low-voltage cell d as the charge battery cell group.

FIG. 12B shows the case where the relation Vc>Va=Vb>>Vd is satisfied. That is, two consecutive low-voltage cells a and b, one high-voltage cell c, and one low-voltage cell d which is nearly overdischarged are connected in series. In that case, the switching control circuit 1003 determines the high-voltage cell c as the discharge battery cell group. Since the low-voltage cell d is nearly overdischarged, the switching control circuit 1003 preferentially determines the low-voltage cell d as the charge battery cell group instead of the two consecutive low-voltage cells a and b.

FIG. 12C shows the case where the relation Va>Vb=Vc=Vd is satisfied. That is, one high-voltage cell a and three consecutive low-voltage cells b to d are connected in series. In that case, the switching control circuit 1003 determines the high-voltage cell a as the discharge battery cell group and the three consecutive low-voltage cells b to d as the charge battery cell group.

On the basis of the determination result shown in the examples of FIGS. 12A to 12C, the switching control circuit 1003 outputs the control signal S1 and the control signal S2 to the switching circuit 1004 and the switching circuit 1005, respectively. The control signal S1 contains information indicating the discharge battery cell group being the connection destination of the switching circuit 1004. The control signal S2 contains information indicating the charge battery cell group being a connection destination of the switching circuit 1005.

The above is the detailed description of the operation of the switching control circuit 1003.

The switching circuit 1004 sets the discharge battery cell group, which is determined by the switching control circuit 1003, as the connection destination of the terminal pair 1001 in response to the control signal Si output from the switching control circuit 1003.

The terminal pair 1001 includes a pair of terminals A1 and A2. The switching circuit 1004 sets the connection destination of the terminal pair 1001 by connecting one of the pair of terminals A1 and A2 to a positive electrode terminal of the battery cell 1009 positioned on the most upstream side (on the high potential side) of the discharge battery cell group, and the other to a negative electrode terminal of the battery cell 1009 positioned on the most downstream side (on the low potential side) of the discharge battery cell group. Note that the switching circuit 1004 can recognize the position of the discharge battery cell group on the basis of the information contained in the control signal S1.

The switching circuit 1005 sets the charge battery cell group, which is determined by the switching control circuit 1003, as the connection destination of the terminal pair 1002 in response to the control signal S2 output from the switching control circuit 1003.

The terminal pair 1002 includes a pair of terminals B1 and B2. The switching circuit 1005 sets the connection destination of the terminal pair 1002 by connecting one of the pair of terminals B1 and B2 to a positive electrode terminal of the battery cell 1009 positioned on the most upstream side (on the high potential side) of the charge battery cell group, and the other to a negative electrode terminal of the battery cell 1009 positioned on the most downstream side (on the low potential side) of the charge battery cell group. Note that the switching circuit 1005 can recognize the position of the charge battery cell group on the basis of the information contained in the control signal S2.

Figure 13:
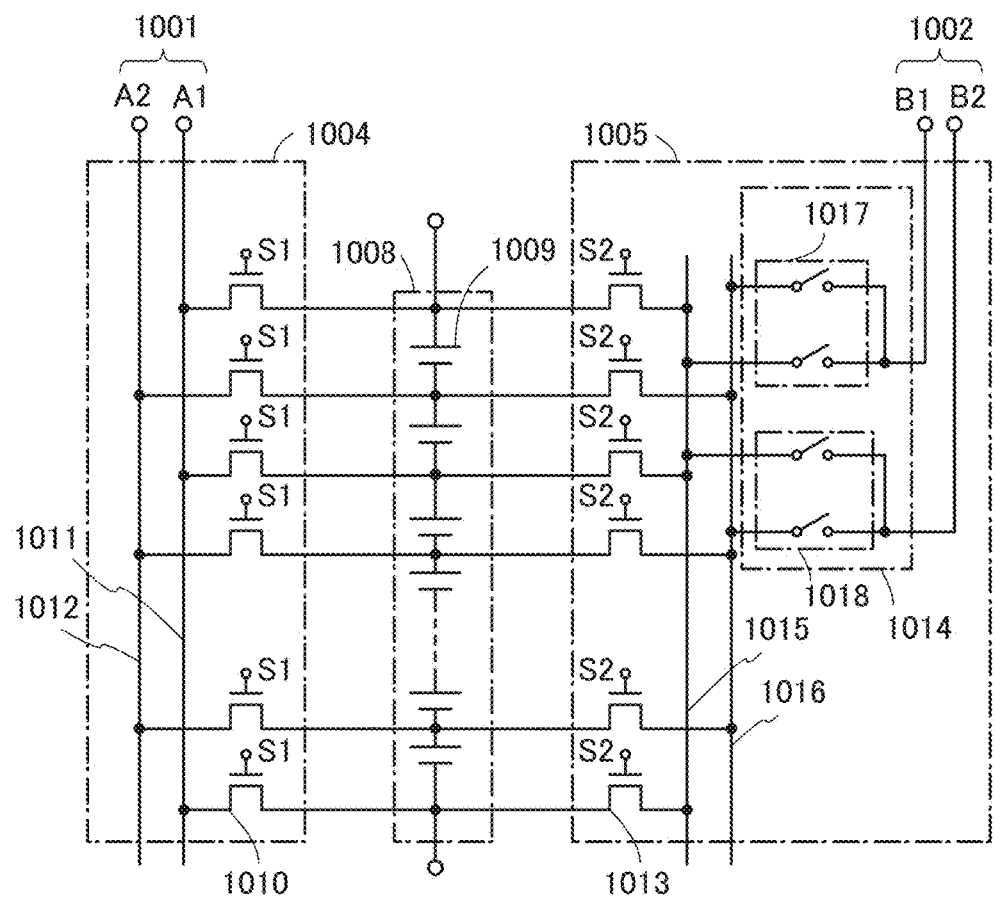
FIG. 13 is a circuit diagram illustrating one embodiment of the present invention.
Figure 14:
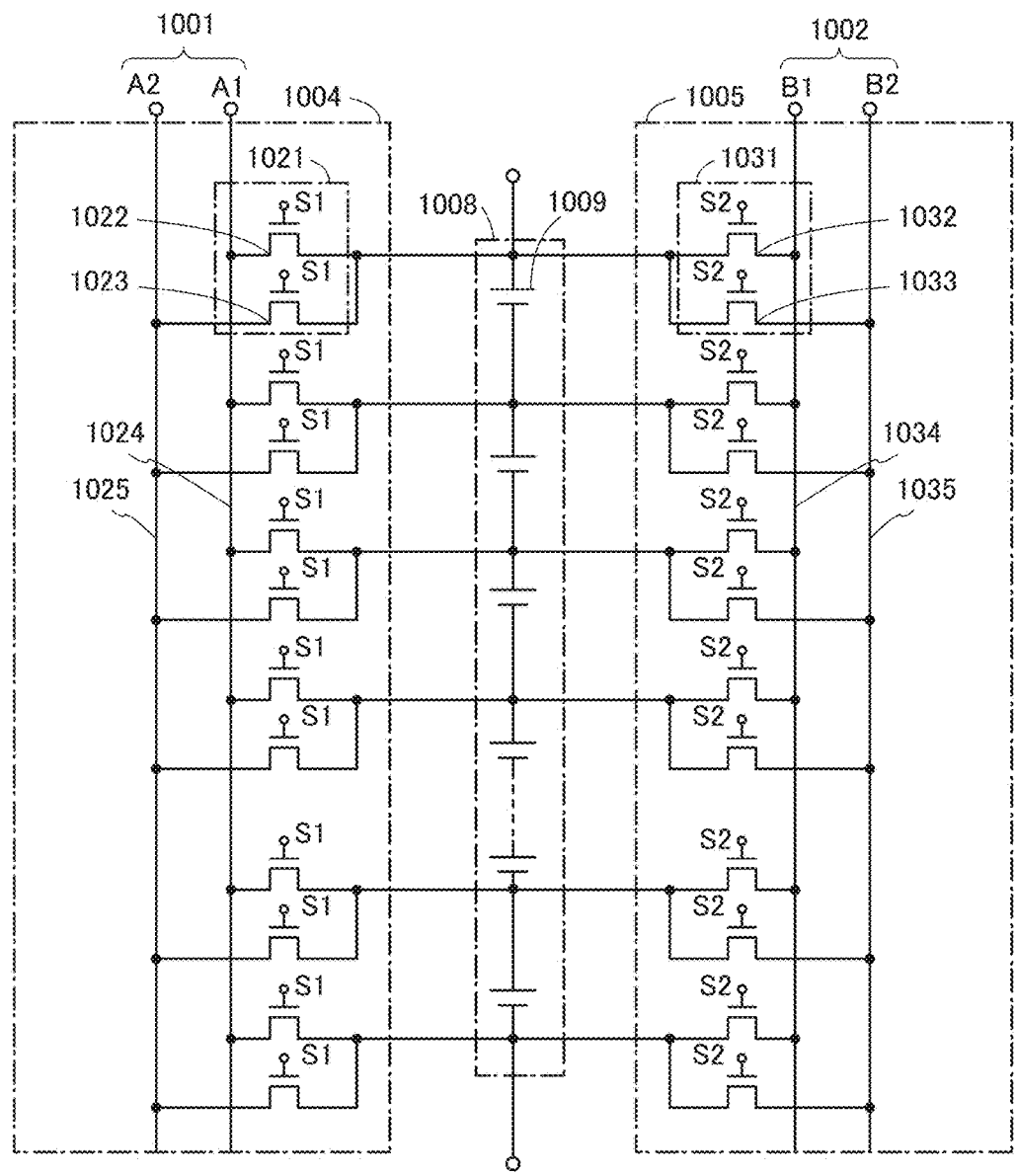
FIG. 14 is a circuit diagram illustrating one embodiment of the present invention.

FIG. 13 and FIG. 14 are circuit diagrams showing configuration examples of the switching circuits 1004 and 1005.

In FIG. 13, the switching circuit 1004 includes a plurality of transistors 1010, a bus 1011, and a bus 1012. The bus 1011 is connected to the terminal A1. The bus 1012 is connected to the terminal A2. Sources or drains of a plurality of the transistors 1010 are connected alternately to the bus 1011 and the bus 1012. The drains or the sources of a plurality of the transistors 1010 are each connected between two adjacent battery cells 1009.

The drain or the source of the transistor 1010 on the most upstream side is connected to a positive electrode terminal of the battery cell 1009 on the most upstream side of the battery portion 1008. The drain or the source the transistor 1010 on the most downstream side is connected to a negative electrode terminal of the battery cell 1009 on the most downstream side of the battery portion 1008.

The switching circuit 1004 connects the discharge battery cell group to the terminal pair 1001 by bringing one of a plurality of the transistors 1010 which are connected to the bus 1011 and one of a plurality of the transistors 1010 which are connected to the bus 1012 into an on state in response to the control signal S1 supplied to gates of a plurality of the transistors 1010. Accordingly, the positive electrode terminal of the battery cell 1009 on the most upstream side of the discharge battery cell group is connected to one of the pair of terminals A1 and A2. In addition, the negative electrode terminal of the battery cell 1009 on the most downstream side of the discharge battery cell group is connected to the other of the pair of terminals A1 and A2 (i.e., a terminal which is not connected to the positive electrode terminal).

An OS transistor is preferably used as the transistor 1010. Since the off-state current of the OS transistor is low, the amount of electric charge leaking from a battery cell which does not belong to the discharge battery cell group can be reduced, and reduction in capacity over time can be suppressed. In addition, dielectric breakdown in the OS transistor at the time when a high voltage is applied is unlikely to occur. Therefore, the battery cell 1009 and the terminal pair 1001, which are connected to the transistor 1010 in an off state, can be insulated from each other even when an output voltage of the discharge battery cell group is high.

In FIG. 13, the switching circuit 1005 includes a plurality of transistors 1013, a current control switch 1014, a bus 1015, and a bus 1016. The bus 1015 and the bus 1016 are provided between a plurality of the transistors 1013 and the current control switch 1014. Sources or drains of a plurality of the transistors 1013 are connected alternately to the bus 1015 and the bus 1016. The drains or the sources of a plurality of the transistors 1013 are each connected between two adjacent battery cells 1009.

The drain or the source of the transistor 1013 on the most upstream side is connected to the positive electrode terminal of the battery cell 1009 on the most upstream side of the battery portion 1008. The drain or the source of the transistor 1013 on the most downstream side is connected to the negative electrode terminal of the battery cell 1009 on the most downstream side of the battery portion 1008.

An OS transistor is preferably used as the transistor 1013 like the transistor 1010. Since the off-state current of the OS transistor is low, the amount of electric charge leaking from the battery cell which does not belong to the charge battery cell group can be reduced, and reduction in capacity over time can be suppressed. In addition, dielectric breakdown in the OS transistor at the time when a high voltage is applied is unlikely to occur. Therefore, the battery cell 1009 and the terminal pair 1002, which are connected to the transistor 1013 in an off state, can be insulated from each other even when charging voltage of the charge battery cell group is high.

The current control switch 1014 includes a switch pair 1017 and a switch pair 1018. One end of the switch pair 1017 is connected to the terminal B1. The other end of the switch pair 1017 is divided into two switches. One switch is connected to the bus 1015, and the other switch is connected to the bus 1016. One end of the switch pair 1018 is connected to the terminal B2. The other end of the switch pair 1018 is divided into two switches. One switch is connected to the bus 1015, and the other switch is connected to the bus 1016.

OS transistors are preferably used for the switches included in the switch pair 1017 and the switch pair 1018 like the transistors 1010 and 1013.

The switching circuit 1005 controls the combination of on and off states of the transistors 1013 and the current control switch 1014 in response to the control signal S2 to connect the charge battery cell group and the terminal pair 1002.

The switching circuit 1005 connects the charge battery cell group and the terminal pair 1002 in the following manner, for example.

The switching circuit 1005 brings the transistor 1013 connected to the positive electrode terminal of the battery cell 1009 on the most upstream side of the charge battery cell group into an on state in response to the control signal S2 supplied to gates of a plurality of the transistors 1013. In addition, the switching circuit 1005 brings the transistor 1013 connected to the negative electrode terminal of the battery cell 1009 on the most downstream side of the charge battery cell group into an on state in response to the control signal S2 supplied to the gates of a plurality of the transistors 1013.

The polarities of voltages applied to the terminal pair 1002 might vary depending on the structures of the discharge battery cell group and the voltage transformer circuit 1007 connected to the terminal pair 1001. In order to supply current in a direction for charging the charge battery cell group, terminals with the same polarity need to be connected to each other in the terminal pair 1002 and the charge battery cell group. Thus, the current control switch 1014 is controlled by the control signal S2 so that the connection destination of the switch pair 1017 and that of the switch pair 1018 are changed depending on the polarities of the voltages applied to the terminal pair 1002.

The state where voltages are applied to the terminal pair 1002 so as to make the terminal B1 a positive electrode and the terminal B2 a negative electrode is described as an example. In the case where the battery cell 1009 on the most downstream side of the battery portion 1008 is in the charge battery cell group, the switch pair 1017 is controlled in response to the control signal S2 to be connected to the positive electrode terminal of the battery cell 1009. That is, the switch connected to the bus 1016 in the switch pair 1017 is turned on, and the switch connected to the bus 1015 in the switch pair 1017 is turned off. In contrast, the switch pair 1018 is controlled in response to the control signal S2 to be connected to the negative electrode terminal of the battery cell 1009 on the most downstream side of the battery portion 1008. That is, the switch connected to the bus 1015 in the switch pair 1018 is turned on, and the switch connected to the bus 1016 in the switch pair 1018 is turned off. In this manner, terminals with the same polarity are connected to each other in the terminal pair 1002 and the charge battery cell group. Accordingly, the current which flows from the terminal pair 1002 is controlled to be supplied in a direction for charging the charge battery cell group.

Instead of the switching circuit 1005, the switching circuit 1004 may include the current control switch 1014. In that case, the polarities of the voltages applied to the terminal pair 1002 are controlled by controlling the polarities of the voltages applied to the terminal pair 1001 in response to the operation of the current control switch 1014 and the control signal S1. Thus, the current control switch 1014 controls the direction of current which flows to the charge battery cell group from the terminal pair 1002.

FIG. 14 is a circuit diagram illustrating structure examples of the switching circuit 1004 and the switching circuit 1005 which are different from those in FIG. 13.

In FIG. 14, the switching circuit 1004 includes a plurality of transistor pairs 1021, a bus 1024, and a bus 1025. The bus 1024 is connected to the terminal A1. The bus 1025 is connected to the terminal A2. One end of each of a plurality of the transistor pairs 1021 is divided into a transistor 1022 and a transistor 1023. A source or a drain of the transistor 1022 is connected to the bus 1024. A source or a drain of the transistor 1023 is connected to the bus 1025. In addition, the other end of each of a plurality of the transistor pairs is connected between two adjacent battery cells 1009. The other end of the transistor pair 1021 on the most upstream side of a plurality of the transistor pairs 1021 is connected to a positive electrode terminal of the battery cell 1009 on the most upstream side of the battery portion 1008. The other end of the transistor pair 1021 on the most downstream side of a plurality of the transistor pairs 1021 is connected to a negative electrode terminal of the battery cell 1009 on the most downstream side of the battery portion 1008.

The switching circuit 1004 switches the connection destination of the transistor pair 1021 to one of the terminal A1 and the terminal A2 by turning on or off the transistors 1022 and 1023 in response to the control signal S1. Specifically, when the transistor 1022 is turned on, the transistor 1023 is turned off, in which case the connection destination of the transistor pair 1021 is the terminal A1. In contrast, when the transistor 1023 is turned on, the transistor 1022 is turned off, in which case the connection destination of the transistor pair 1021 is the terminal A2. Which of the transistors 1022 and 1023 is turned on is determined by the control signal S1.

Two transistor pairs 1021 are used to connect the terminal pair 1001 and the discharge battery cell group. Specifically, the connection destinations of the two transistor pairs 1021 are determined on the basis of the control signal S1, and the discharge battery cell group and the terminal pair 1001 are connected to each other. The connection destinations of the two transistor pairs 1021 are controlled by the control signal S1 so that one of the connection destinations is the terminal A1 and the other is the terminal A2.

The switching circuit 1005 includes a plurality of transistor pairs 1031, a bus 1034, and a bus 1035. The bus 1034 is connected to the terminal B1. The bus 1035 is connected to the terminal B2. One end of each of a plurality of the transistor pairs 1031 is divided into a transistor 1032 and a transistor 1033. A source or a drain of the transistor 1032 is connected to the bus 1034. A source or a drain of the transistor 1033 is connected to the bus 1035. The other end of each of a plurality of the transistor pairs 1031 is connected between two adjacent battery cells 1009. The other end of the transistor pair 1031 on the most downstream side of a plurality of the transistor pairs 1031 is connected to the negative electrode terminal of the battery cell 1009 on the most downstream side of the battery portion 1008. The other end of the transistor pair 1031 on the most upstream side of a plurality of the transistor pairs 1031 is connected to the positive electrode terminal of the battery cell 1009 on the most upstream side of the battery portion 1008.

The switching circuit 1005 switches the connection destination of the transistor pair 1031 to one of the terminal B1 and the terminal B2 by turning on or off the transistors 1032 and 1033 in response to the control signal S2. Specifically, when the transistor 1032 is turned on, the transistor 1033 is turned off, in which case the connection destination of the transistor pair 1031 is the terminal B1. In contrast, when the transistor 1033 is turned on, the transistor 1032 is turned off, in which case the connection destination of the transistor pair 1031 is the terminal B2. Which of the transistors 1032 and 1033 is turned on is determined by the control signal S2.

Two transistor pairs 1031 are used to connect the terminal pair 1002 and the charge battery cell group. Specifically, the connection destinations of the two transistor pairs 1031 are determined on the basis of the control signal S2, and the charge battery cell group and the terminal pair 1002 are connected to each other. The connection destinations of the two transistor pairs 1031 are controlled by the control signal S2 so that one of the connection destinations is the terminal B1 and the other is the terminal B2.

The connection destinations of the two transistor pairs 1031 are determined by the polarities of the voltages applied to the terminal pair 1002. Specifically, in the case where voltages which make the terminal B1 a positive electrode and the terminal B2 a negative electrode are applied to the terminal pair 1002, the transistor pair 1031 on the upstream side is controlled by the control signal S2 so that the transistor 1032 is turned on and the transistor 1033 is turned off while the transistor pair 1031 on the downstream side is controlled by the control signal S2 so that the transistor 1033 is turned on and the transistor 1032 is turned off. In the case where voltages which make the terminal B1 a negative electrode and the terminal B2 a positive electrode is applied to the terminal pair 1002, the transistor pair 1031 on the upstream side is controlled by the control signal S2 so that the transistor 1033 is turned on and the transistor 1032 is turned off while the transistor pair 1031 on the downstream side is controlled by the control signal S2 so that the transistor 1032 is turned on and the transistor 1033 is turned off. In this manner, terminals with the same polarity are connected to each other in the terminal pair 1002 and the charge battery cell group. Accordingly, the current which flows from the terminal pair 1002 is controlled to be supplied in a direction for charging the charge battery cell group.

The voltage transformation control circuit 1006 controls operation of the voltage transformer circuit 1007. The voltage transformation control circuit 1006 generates a voltage transformation signal S3 for controlling the operation of the voltage transformer circuit 1007 on the basis of the number of the battery cells 1009 included in the discharge battery cell group and the number of the battery cells 1009 included in the charge battery cell group and outputs the voltage transformation signal S3 to the voltage transformer circuit 1007.

In the case where the discharge battery cell group includes more battery cells 1009 than the charge battery cell group, it is necessary to prevent excessive application of charging voltage to the charge battery cell group. Thus, the voltage transformation control circuit 1006 outputs the voltage transformation signal S3 for controlling the voltage transformer circuit 1007 so that a discharging voltage (Vdis) is lowered within a range where the charge battery cell group can be charged.

In the case where the number of the battery cells 1009 included in the discharge battery cell group is less than or equal to the number of the battery cells 1009 included in the charge battery cell group, a voltage necessary for charging the charge battery cell group needs to be secured. Therefore, the voltage transformation control circuit 1006 outputs the voltage transformation signal S3 for controlling the voltage transformer circuit 1007 so that the discharging voltage (Vdis) is raised within a range where excessive charging voltage is not applied to the charge battery cell group.

The voltage value of the excessive charging voltage is determined in the light of product specifications and the like of the battery cell 1009 used in the battery portion 1008. The voltage which is raised or lowered by the voltage transformer circuit 1007 is applied as a charging voltage (Vcha) to the terminal pair 1002.

Figure 15A:
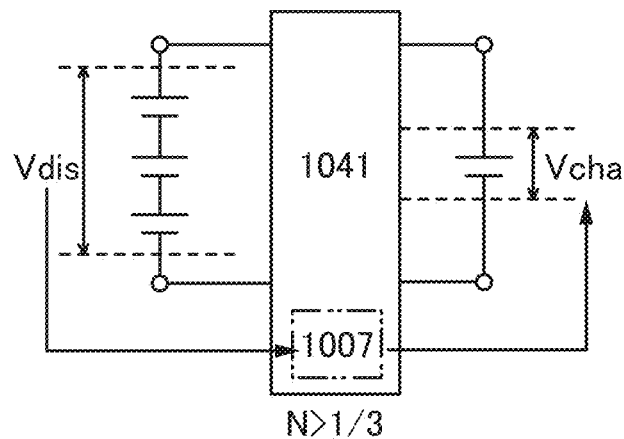
FIGS. 15A to 15C are conceptual diagrams each illustrating one embodiment of the present invention.
Figure 15B:
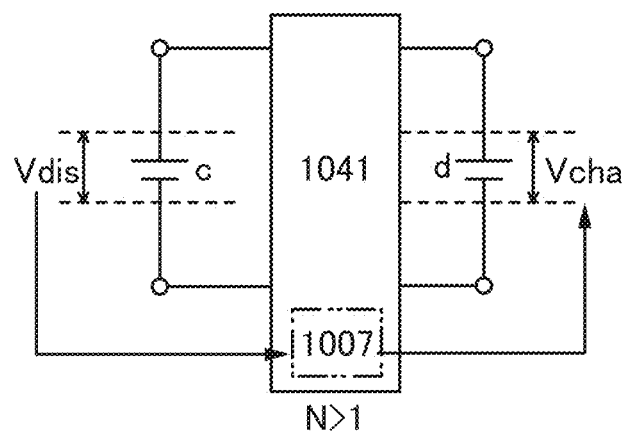
Figure 15C:
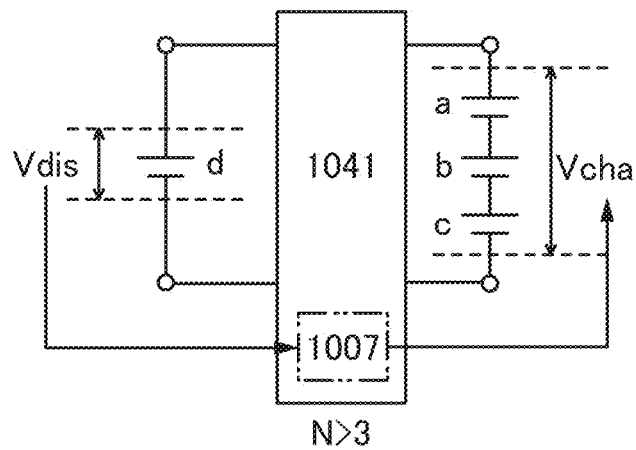

Here, operation examples of the voltage transformation control circuit 1006 in this embodiment are described with reference to FIGS. 15A to 15C. FIGS. 15A to 15C are conceptual diagrams for explaining the operation examples of the voltage transformation control circuit 1006. The discharge battery cell group and the charge battery cell group illustrated in FIGS. 15A to 15C correspond to those in FIGS. 12A to 12C. FIGS. 15A to 15C each illustrate a battery management unit 1041. The battery management unit 1041 includes the terminal pair 1001, the terminal pair 1002, the switching control circuit 1003, the switching circuit 1004, the switching circuit 1005, the voltage transformation control circuit 1006, and the voltage transformer circuit 1007.

In an example illustrated in FIG. 15A, the three consecutive high-voltage cells a to c and one low-voltage cell d are connected in series as described with reference to FIG. 12A. In that case, as described using FIG. 12A, the switching control circuit 1003 determines the high-voltage cells a to c as the discharge battery cell group and the low-voltage cell d as the charge battery cell group. The voltage transformation control circuit 1006 calculates a conversion ratio N for converting the discharging voltage (Vdis) to the charging voltage (Vcha) on the basis of the ratio of the number of the battery cells 1009 included in the charge battery cell group to the number of the battery cells 1009 included in the discharge battery cell group.

In the case where the discharge battery cell group includes more battery cells 1009 than in the charge battery cell group, when a discharging voltage is applied to the terminal pair 1002 without transforming the voltage, overvoltage may be applied to the battery cells 1009 included in the charge battery cell group through the terminal pair 1002. Thus, in the case of FIG. 15A, it is necessary that a charging voltage (Vcha) applied to the terminal pair 1002 be lower than the discharging voltage. In addition, in order to charge the charge battery cell group, it is necessary that the charging voltage be higher than the total voltage of the battery cells 1009 included in the charge battery cell group. Thus, the transformation control circuit 1006 sets the conversion ratio N larger than the ratio of the number of the battery cells 1009 included in the charge battery cell group to the number of the battery cells 1009 included in the discharge battery cell group.

Thus, the voltage transformation control circuit 1006 preferably sets the conversion ratio N larger than the ratio of the number of the battery cells 1009 included in the charge battery cell group to the number of the battery cells 1009 included in the discharge battery cell group by approximately 1% to 10%. Here, the charging voltage is made larger than the voltage of the charge battery cell group, but actual charging voltage is equal to the voltage of the charge battery cell group. Note that the voltage transformation control circuit 1006 feeds a current for charging the charge battery cell group in accordance with the conversion ratio N in order to make the voltage of the charge battery cell group equal to the charging voltage. The value of the current is set by the voltage transformation control circuit 1006.

Since three battery cells 1009 are included in the discharge battery cell group and one battery cell 1009 is included in the charge battery cell group in the example illustrated in FIG. 15A, the voltage transformation control circuit 1006 calculates a value which is slightly greater than ⅓ as the conversion ratio N. Then, the voltage transformation control circuit 1006 outputs the voltage transformation signal S3, which lowers the discharging voltage in accordance with the conversion ratio N and converts the voltage into a charging voltage, to the voltage transformer circuit 1007. The voltage transformer circuit 1007 applies the charging voltage which is transformed in response to the voltage transformation signal S3 to the terminal pair 1002. Then, the battery cells 1009 included in the charge battery cell group are charged with the charging voltage applied to the terminal pair 1002.

In each of examples illustrated in FIGS. 15B and 15C, the conversion ratio N is calculated in a manner similar to that of FIG. 15A. Since the number of the battery cells 1009 included in the discharge battery cell group is less than or equal to the number of the battery cells 1009 included in the charge battery cell group in each of the examples illustrated in FIGS. 15B and 15C, the conversion ratio N is greater than 1. Therefore, in this case, the voltage transformation control circuit 1006 outputs the voltage transformation signal S3 for raising the discharging voltage and converting the voltage into the charging voltage.

The voltage transformer circuit 1007 converts the discharging voltage applied to the terminal pair 1001 into a charging voltage on the basis of the voltage transformation signal S3. The voltage transformer circuit 1007 applies the converted charging voltage to the terminal pair 1002. Here, the voltage transformer circuit 1007 electrically insulates the terminal pair 1001 from the terminal pair 1002. Accordingly, the voltage transformer circuit 1007 prevents a short circuit due to a difference between the absolute voltage of the negative electrode terminal of the battery cell 1009 on the most downstream side of the discharge battery cell group and the absolute voltage of the negative electrode terminal of the battery cell 1009 on the most downstream side of the charge battery cell group. Furthermore, the voltage transformer circuit 1007 converts the discharging voltage, which is the total voltage of the discharge battery cell group, into the charging voltage on the basis of the voltage transformation signal S3, as described above.

An insulated direct current-direct current (DC-DC) converter or the like can be used in the voltage transformer circuit 1007. In that case, the voltage transformation control circuit 1006 outputs a signal for controlling the on/off ratio (duty ratio) of the insulated DC-DC converter as the voltage transformation signal S3 to control the charging voltage converted by the voltage transformer circuit 1007.

Examples of the insulated DC-DC converter include a flyback converter, a forward converter, a ringing choke converter (RCC), a push-pull converter, a half-bridge converter, and a full-bridge converter. A suitable converter is selected in accordance with the intended output voltage.

Figure 16:
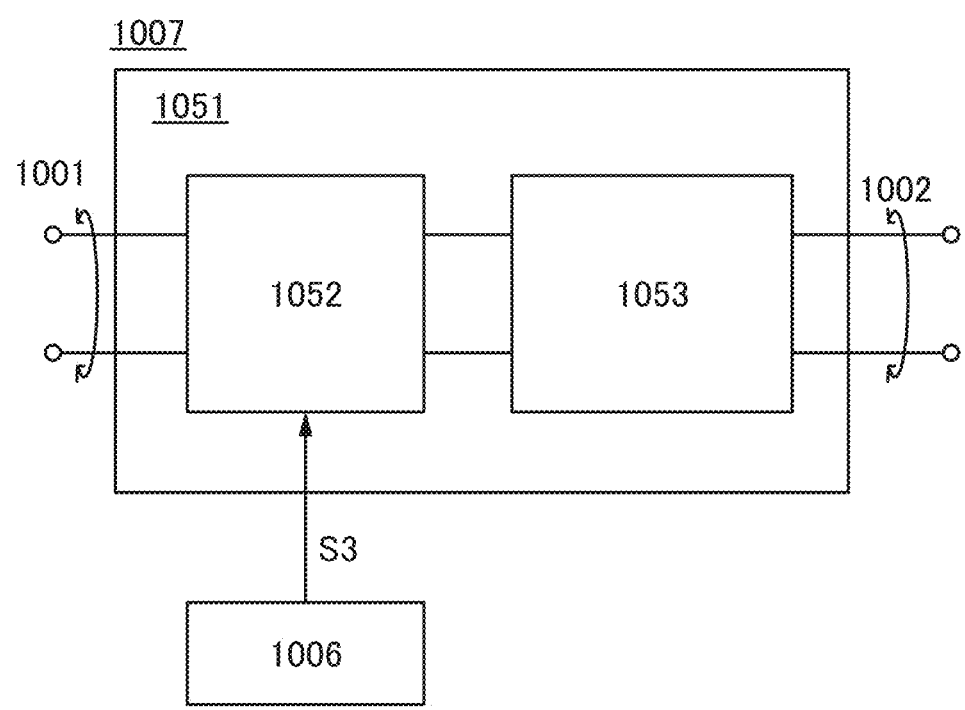
FIG. 16 is a block diagram illustrating one embodiment of the present invention.

The structure of the voltage transformer circuit 1007 including the insulated DC-DC converter is illustrated in FIG. 16. An insulated DC-DC converter 1051 includes a switch portion 1052 and a transformer 1053. The switch portion 1052 is a switch for switching on/off the insulated DC-DC converter, and a metal oxide semiconductor field-effect transistor (MOSFET), a bipolar transistor, or the like is used as the switch portion 1052. The switch portion 1052 periodically turns on and off the insulated DC-DC converter 1051 in accordance with the voltage transformation signal S3 which is output from the voltage transformation control circuit 1006 and is for controlling the on/off ratio. The switch portion 1052 can have any of various structures depending on the type of the insulated DC-DC converter which is used. The transformer 1053 converts the discharging voltage applied from the terminal pair 1001 into the charging voltage. In detail, the transformer 1053 operates in conjunction with the on/off state of the switch portion 1052 and converts the discharging voltage into the charging voltage in accordance with the on/off ratio of the switch portion 1052. The charging voltage is increased as a period during which the switch portion 1052 is on becomes longer in its switching period. In the case of using the insulated DC-DC converter, the terminal pair 1001 and the terminal pair 1002 can be insulated from each other inside the transformer 1053.

Figure 17:
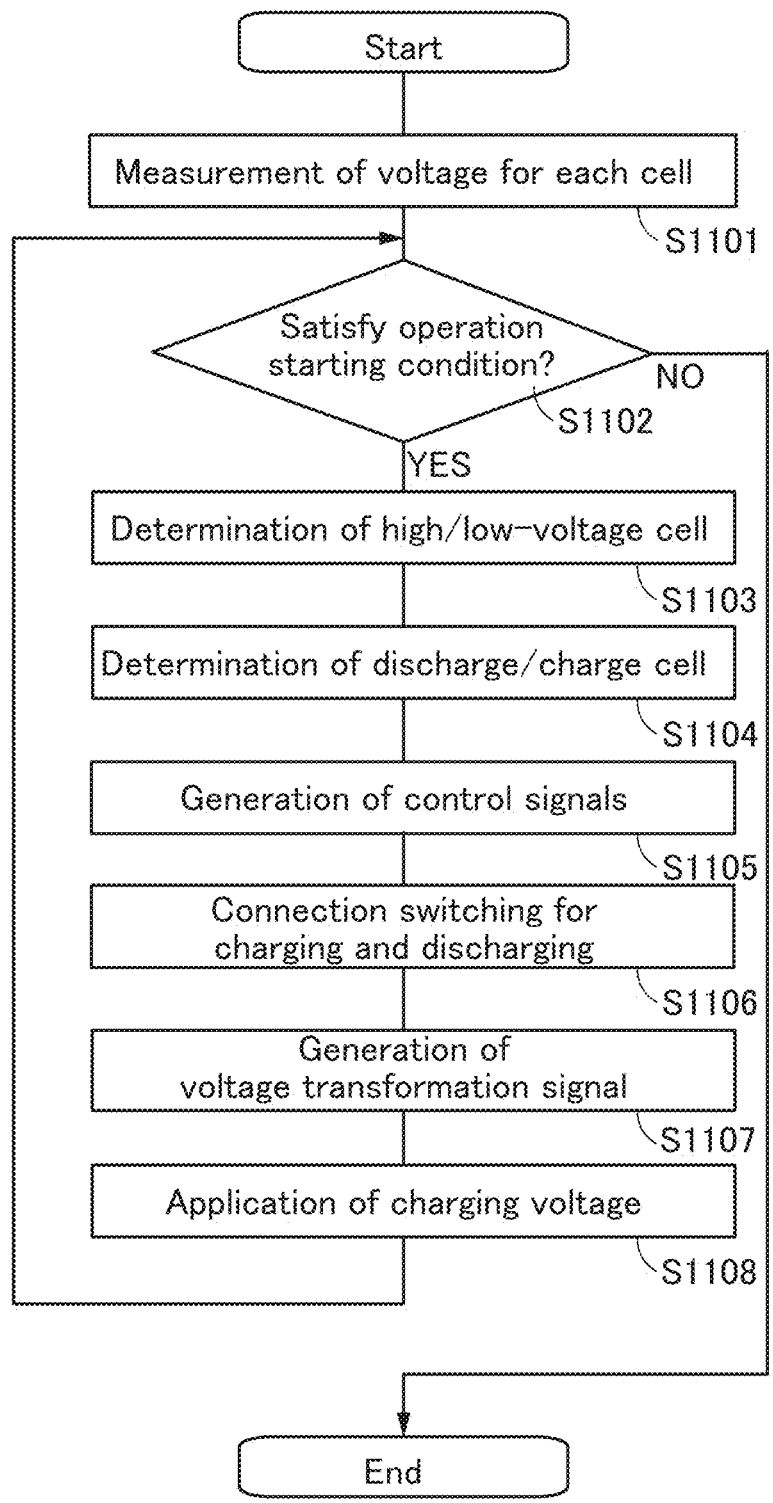
FIG. 17 is a flow chart illustrating one embodiment of the present invention.

A flow of operation of the power storage device 1000 of this embodiment is described with reference to FIG. 17. FIG. 17 is a flow chart illustrating the operation of the power storage device 1000.

First, the power storage device 1000 obtains a voltage measured for each of a plurality of the battery cells 1009 (Step S1101). Then, the power storage device 1000 determines whether or not the condition for starting the operation of reducing variation in voltages of a plurality of the battery cells 1009 is satisfied (Step S1102). An example of the condition can be that the difference between the maximum value and the minimum value of the voltage measured for each of a plurality of the battery cells 1009 is higher than or equal to the predetermined threshold value. In the case where the condition is not satisfied (Step S1102: NO), the power storage device 1000 does not perform the subsequent steps because voltages of the battery cells 1009 are well balanced. In contrast, in the case where the condition is satisfied (Step S1102: YES), the power storage device 1000 performs the operation of reducing variation in the voltages of the battery cells 1009. In this operation, the power storage device 1000 determines whether each battery cell 1009 is a high-voltage cell or a low-voltage cell on the basis of the measured voltage of each cell (Step S1103). Then, the power storage device 1000 determines a discharge battery cell group and a charge battery cell group on the basis of the determination result (Step S1104). In addition, the power storage device 1000 generates the control signal S1 for setting the determined discharge battery cell group as the connection destination of the terminal pair 1001, and the control signal S2 for setting the determined charge battery cell group as the connection determination of the terminal pair 1002 (Step S1105). The power storage device 1000 outputs the generated control signals S1 and S2 to the switching circuit 1004 and the switching circuit 1005, respectively. Then, the switching circuit 1004 connects the terminal pair 1001 and the discharge battery cell group, and the switching circuit 1005 connects the terminal pair 1002 and the discharge battery cell group (Step S1106). The power storage device 1000 generates the voltage transformation signal S3 on the basis of the number of the battery cells 1009 included in the discharge battery cell group and the number of the battery cells 1009 included in the charge battery cell group (Step S1107). Then, the power storage device 1000 converts the discharging voltage applied to the terminal pair 1001 into a charging voltage on the basis of the voltage transformation signal S3 and applies the charging voltage to the terminal pair 1002 (Step S1108). In this manner, an electric charge of the discharge battery cell group is transferred to the charge battery cell group.

Although a plurality of steps are shown in order in the flow chart of FIG. 17, the execution order of the steps is not limited to the order.

With this embodiment, unlike in the a capacitor type circuit, a structure for temporarily storing an electric charge from the discharge battery cell group and then sending the stored electric charge to the charge battery cell group is unnecessary to transfer an electric charge from the discharge battery cell group to the charge battery cell group. In addition, the switching circuit 1004 and the switching circuit 1005 determine which battery cell in the discharge battery cell group and the charge battery cell group to be connected to the transformer circuit.

Furthermore, the voltage transformer circuit 1007 converts the discharging voltage applied to the terminal pair 1001 into the charging voltage on the basis of the number of the battery cells 1009 included in the discharge battery cell group and the number of the battery cells 1009 included in the charge battery cell group, and applies the charging voltage to the terminal pair 1002. Thus, even when any battery cell 1009 is selected as the discharge battery cell group and the charge battery cell group, an electric charge can be transferred without any problems.

Furthermore, the use of OS transistors as the transistor 1010 and the transistor 1013 can reduce the amount of electric charge leaking from the battery cell 1009 which does not belong to the charge battery cell group or the discharge battery cell group. Accordingly, a decrease in capacity of the battery cell 1009 which does not contribute to charging or discharging can be suppressed. In addition, since the variation in characteristics of the OS transistor due to heat is smaller than that of a Si transistor, an operation such as turning on or off the transistors in response to the control signals S1 and S2 can be performed normally even when the temperature of the battery cells 1009 is increased.

This embodiment can be implemented in combination with any of the other embodiments as appropriate.

EXAMPLE 1

One embodiment of the present invention will be specifically described below with examples. This example shows results of manufacture of a positive electrode by the method described in Embodiment 2. Note that the present invention is not limited to the following examples.

(Manufacture of Active Material Layer)

To manufacture an active material layer, $LiFePO_4$ was used as an active material, graphene oxide was used as a raw material of a conductive additive, PVdF was used as a binder, and NMP was used as a solvent. First, NMP was added as a solvent to $LiFePO_4$ to which the graphene oxide was added and the mixture was kneaded. After an NMP solution of PVdF (No. 7300 manufactured by KUREHA CORPORATION) was added as a binder solution to the mixture of the graphene oxide and $LiFePO_4$, NMP was further added as a polar solvent and mixing was performed to form a paste. The compounding ratio of $LiFePO_4$ to the graphene oxide and PVdF was set to 94.2:0.8:5 (weight ratio). The paste formed by the above method was applied to a current collector and heating under reduced pressure was performed at 65° C. for 15 minutes and at 75° C. for 15 minutes so as to evaporate the polar solvent contained in the paste. In this manner, the active material layer was formed. As the current collector, 20-μm-thick aluminum coated with approximately 1-μm-thick carbon black was used. The supported amount of the paste with respect to the current collector was approximately 9 mg/cm². Methods for manufacturing electrodes A, B, C, and D and comparative examples E and F in which reduction was performed on the active material layers under different conditions will be described below.

(Manufacture of Electrode A)

First, the active material layer and the current collector formed in the above-described steps were immersed for 10 minutes in ethanol (99.5%) heated to 60° C. Then, the active material layer and the current collector taken out from ethanol were heated at 100° C. under reduced pressure for 10 hours so that the graphene oxide was reduced. In this manner, the electrode A was manufactured.

(Manufacture of Electrode B)

The active material layer and the current collector were immersed in ethanol heated to 60° C. as in the manufacturing method of the electrode A, and then were heated at 150° C. for 10 hours so that the graphene oxide was reduced. In this manner, the electrode B was manufactured.

(Manufacture of Electrode C)

The active material layer and the current collector were immersed in ethanol heated to 60° C. as in the manufacturing methods of the electrodes A and B, and then were heated at 170° C. for 10 hours so that the graphene oxide was reduced. In this manner, the electrode C was manufactured.

(Manufacture of Electrode D)

Unlike in the manufacturing methods of the electrodes A, B, and C, the active material layer and the current collector were immersed in ethanol at room temperature (25° C.) for 10 minutes, and then were heated at 100° C. under reduced pressure for 10 hours. In this manner, the electrode D was manufactured.

(Manufacture of Comparative Example E)

For comparison, a positive electrode was manufactured in which the graphene oxide is reduced by heating without immersion of the active material layer in ethanol. The positive electrode was manufactured as the comparative example E by heating the active material layer and the current collector at 170° C. for 10 hours.

(Manufacture of Comparative Example F)

For another comparison, a positive electrode was manufactured by reducing the graphene oxide by immersion of the active material layer in a solution containing a reducing agent. In the solution containing the reducing agent, L-ascorbic acid was used as the reducing agent and lithium hydroxide was used as a pH adjuster. To form the solution, the L-ascorbic acid and lithium hydroxide were dissolved in a water-NMP mixed solution (water:NMP=1:9 (volume ratio)) so as to have concentrations of 77 mM and 73 mM, respectively. The active material layer and the current collector were immersed in this solution, heated to 60° C. to cause a reaction for 1 hour, washed, and heated at 170° C. under reduced pressure to evaporate a solvent. In this manner, the comparative example F was manufactured.

(Cross-Sectional Observation of Active Material Layer)

Figure 23:
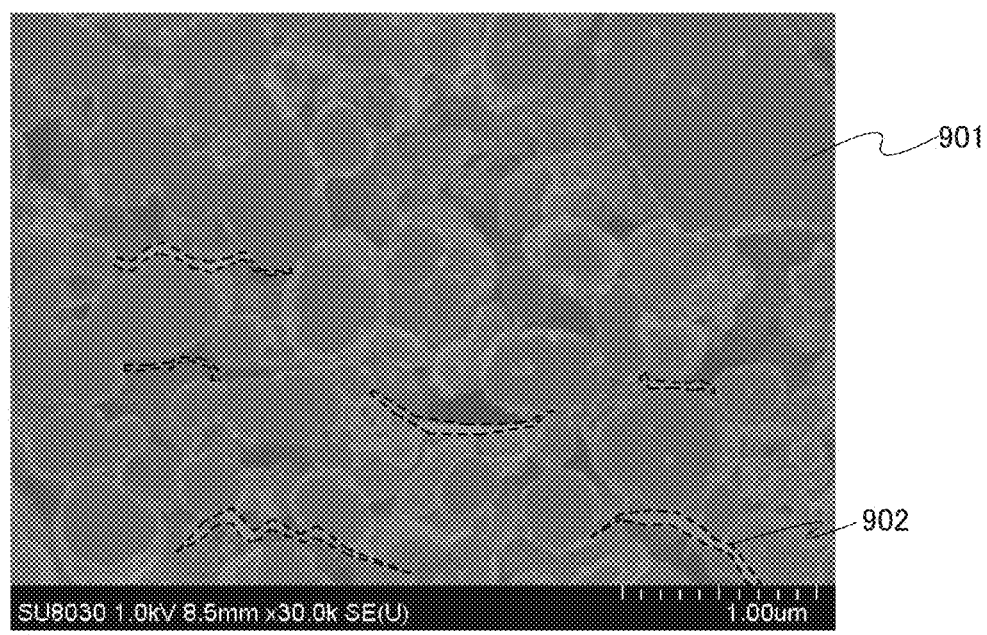
FIG. 23 is a cross-sectional SEM image of an electrode.

A cross section of the manufactured electrode A polished using a cross section polisher was observed by SEM. FIG. 23 is a cross-sectional SEM image of the active material layer in the electrode A, magnified by 30000 times.

As shown in FIG. 23, in the active material layer of the electrode A, sheet-like graphene 902 is in contact with an active material particle 901 so as to coat or cover the active material particle 901. Although not marked by lines, a plurality of sheets of graphene are in contact with each other. This indicates that a three-dimensional electric conduction network is constructed in the active material layer of the electrode A. Furthermore, there is no particular damage observed in the active material layer. This indicates that when an active material layer and a current collector are immersed in ethanol and heated after taken out from ethanol, an electrode including an active material layer with little damage can be manufactured.

(Manufacture of Half Cell)

Half cells were fabricated using the electrodes A and D and the comparative examples E and F to measure the charge and discharge characteristics. Note that a half cell refers to a cell of a lithium-ion secondary battery in which an active material other than a lithium metal is used for a positive electrode and a lithium metal is used for a negative electrode. Here, a lithium metal was used for a negative electrode, polypropylene (PP) was used for a separator, and an electrolytic solution formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 1:1 was used.

(Evaluation of Cycle Characteristics of Half Cell)

Figure 18:
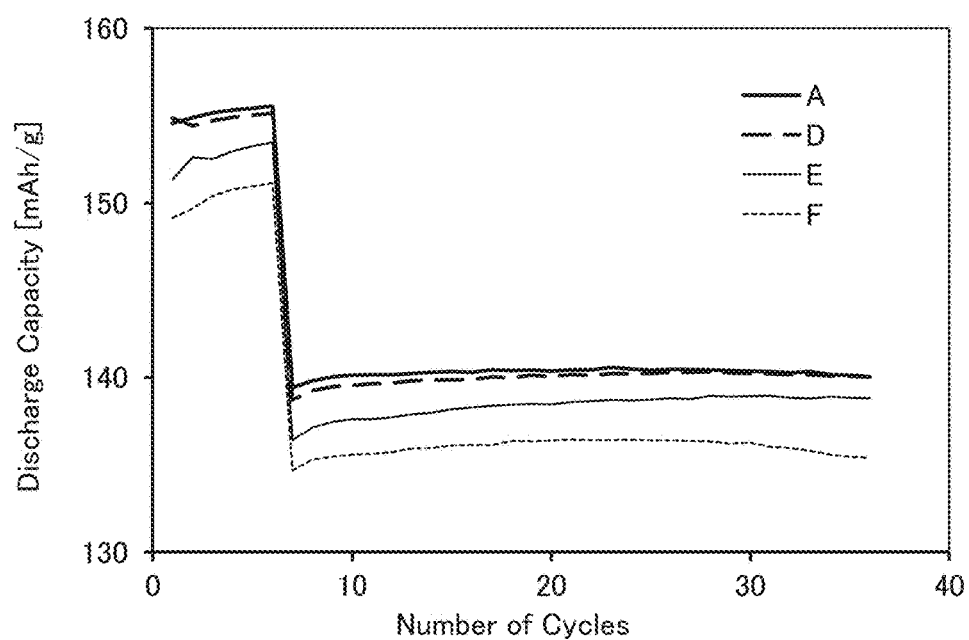
FIG. 18 is a graph showing cycle characteristics of half cells.

FIG. 18 shows measurement results of discharge capacities of the half cells including the electrodes A and D and the comparative examples E and F during charge and discharge cycles at 25° C. In FIG. 18, the longitudinal axis and the lateral axis represent capacity (mAh/g) and the number of cycles, respectively. In the first to sixth cycles, constant current-constant voltage charging was performed at a charge rate of 0.2 C and constant current discharging was performed at a discharge rate of 0.2 C. In the seventh to thirty-sixth cycle, charging was performed at a constant current at a charge rate of 1 C and discharging was performed at a constant current at a discharge rate of 1 C.

Here, a charge rate and a discharge rate are described. A charge rate of 1 C means a current value with which charging is terminated in exactly 1 hour in the case of charging a cell with a capacity of X (Ah) at a constant current. When 1 C=I (A), a charge rate of 0.2 C means I/5 (A), i.e., a current value with which charging is terminated in exactly 5 hours. Similarly to the above, a discharge rate of 1 C means a current value at which discharging is terminated in exactly 1 hour in the case of discharging a cell with a capacity of X (Ah) at a constant current. A discharge rate of 0.2 C means I/5 (A), i.e., a current value with which discharging is terminated in exactly 5 hours.

FIG. 18 shows that the half cells including the electrodes A and D have almost the same discharge capacity, which is the highest. FIG. 18 also shows that the half cell including the comparative example E has the highest discharge capacity next to the half cells including the electrodes A and D, and the half cell including the comparative example F has the lowest discharge capacity. Note that the electrodes A and D were obtained as a result of reduction of graphene oxide by heating after immersion in ethanol. The comparative example E was obtained as a result of reduction of graphene oxide by heating without immersion in ethanol. The comparative example F was obtained as a result of reduction of graphene oxide by immersion in a solution containing L-ascorbic acid. The results indicate that a half cell including an electrode obtained as a result of reduction of graphene oxide by heating has higher discharge capacity than a half cell including an electrode obtained as a result of reduction of graphene oxide by immersion in a solution containing L-ascorbic acid. The results also indicate that immersion in ethanol before heating can increase the discharge capacity of a half cell.

Although the discharge capacity of the half cell including the comparative example F decreases as the number of cycles increases, a reduction in the discharge capacity of each of the half cells including the electrodes A and D is suppressed. This result shows that the cycle characteristics of the half cells including the electrodes A and D are improved. It is thus found that the electrodes A and D include the active material layers with little damage and hardly expand or change their shapes; as a result, electric conduction paths in the active material layers are less likely to be cut.

(Evaluation of Rate Characteristics)

Figure 19A:
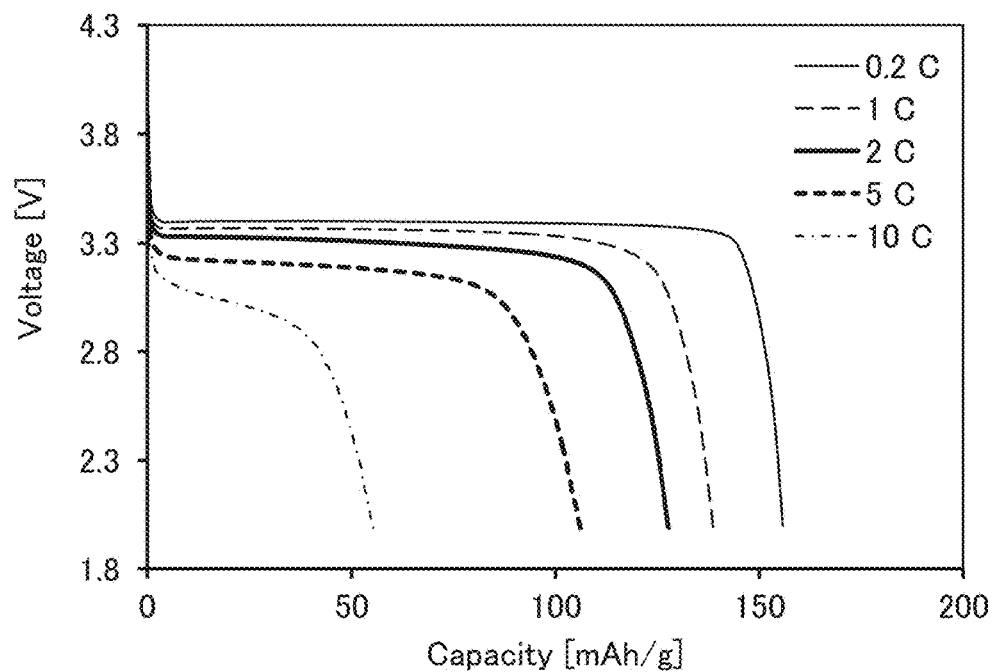
FIGS. 19A and 19B are graphs showing rate characteristics of half cells.
Figure 19B:
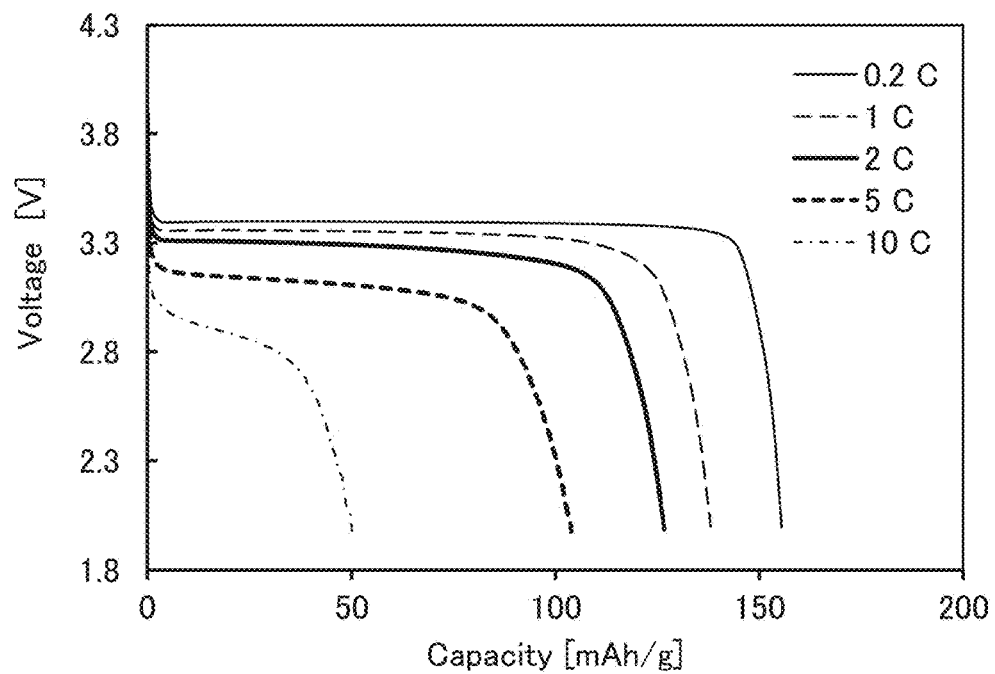
Figure 20A:
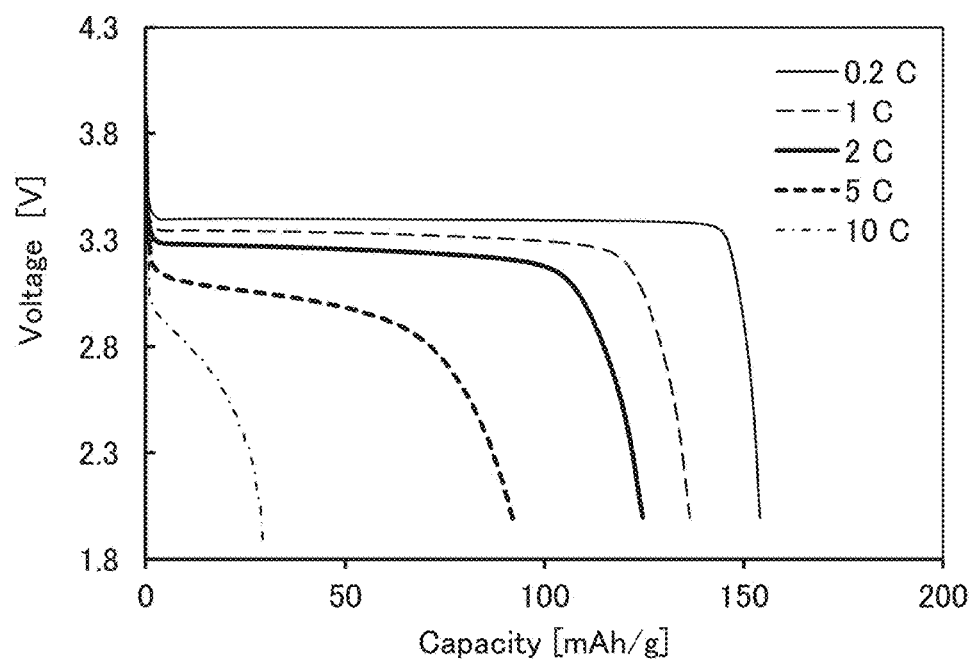
FIGS. 20A and 20B are graphs showing rate characteristics of half cells.
Figure 20B:
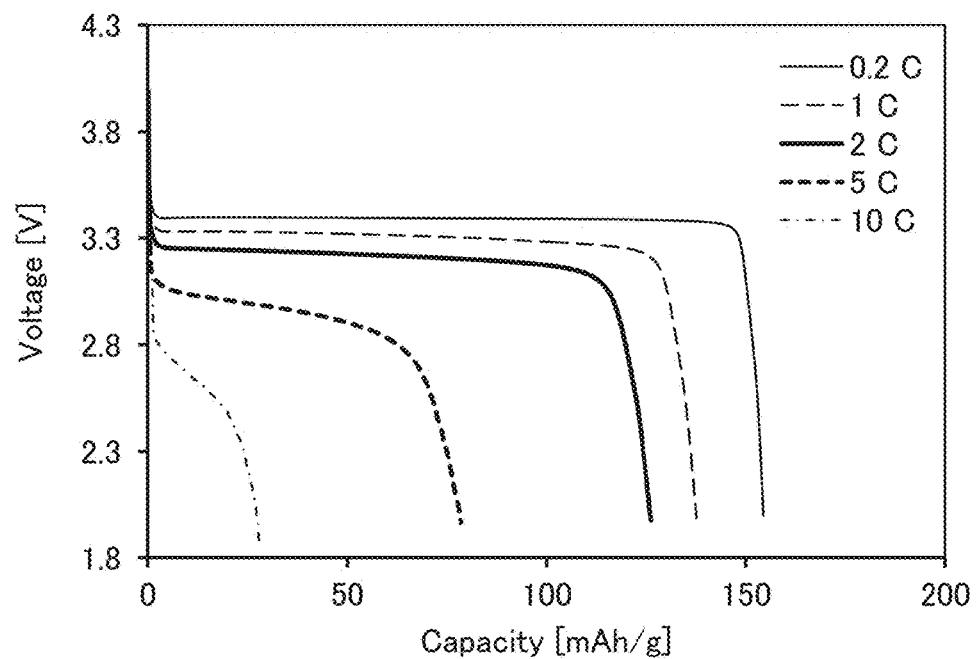

FIGS. 19A and 19B and FIGS. 20A and 20B show discharge curves of the half cells including the electrodes A and D and the comparative examples E and F, which were measured at different charge and discharge rates at 25° C. The longitudinal axes each represent voltage (V) and the lateral axes each represent discharge capacity per weight of a positive electrode (mAh/g). Constant current-constant voltage charging was performed at a charge rate of 0.2 C, and constant current discharging was performed at discharge rates of 0.2 C, 1 C, 2 C, 5 C, and 10 C. FIG. 19A shows the discharge curves of the half cell including the electrode A. FIG. 19B shows the discharge curves of the half cell including the electrode D. FIG. 20A shows the discharge curves of the half cell including the comparative example E. FIG. 20B shows the discharge curves of the half cell including the comparative example F.

As can be seen from the comparison between FIGS. 19A and 19B and FIGS. 20A and 20B, slopes near the ends of the discharge curves (discharging end) of the half cell including the comparative example F shown in FIG. 20B are steep as compared with the case of other half cells.

The comparison results show that the comparative example F has the highest conductivity, or the highest reduction efficiency of graphene oxide, followed by the electrodes A and D, and the comparative example E has the lowest conductivity. This indicates that when an active material layer is immersed in a solution containing L-ascorbic acid and heated after taken out from the solution, graphene oxide can be reduced most efficiently. In addition, it is suggested that the reduction efficiency of graphene oxide can be increased when an active material layer is immersed in ethanol and heated after taken out from ethanol.

(Resistance Measurement by Current-Rest-Method)

Next, the electrode A and the comparative example E were evaluated by measuring the resistance by a current-rest-method. Here, the current-rest-method is described. During charging of a battery, voltage drops when charging is stopped. The internal impedance of the battery is a factor of this voltage drop. The ohmic components of the internal impedance of the half cell including the electrode A and the half cell including the comparative example E can be calculated from the formula {(voltage immediately after charging stop)−(voltage 3 seconds after charging stop)}/ current. Constant current-constant voltage charging was performed at a charge rate of 0.2 C. Charging was stopped at every 8.5 mAh/g while the battery was charged from 59.5 mAh/g to 102 mAh/g at 25° C. The average value of the ohmic components of the internal impedance, which were each calculated when the charging was stopped, was obtained.

The ohmic component of the internal impedance of the half cell including the electrode A and that of the half cell including the comparative example E were 32.6Ω and 58.0Ω, respectively. This reveals that the ohmic component of the internal impedance of the electrode A is smaller than that of the comparative example E. Accordingly, it is suggested that when an active material layer is immersed in ethanol and heated after taken out from ethanol, the reduction efficiency of graphene oxide can be increased and an electrode with a small ohmic component of the internal impedance can be manufactured.

(Manufacture of Full Cell)

Next, full cells were fabricated using the electrodes B and C and the comparative example E, and the charge and discharge characteristics of the full cells were measured. Note that a full cell refers to a cell of a lithium ion secondary battery in which an active material other than a Li metal is used as a positive electrode material and a negative electrode material. An electrode containing graphite as an active material was used as a negative electrode, polypropylene (PP) was used as a separator, and an electrolytic solution formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 1:1 was used.

(Evaluation of Cycle Characteristics of Full Cell)

Figure 21A:
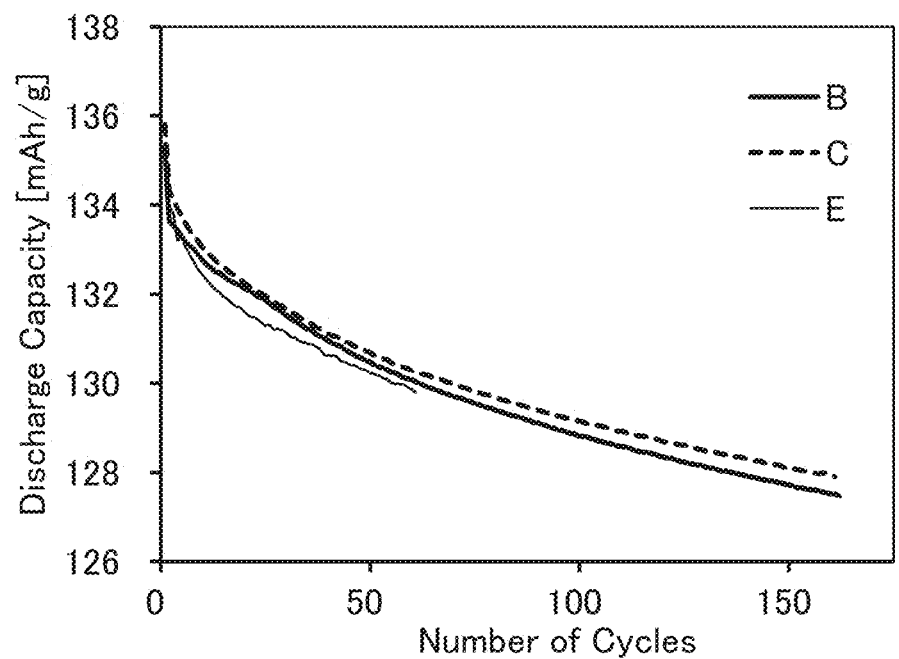
FIGS. 21A and 21B are graphs showing cycle characteristics of full cells.
Figure 21B:
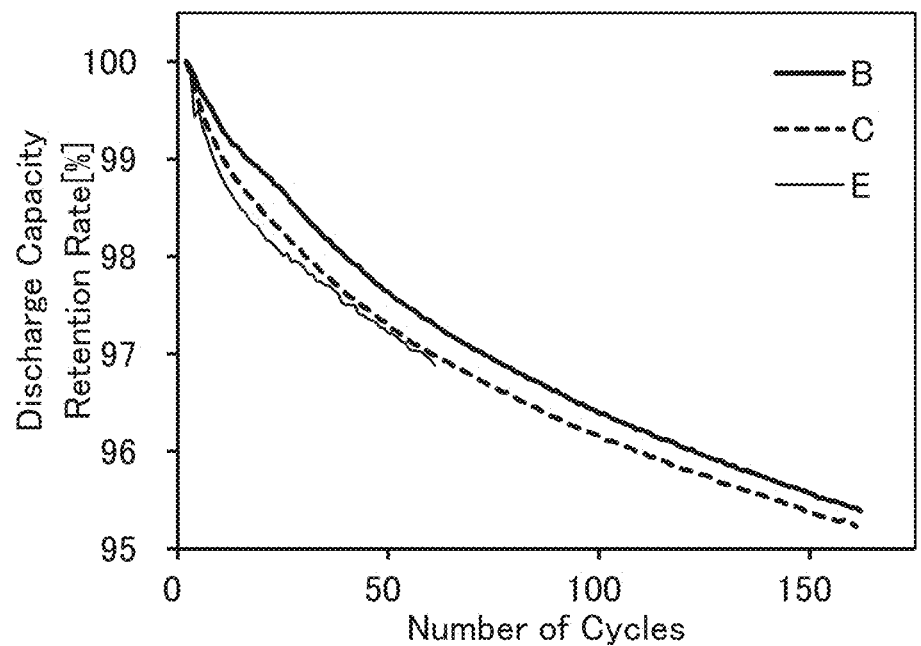

FIGS. 21A and 21B show discharge curves of the full cells including the electrodes B and C and the comparative example E. In the first cycle, constant current-constant voltage charging was performed at a charge rate of 0.2 C and constant current discharging was performed at a discharge rate of 0.2 C. From the second cycle, constant current charging was performed at a charge rate of 0.5 C and constant current discharging was performed at a discharge rate of 0.5 C. In FIG. 21A, the lateral axis represents the number of cycles (times) and the longitudinal axis represents the discharge capacity per weight of a positive electrode (mAh/g) of the secondary battery. In FIG. 21B, the lateral axis represents the number of cycles (times) and the longitudinal axis represents the discharge capacity retention rate (%) of the secondary battery. Here, the discharge capacity retention rate is the discharge capacity with respect to the discharge capacity in the second cycle (discharge capacity discharge capacity in the second cycle×100[%]). Note that for convenience, the results of the full cell including the electrode B, the full cell including the electrode C, and the full cell including the comparative example E are indicated by "B", "C", and "E", respectively, in FIGS. 21A and 21B.

FIG. 21A shows that the full cell including the electrode C has the highest discharge capacity, followed by the full cell including the electrode B, and the full cell including the comparative example E has the lowest discharge capacity. The results suggest that, in manufacture of a positive electrode, the higher the temperature of heating for reduction of graphene oxide is, the more discharge capacity of a full cell can be increased. FIG. 21B shows that the discharge capacity retention rate of the full cell including the electrode B is decreased the least even when the number of cycles increases, followed by the discharge capacity retention rate of the full cell including the electrode C, and the discharge capacity retention rate of the full cell including the comparative example E is the lowest. This suggests that, in manufacture of a positive electrode, the lower the heating temperature is, the more cycle characteristics of a full cell can be improved. It is thus found that reduction of graphene oxide under mild conditions can prevent damage to an active material layer.

EXAMPLE 2

In this example, samples were fabricated by varying conditions of heating for graphene oxide and compared their degrees of reduction to show that alcohol promotes reduction of graphene oxide.

To fabricate a sample 1, graphene oxide was dispersed into ethanol and heating was performed at 100° C. to evaporate a solvent. To fabricate a comparative example 2, graphene oxide was heated at 30° C. under reduced pressure. To fabricate a comparative example 3, graphene oxide was heated at 100° C.

Figure 22:
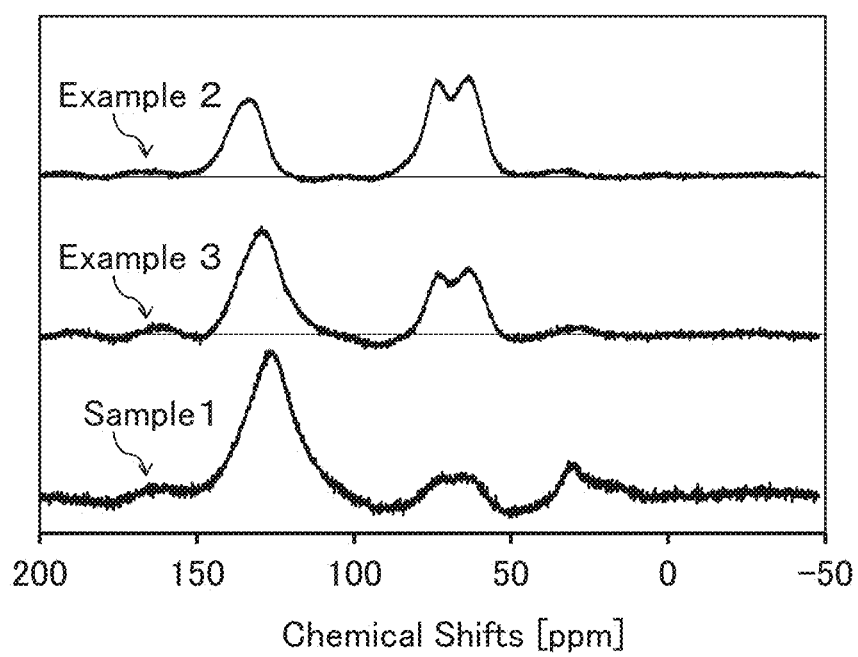
FIG. 22 shows $^{13}C$ NMR spectra of graphene oxide.

FIG. 22 shows solid-state $^{13}C$ NMR spectra of the comparative example 2, the comparative example 3, and the sample 1. In the spectrum of the sample 1, a peak that appears around between 80 ppm to 50 ppm is extremely low as compared with the case of the comparative examples 2 and 3. The peak around between 80 ppm to 50 ppm is assigned to carbon in an epoxy group of graphene oxide and carbon to which a hydroxyl group is bonded. Accordingly, the number of epoxy groups and hydroxyl groups are smaller in the sample 1 than in the comparative examples 2 and 3. Thus, it is suggested that the sample 1 is graphene containing a large number of carbon-carbon double bonds. The above results show that alcohol promotes reduction of graphene oxide.

EXAMPLE 3

This example shows results of manufacture of a positive electrode by the method using a second conductive additive, which is described in Embodiment 2.

(Manufacture of Electrode G and Electrode H)

To form an active material layer, $LiFePO_4$ was used as an active material, graphene oxide (GO) was used as a raw material of a conductive additive, acetylene black (AB) or VGCF (registered trademark) was used as a second conductive additive, PVdF was used as a binder, and NMP was used as a solvent. First, NMP was added to $LiFePO_4$, GO, and the second conductive additive and kneading was performed to form a mixture. Next, an NMP solution of PVdF (No. 7300 manufactured by KUREHA CORPORATION) and the second conductive additive were added to the mixture. Then, NMP was further added and mixing was performed, whereby a paste was formed.

The compounding ratio of the material for the paste was set as follows: $LiFePO_4$:GO:second conductive additive:

PVdF=93.4:0.6:1:5 (weight ratio). The paste formed by the above method was applied to a current collector and heating under reduced pressure was performed at 65° C. for 15 minutes and at 75° C. for 15 minutes so as to evaporate a solvent. In this manner, the active material layer was formed.

The active material layer and the current collector formed in the above manner were immersed in ethanol heated to 60° C., and then were heated at 150° C. for 10 hours so that GO was reduced. In this manner, an electrode was manufactured.

An electrode manufactured using VGCF (registered trademark) as the second conductive additive is called an electrode G, and an electrode manufactured using AB as the second conductive additive is called an electrode H.

An electrode manufactured by the manufacturing method of the electrode B described in Example 1 is called an electrode B'.

(Cross-Sectional Observation of Active Material Layer)

Figure 24A:
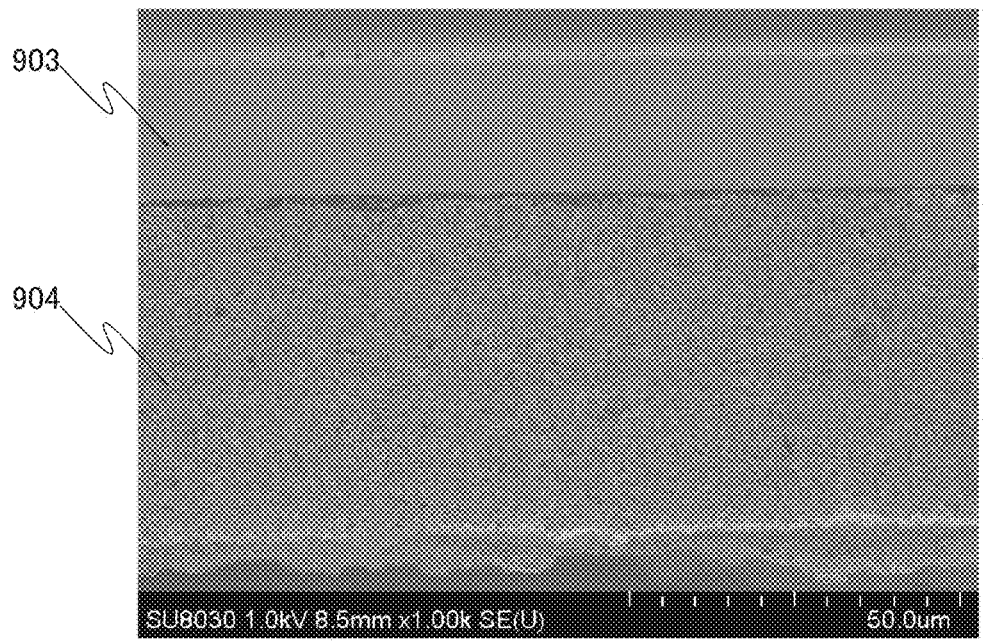
FIGS. 24A and 24B are cross-sectional SEM image of an electrode.
Figure 24B:
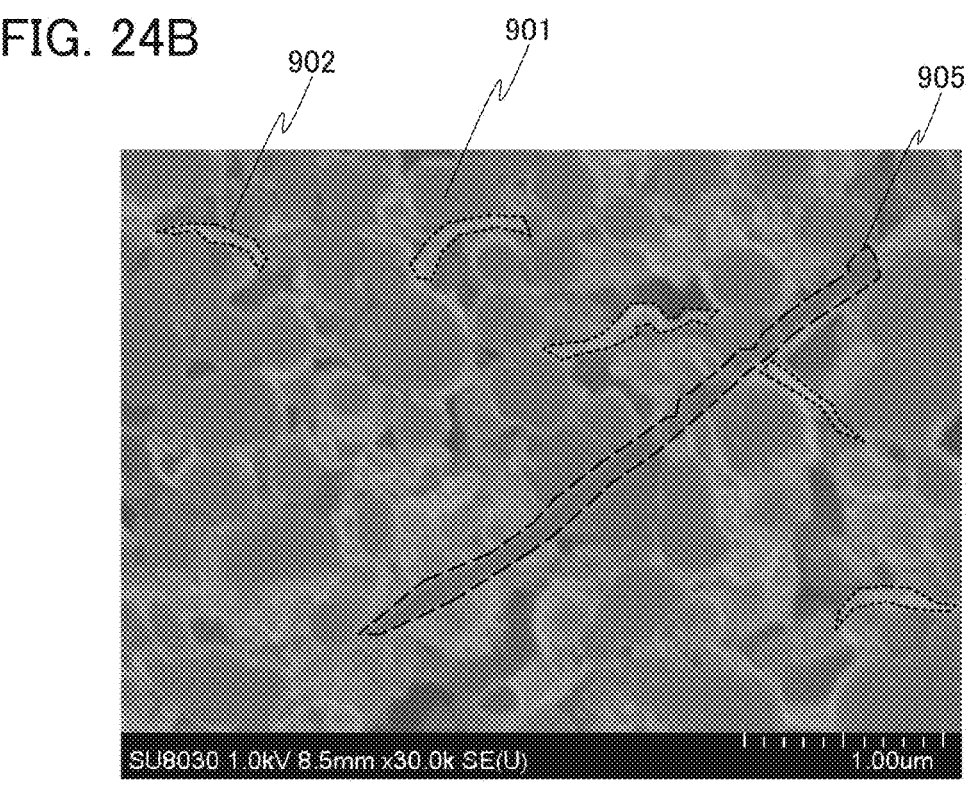

A cross section of the manufactured electrode G polished using a cross section polisher was observed by SEM. In the observed electrode G, the weight of the active material layer per unit area was approximately 11 mg/cm$^2$. FIGS. 24A and 24B are cross-sectional SEM images of the active material layer of the electrode G. FIG. 24A is an enlarged view at a magnification of 1000 times, and FIG. 24B is an enlarged view at a magnification of 30000 times.

A current collector 903 and an active material layer 904 are observed in FIG. 24A. The active material particle 901, the graphene 902, and a needle-like conductive additive 905 contained in the active material layer 904 are observed in FIG. 24B. While the graphene 902 is substantially parallel to a surface of the current collector 903, the conductive additive 905 is oblique to the surface of the current collector 903. This suggests that the conductive additive 905 reinforces a conductive path perpendicular to the surface of the current collector 903.

(Manufacture of Half Cell)

Next, half cells were fabricated using the electrodes G, H, and B' as positive electrodes, and the charge and discharge characteristics of the half cells were measured under the conditions similar to those in Example 1.

(Evaluation of Rate Characteristics)

Figure 25A:
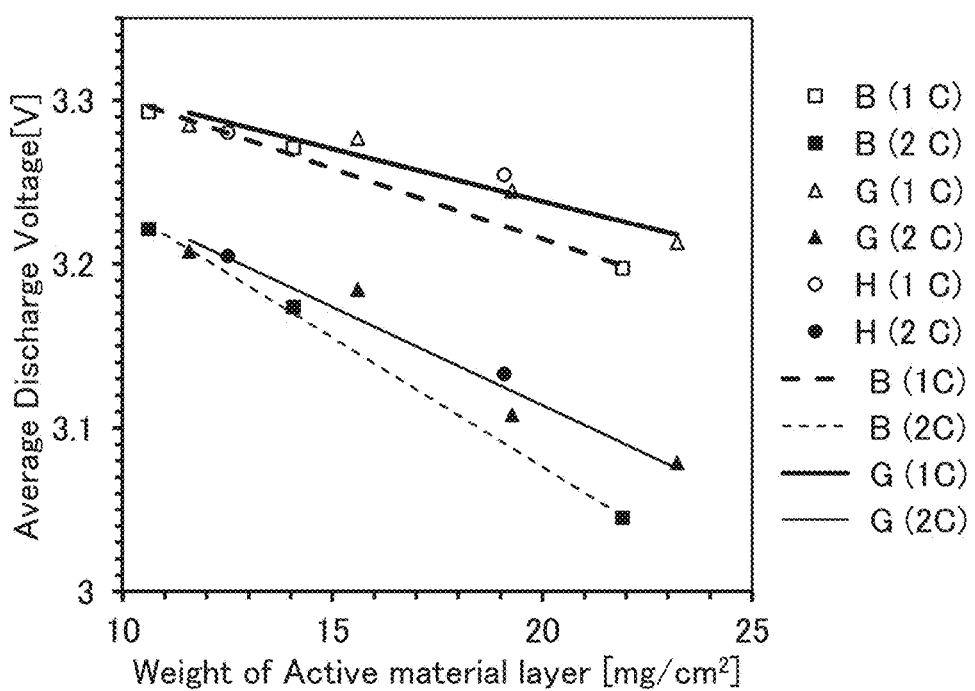
FIGS. 25A and 25B are graphs for describing rate characteristics of half cells.

FIG. 25A shows relationships between discharge voltage of each of the half cells including the electrodes G, H, and B' at a discharge rate of 1 C and 2 C and the weight of the active material layer included in each of the electrodes. The average discharge voltage [V] is plotted on the longitudinal axis, and the weight of the active material layer of the electrode G, H, or B' per unit area [mg/cm$^2$] is plotted on the lateral axis. Constant current-constant voltage charging was performed at a charge rate of 0.2 C and constant current discharging was performed.

Figure 25B:
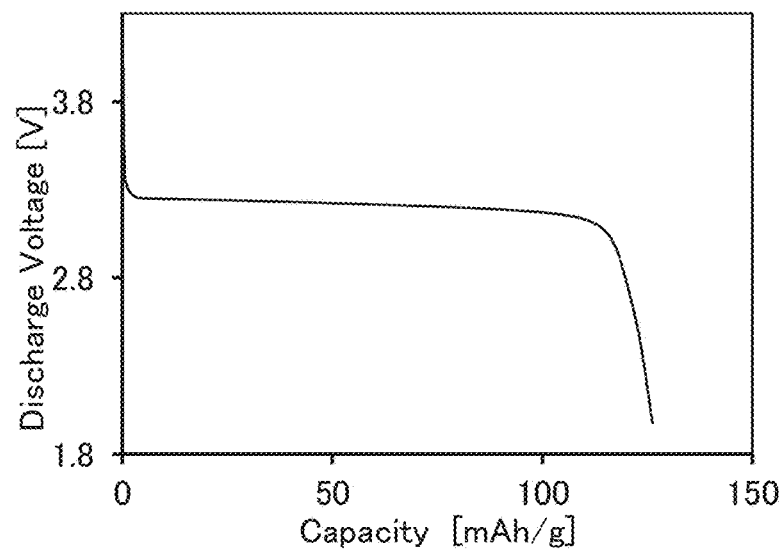

The average discharge voltage is the average voltage value during a period from the start of discharging to just before the rapid drop of discharge voltage in a discharge curve shown in FIG. 25B.

As in FIG. 25A, the average discharge voltage of each of the half cells including the electrodes G, H, and B' becomes small as the weight of the active material layer increases. Note that the slope of each of the straight lines representing changes in the average discharge voltages of the half cells including the electrodes G and H is smaller than that of the straight line representing a change in the average discharge voltage of the half cell including the electrode B'.

The above results show that the internal impedance of the active material layer containing VGCF (registered trademark) or AB as the second conductive additive is less likely to be increased even when the weight of the active material layer increases. This is because a network of electric conduction paths in the active material layer containing the second conductive additive becomes more complicated and the network becomes less likely to be cut even when the thickness of the active material layer 202 is increased.

(Evaluation of Cycle Characteristics of Half Cell)

Figure 26:
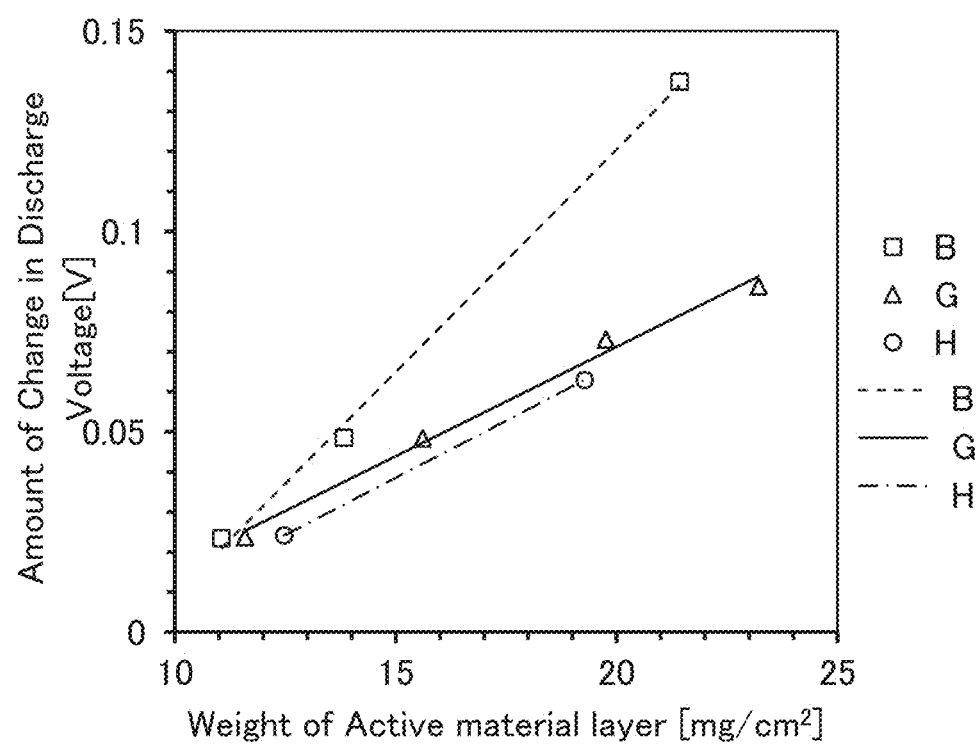
FIG. 26 is a graph showing cycle characteristics of half cells.

FIG. 26 is a graph showing a change in discharge voltage of each of the half cells including the electrodes G, H, and B' measured when charging and discharging were performed by varying the weight of the active material layer included in the positive electrode. The amount of change in discharge voltage [V] {the amount of change in discharge voltage [V]=(the average discharge voltage [V] in the first cycle)−(the average discharge voltage [V] in the 30th cycle)} is plotted on the longitudinal axis, and the weight of the active material layer of the electrode G, H, or B' per unit area [mg/cm$^2$] is plotted on the lateral axis. The discharge rate was 1 C.

FIG. 26 shows that the average discharge voltage decreases in each half cell as the weight of the active material layer increases; however, FIG. 26 also shows that a decrease in the average discharge voltage is smaller in the half cell including the electrode G than in the half cell including the electrode B'. This indicates that the resistance of an electrode containing a second conductive additive such as VGCF (registered trademark) or AB is less likely to be increased even when the thickness of an active material layer is increased.

(Manufacture of Full Cell)

Next, in a manner similar to that in Example 1, full cells were fabricated using the electrodes G, H, and B', and the charge and discharge characteristics of the full cells were measured.

(Evaluation of Cycle Characteristics of Full Cell)

Figure 27A:
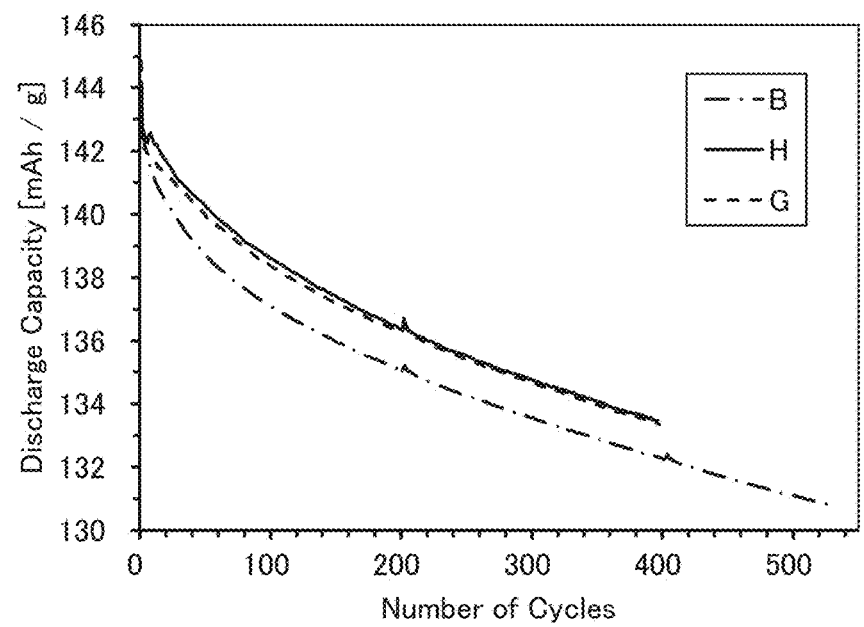
FIGS. 27A and 27B are graphs showing cycle characteristics of full cells.
Figure 27B:
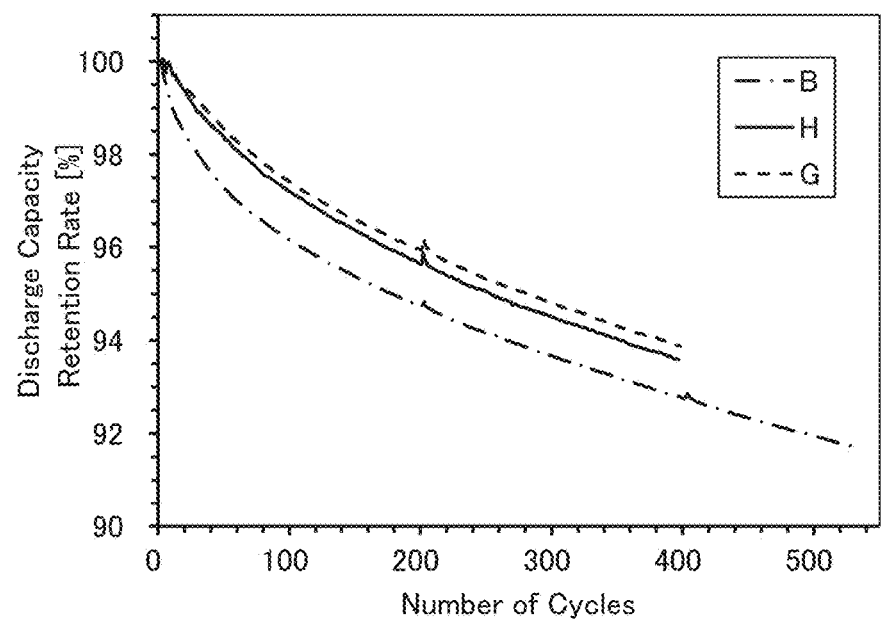

The cycle characteristics of the full cells including the electrodes G, H, and B' were evaluated. The evaluation was performed under the conditions similar to those in Example 1. FIGS. 27A and 27B show the results.

FIGS. 27A and 27B show that the rapid drop of discharge capacity immediately after the start of charging and discharging can be prevented in the full cells including the electrodes G and H. This indicates that cutting of electric conduction paths, which occurs when an active material layer absorbs an electrolyte solution to be swelled at the time of charging and discharging of a full cell, can be prevented.

Accordingly, it is found that electric conduction paths perpendicular to a current collector can be reinforced when an electrode is manufactured using a second conductive additive; thus, the resistance of the electrode can be decreased even when the thickness of an active material layer is increased. It is also found that the cycle characteristics can be improved.

This application is based on Japanese Patent Application serial no. 2014-217222 filed with Japan Patent Office on Oct. 24, 2014, the entire contents of which are hereby incorporated by reference.

What is claimed is:

1. A manufacturing method of a storage battery electrode, comprising the steps of:
    forming a paste containing an active material, a binder, graphene oxide, and a solvent;
    applying the paste to a current collector;
    evaporating the solvent contained in the paste to form an active material layer;
    immersing the active material layer in a liquid consisting of alcohol or water solution of alcohol; and heating the active material layer after taking out the active material layer from the liquid.

2. The manufacturing method of a storage battery electrode, according to claim 1, wherein the alcohol is methanol, ethanol, 1-propanol, 2-propanol, 1-butanol, 2-butanol, isobutyl alcohol, or tert-butyl alcohol.

3. The manufacturing method of a storage battery electrode, according to claim 1, wherein the graphene oxide is reduced so as to be graphene in the step of heating the active material layer.

4. The manufacturing method of a storage battery electrode, according to claim 1, wherein a flake size of the graphene oxide is greater than or equal to 50 nm and less than or equal to 100 µm.

5. The manufacturing method of a storage battery electrode, according to claim 1, wherein during the immersion a temperature of the liquid is higher than or equal to 40° C. and lower than or equal to 70° C.

6. The manufacturing method of a storage battery electrode, according to claim 1, wherein the step of heating the active material layer is performed at a temperature higher than or equal to 80° C. and lower than or equal to 150° C.

7. A method for forming a storage battery, wherein the storage battery comprises the storage battery electrode manufactured by the manufacturing method according to claim 1.

8. A manufacturing method of a storage battery electrode, comprising the steps of:
forming a paste containing an active material, a binder, graphene oxide, a conductive additive, and a solvent;
applying the paste to a current collector;
evaporating the solvent contained in the paste to form an active material layer;
immersing the active material layer in a liquid consisting of alcohol or water solution of alcohol; and
heating the active material layer after taking out the active material layer from the liquid.

9. The manufacturing method of a storage battery electrode, according to claim 8, wherein the alcohol is methanol, ethanol, 1-propanol, 2-propanol, 1-butanol, 2-butanol, isobutyl alcohol, or tert-butyl alcohol.

10. The manufacturing method of a storage battery electrode, according to claim 8, wherein the graphene oxide is reduced so as to be graphene in the step of heating the active material layer.

11. The manufacturing method of a storage battery electrode, according to claim 8, wherein a flake size of the graphene oxide is greater than or equal to 50 nm and less than or equal to 100 µm.

12. The manufacturing method of a storage battery electrode, according to claim 8, wherein during the immersion a temperature of the liquid is higher than or equal to 40° C. and lower than or equal to 70° C.

13. The manufacturing method of a storage battery electrode, according to claim 8, wherein the step of heating the active material layer is performed at a temperature higher than or equal to 80° C. and lower than or equal to 150° C.

14. A method for forming a storage battery, wherein the storage battery comprises the storage battery electrode manufactured by the manufacturing method according to claim 8.

15. A manufacturing method of a storage battery electrode, comprising the steps of:
forming a paste containing an active material, a binder, graphene oxide, and a solvent;
applying the paste to a current collector;
evaporating the solvent contained in the paste, thereby forming an active material layer;
immersing the active material layer in a liquid consisting of alcohol or water solution of alcohol; and
carrying out a thermal reduction of the graphene oxide and forming graphene after having removed the active material layer from the liquid,
wherein the thermal reduction of the graphene oxide is essentially promoted by the alcohol in the step of heating the active material layer.

16. The manufacturing method of a storage battery electrode, according to claim 15, wherein the alcohol is methanol, ethanol, 1-propanol, 2-propanol, 1-butanol, 2-butanol, isobutyl alcohol, or tert-butyl alcohol.

17. The manufacturing method of a storage battery electrode, according to claim 15, wherein a flake size of the graphene oxide is greater than or equal to 50 nm and less than or equal to 100 µm.

18. The manufacturing method of a storage battery electrode, according to claim 15, wherein during the immersion a temperature of the liquid is higher than or equal to 40° C. and lower than or equal to 70° C.

19. The manufacturing method of a storage battery electrode, according to claim 15, wherein the step of heating the active material layer is performed at a temperature higher than or equal to 80° C. and lower than or equal to 150° C.

20. A method for forming a storage battery, wherein the storage battery comprises the storage battery electrode manufactured by the manufacturing method according to claim 15.

* * * * *